US012769116B2

(12) United States Patent
Mamishin

(10) Patent No.: US 12,769,116 B2
(45) Date of Patent: Oct. 20, 2026

(54) EYEBALL INFORMATION DETECTION APPARATUS, DISPLAY APPARATUS, EYEBALL INFORMATION DETECTION METHOD, AND DISPLAY METHOD

(71) Applicant: SONY GROUP CORPORATION, Tokyo (JP)

(72) Inventor: Yuki Mamishin, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 297 days.

(21) Appl. No.: 18/682,084

(22) PCT Filed: Feb. 7, 2022

(86) PCT No.: PCT/JP2022/004600

§ 371 (c)(1),
(2) Date: Feb. 7, 2024

(87) PCT Pub. No.: WO2023/021724

PCT Pub. Date: Feb. 23, 2023

(65) Prior Publication Data

US 2025/0123482 A1 Apr. 17, 2025

(30) Foreign Application Priority Data

Aug. 18, 2021 (JP) ................................ 2021-133188

(51) Int. Cl.
*G02B 27/00* (2006.01)
*G02B 27/01* (2006.01)
*G02B 27/10* (2006.01)

(52) U.S. Cl.
CPC ..... *G02B 27/0093* (2013.01); *G02B 27/0172* (2013.01); *G02B 27/1086* (2013.01); *G02B 2027/013* (2013.01); *G02B 2027/0138* (2013.01); *G02B 2027/0169* (2013.01); *G02B 27/0176* (2013.01)

(58) Field of Classification Search
CPC ........... G02B 27/0093; G02B 27/0172; G02B 27/1086; G02B 27/0176; G02B 2027/013;
(Continued)

(56) References Cited

U.S. PATENT DOCUMENTS

2010/0060551 A1 3/2010 Sugiyama et al.
2013/0114850 A1 5/2013 Publicover et al.
(Continued)

FOREIGN PATENT DOCUMENTS

JP 2003-225207 8/2003
JP 2012-029940 2/2012
(Continued)

OTHER PUBLICATIONS

English Translation of International Search Report prepared by the Japan Patent Office on Apr. 6, 2022, for International Application No. PCT/JP2022/004600, 3 pgs.

*Primary Examiner* — Mohammed A Hasan
(74) *Attorney, Agent, or Firm* — SHERIDAN ROSS P.C.

(57) ABSTRACT

To provide an eyeball information detection apparatus capable of improving the detection accuracy. The present technology provides an eyeball information detection apparatus including: a support member that is mounted on a head of a user; a substrate provided to the support member so as to face an eyeball of the user; an irradiation system that is provided to the support member and includes at least one light source that emits non-visible light towards the substrate; at least one optical element that is provided to the substrate so that the at least one optical element is irradiated with the non-visible light and generates a virtual light source of the non-visible light; a light reception system that receives the non-visible light reflected on the eyeball via the
(Continued)

A

B optical element; and a detection system that detects information about the eyeball on the basis of an output from the light reception system.

34 Claims, 42 Drawing Sheets

(58) Field of Classification Search
CPC .... G02B 2027/0138; G02B 2027/0169; G02B 27/02; A61B 3/11; A61B 3/113; G06F 3/013
USPC .......................................................... 359/630
See application file for complete search history.

(56) References Cited

U.S. PATENT DOCUMENTS

| | | | | |
|---|---|---|---|---|
| 2014/0211320 | A1 | 7/2014 | Hori | |
| 2014/0361957 | A1 | 12/2014 | Hua et al. | |
| 2016/0284129 | A1* | 9/2016 | Nishizawa | G06F 3/013 |
| 2019/0086674 | A1* | 3/2019 | Sinay | G02B 27/0172 |
| 2019/0286228 | A1* | 9/2019 | Sangu | A61B 3/15 |
| 2020/0285058 | A1* | 9/2020 | Sangu | G02B 26/125 |

FOREIGN PATENT DOCUMENTS

| | | |
|---|---|---|
| JP | 2014-149668 | 8/2014 |
| JP | 2014-532542 | 12/2014 |
| JP | 2015-508182 | 3/2015 |
| JP | 2017-116768 | 6/2017 |
| JP | 2019-154815 | 9/2019 |
| JP | 2020-081449 | 6/2020 |
| JP | 2020-160141 | 10/2020 |
| JP | 2021-005072 | 1/2021 |
| WO | WO 2009-041055 | 4/2009 |
| WO | WO-2021117409 A1 | 6/2021 |

* cited by examiner

A

B

A

B

C

A

B

A

B

A

B

EYEBALL INFORMATION DETECTION APPARATUS, DISPLAY APPARATUS, EYEBALL INFORMATION DETECTION METHOD, AND DISPLAY METHOD

CROSS REFERENCE TO RELATED APPLICATIONS

This application is a national stage application under 35 U.S.C. 371 and claims the benefit of PCT Application No. PCT/JP2022/004600, having an international filing date of 7 Feb. 2022, which designated the United States, which PCT application claimed the benefit of Japanese Patent Application No. 2021-133188, filed 18 Aug. 2021, the entire disclosures of each of which are incorporated herein by reference.

TECHNICAL FIELD

A technology according to the present disclosure (hereinafter, also referred to as "the present technology") relates to an eyeball information detection apparatus, a display apparatus, an eyeball information detection method, and a display method.

BACKGROUND ART

Conventionally, an eyeball information detection apparatus (e.g., a gaze detection apparatus) that radiates non-visible light to an eyeball of a user and detects information about the eyeball (e.g., a gaze) is known (e.g., see Patent Literature 1).

CITATION LIST

Patent Literature

Patent Literature 1: Japanese Patent Application Laid-open No. 2003-225207

DISCLOSURE OF INVENTION

Technical Problem

However, a conventional eyeball information detection apparatus has a room for improving detection accuracy.

In view of this, it is an objective of the present technology to provide an eyeball information detection apparatus capable of improving the detection accuracy.

Solution to Problem

The present technology provides an eyeball information detection apparatus including:

a support member that is mounted on a head of a user;

a substrate provided to the support member so as to face an eyeball of the user;

an irradiation system that is provided to the support member and includes at least one light source that emits non-visible light towards the substrate;

at least one optical element that is provided to the substrate so that the at least one optical element is irradiated with the non-visible light, generates a virtual light source of the non-visible light, and is not a plane mirror;

a light reception system that receives the non-visible light reflected on the eyeball via the optical element and includes a light reception element; and a detection system that detects eyeball information that is information about the eyeball on the basis of an output from the light reception system.

The at least one optical element may be a plurality of optical elements.

The plurality of optical elements may include at least three optical elements two-dimensionally arranged in an in-plane direction of the substrate.

The at least one light source may be a plurality of light sources.

The plurality of light sources may include at least two light sources corresponding to different optical elements of the plurality of optical elements.

The plurality of light sources may individually correspond to the plurality of optical elements.

The at least one light source may include light sources corresponding to at least two optical elements of the plurality of optical elements.

The at least one light source may be a single light source corresponding to the plurality of optical elements.

The at least one optical element may be larger in number than the at least one light source.

Each of the plurality of light sources may correspond to at least two optical elements of the plurality of optical elements, and the non-visible light from each of the plurality of light sources may be propagated inside the substrate and be radiated to the at least two corresponding optical elements.

An optical member that guides the non-visible light from the light source to the plurality of optical elements may be provided to the substrate.

The non-visible light from the light source may be propagated inside the substrate and be radiated to the plurality of optical elements via the optical member.

The light reception system may be provided to the substrate.

The support member may include a temple including an ear hook portion, the light reception system may be provided to the temple, and another optical element that guides the non-visible light reflected on the eyeball to a light reception system may be provided to the substrate.

The plurality of optical elements may be provided in a periphery of the other optical element on the substrate.

The support member may include a temple including an ear hook portion, and the light source may be provided to the temple.

The support member may include a temple including an ear hook portion and an extension portion extending to a side of the substrate which is opposite to a side of the ear hook portion, and the light source may be provided to the extension portion.

The optical element may be a reflective-type.

The optical element may be a diffractive element.

The diffractive element may have a non-uniform pitch.

The diffractive element may be a wavefront reconstruction-type.

The at least one optical element may be a plurality of diffractive elements, wavefront shapes recorded on at least two of the plurality of diffractive elements may be different, and the detection system may have a fitting unit that fits a plurality of reflection images of the non-visible light on the eyeball to wavefront shapes recorded on the plurality of diffractive elements.

The diffractive element may be a diffusing element.

The at least one optical element may be a plurality of diffusing elements, and the detection system may have a fitting unit that fits a plurality of reflection images of the non-visible light on the eyeball to the plurality of diffusing elements.

At least two of the plurality of diffusing elements may have different shapes.

The diffractive element may have a curved-mirror characteristic.

The at least one diffractive elements may be a plurality of diffractive elements having different diffraction power, at least two of the plurality of virtual light sources respectively generated by the plurality of diffractive elements may be different in position in a thickness direction of the substrate, and the detection system may have a depth estimation unit that estimates a depth of the eyeball from the output from the light reception system.

The irradiation system may be capable of irradiating at least two optical elements of the plurality of optical elements with the non-visible light at different timings.

The plurality of optical elements may include first and second optical elements corresponding to the different light sources, and the irradiation system may include a light source drive unit that selectively drives the light source corresponding to the first optical element and the light source corresponding to the second optical element.

The optical element may be a diffractive element having wavelength selectivity, the plurality of light sources may include at least two light sources having different light emission wavelengths and corresponding to the diffractive element, and the irradiation system may include a light source drive unit that selectively drives the at least two light sources.

The optical element may be a diffractive element having dependence on polarization, and the irradiation system may be capable of varying a polarization direction of the non-visible light.

The optical element may be a diffractive element having dependence on an angle-of-incidence, and the irradiation system may be capable of varying an angle-of-incidence of the non-visible light upon the diffractive element.

The optical element may be a curved mirror.

The eyeball information may include at least one of an orientation of the eyeball, position and size of a pupil, or a position of an iris.

The present technology also provides a display apparatus including:

- the above-mentioned image light generation apparatus; and
- an optical system that is provided to the substrate and guides image light from the image light generation apparatus to an eyeball, in which
- the image light generation apparatus generates the image light on the basis of a detection result of the eyeball information detection apparatus.

The present technology also provides an eyeball information detection method including:

- a step of radiating non-visible light to at least one optical element provided to a substrate which faces an eyeball of a user and generating a virtual light source of the non-visible light;
- a step of receiving the non-visible light reflected on the eyeball via the optical element; and
- a step of detecting eyeball information that is information about the eyeball on the basis of a light reception result at the step of receiving.

The present technology also provides a display method including:

- a step of radiating non-visible light to at least one optical element provided to a substrate which faces an eyeball of a user and generating a virtual light source of the non-visible light;
- a step of receiving the non-visible light reflected on the eyeball via the optical element;
- a step of detecting eyeball information that is information about the eyeball on the basis of a light reception result at the step of receiving; and
- a step of generating image light on the basis of a detection result at the step of detecting and guiding the image light to the eyeball.

MODE(S) FOR CARRYING OUT THE INVENTION

Figure 1:
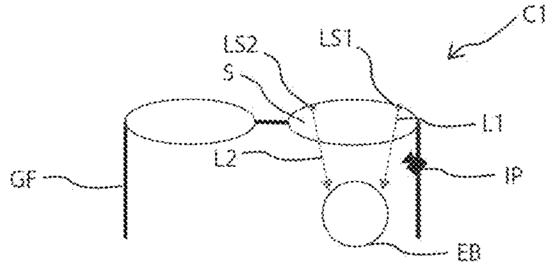
FIG. 1 A of FIG. 1 and B of FIG. 1 are views for describing an eyeball information detection apparatus according to Comparative Example 1.
Figure 1:
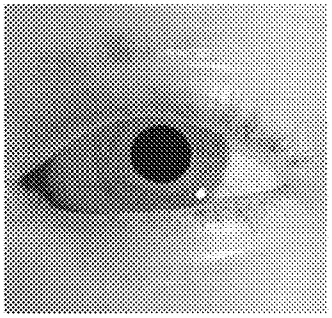

Hereinafter, favorable embodiments of the present technology will be described in detail with reference to the accompanying drawings. It should be noted that in the present specification and the drawings, components having substantially the same functional configurations will be denoted by the same reference signs and duplicate descriptions thereof will be omitted. The embodiments described below represent typical embodiments of the present technology. The scope of the present technology should not be understood narrowly due to these embodiments. In the present specification, even in a case where it is described that an eyeball information detection apparatus, a display apparatus, an eyeball information detection method, and a display method according to the present technology provide a plurality of effects, the eyeball information detection apparatus, the display apparatus, the eyeball information detection method, and the display method according to the present technology only need to provide at least one of the effects. The effects described in the present specification are merely exemplary and not limitative and other effects may be provided.

Moreover, descriptions will be given in the following order.

1. Introduction
2. Eyeball Information Detection Apparatuses According to Comparative Examples 1 to 3
3. Eyeball Information Detection Apparatuses According to Configuration Examples 1 to 3 of Present Technology
4. Eyeball Information Detection Apparatus According to Example 1 of Embodiment of Present Technology
5. Eyeball Information Detection Apparatus According to Example 2 of Embodiment of Present Technology
6. Eyeball Information Detection Apparatus According to Example 3 of Embodiment of Present Technology
7. Eyeball Information Detection Apparatus According to Example 4 of Embodiment of Present Technology 8. Eyeball Information Detection Apparatus According to Example 5 of Embodiment of Present Technology
9. Eyeball Information Detection Apparatus According to Example 6 of Embodiment of Present Technology
10. Eyeball Information Detection Apparatus According to Example 7 of Embodiment of Present Technology
11. Eyeball Information Detection Apparatus According to Example 8 of Embodiment of Present Technology
12. Eyeball Information Detection Apparatus According to Example 9 of Embodiment of Present Technology
13. Eyeball Information Detection Apparatus According to Example 10 of Embodiment of Present Technology
14. Eyeball Information Detection Apparatus According to Example 11 of Embodiment of Present Technology
15. Eyeball Information Detection Apparatus According to Example 12 of Embodiment of Present Technology
16. Eyeball Information Detection Apparatus According to Example 13 of Embodiment of Present Technology
17. Eyeball Information Detection Apparatus According to Example 14 of Embodiment of Present Technology
18. Eyeball Information Detection Apparatus According to Example 15 of Embodiment of Present Technology
19. Display Apparatus Including Eyeball Information Detection Apparatus According to Example 7 of Embodiment of Present Technology
20. Modified Examples of Present Technology <1. Introduction>

Eye sensing (sensing eyeball information) is expected to be used in various fields.

The eye sensing is expected to be used for brain sciences, bionics, medical sciences in research fields, technology transfer, eye gaze user interaction (UI), and the like by gaze tracking in industrial fields, and also for security using iris authentication. The eye sensing is also used for head-mounted displays (for AR/VR), which have been increasingly developed in recent years, foveated rendering, and expansion of a viewable area (eye box).

Along with such varied applications, needs for near-eye-type eye sensing are increasing in recent years. For example, near-eye-type eye tracking performs sensing in a state in which an image pickup element that picks up an image of a light source of non-visible light and an eye is set on a head-mounted jig (e.g., an eyeglass frame). Moreover, as the image pickup element is mentioned here, camera-based methods have been typically employed for eye sensing for many years. A pupil/cornea detection method of them is a typical gaze detection method. In this gaze detection method, it is important to distinguish corneal reflection light of irradiation light from a plurality of light sources and perform suitable labeling (ID) for improving the detection accuracy.

Here, a method of downsizing a head-mounted jig while discriminating corneal reflection light rays is considered. Downsizing the head-mounted jig shortens an eye relief. Therefore, for example, if a light source is arranged at a rim retaining a substrate in an eyeglass frame (equivalent to an eyeglass lens), light from the light source cannot enter an eye, and therefore the corneal reflection light rays cannot be captured.

In view of this, a configuration in which the light source is arranged on the substrate retained by the rim of the eyeglass frame has been proposed. However, in this configuration, the light source is located in the field-of-view, and therefore the appearance is impaired and it is difficult to provide a clear field-of-view.

Patent Literature 1 (Japanese Patent Application Laid-open No. 2003-225207) has been made in order to address this problem. In Patent Literature 1, an eye is irradiated with light from a light source through a reflection film (plane mirror) on a substrate retained by the rim of an eyeglass frame. However, in Patent Literature 1, a virtual image from the light source is positioned at a position relatively far from the light source as compared to the frame, and therefore the corneal reflection light rays are closer to each other on a picked-up image. It is thus disadvantageous for labeling with the corneal reflection light rays. That is, Patent Literature 1 has a room for improving detection accuracy.

In view of this, the inventor has developed an eyeball information detection apparatus according to the present technology as an eyeball information detection apparatus capable of improving the detection accuracy.

<2. Eyeball Information Detection Apparatuses According to Comparative Examples 1 to 3>

(Eyeball Information Detection Apparatus According to Comparative Example 1)

A of FIG. 1 is a view showing configurations and actions of an eyeball information detection apparatus C1 (near-eye-type) according to Comparative Example 1. B of FIG. 1 is a view showing a picked-up image picked up by the eyeball information detection apparatus C1 (with an eyeglass frame GF having a large rim).

In the eyeball information detection apparatus C1 according to Comparative Example 2, as shown in A of FIG. 1, an image pickup unit IP (e.g., a camera) is provided to a temple of the eyeglass frame GF and a plurality of (e.g., four) non-visible light sources LS1 and LS2 (only two non-visible light sources are shown in A of FIG. 1) is provided to the rim of the eyeglass frame GF (retaining portion retaining a substrate S).

In a case where the rim of the eyeglass frame GF is increased in size in order to secure a field-of-view, non-visible light rays L1 and L2 respectively emitted from the non-visible light sources LS1 and LS2 cannot be made incident upon a pupil of an eyeball EB and no Purkinje images can be picked up (see B of FIG. 1). On the other hand, in a case where the rim of the eyeglass frame GF is decreased in size, the non-visible light rays L1 and L2 can be made incident upon the pupil of the eyeball EB and Purkinje images can be picked up, but the field-of-view is limited.

That is, in the eyeball information detection apparatus C1 according to Comparative Example 1, there is a trade-off relationship between securing the field-of-view and picking up the Purkinje images.

It should be noted that for example if the respective non-visible light sources are arranged on the substrate S, not at the rim, Purkinje images can be picked up while securing the field-of-view. However, an unnecessary image is visually recognized and the appearance is impaired because the non-visible light sources, a wiring, and the like is located in the field-of-view.

(Eyeball Information Detection Apparatus According to Comparative Example 2)

Figure 2:
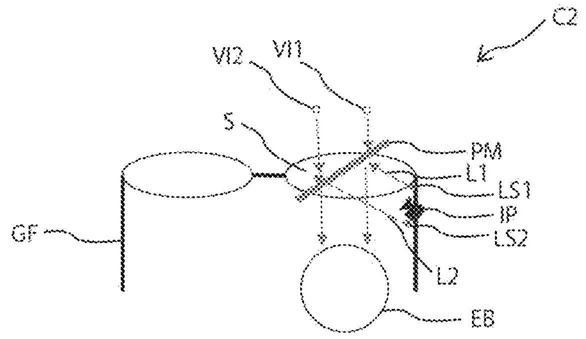
FIG. 2 A of FIG. 2 to C of FIG. 2 are views for describing an eyeball information detection apparatus according to Comparative Example 2.
Figure 2:
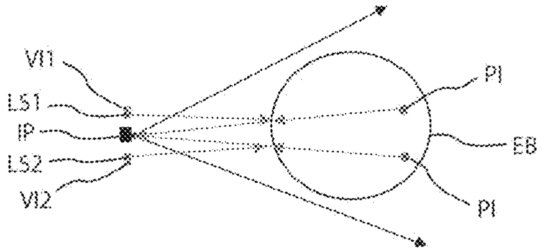
Figure 2:
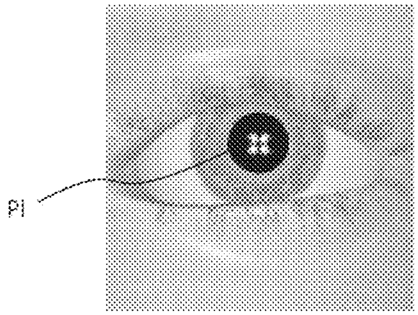

A of FIG. 2 is a view showing configurations and actions of an eyeball information detection apparatus C2 (near-eye-type) according to Comparative Example 2. B of FIG. 2 is an optical equivalent view of A of FIG. 2. C of FIG. 2 is a view showing a picked-up image picked up by the eyeball information detection apparatus C2 in A of FIG. 2.

In the eyeball information detection apparatus C2 according to Comparative Example 2, as shown in A of FIG. 2, a plurality of (e.g., four) non-visible light sources LS1 and LS2 (only two non-visible light sources are shown in A of FIG. 2) and an image pickup unit IP are provided to a temple of the eyeglass frame GF and a plane mirror PM (semi-transmissive mirror) is provided on a substrate S retained by an eyeglass frame GF.

In the eyeball information detection apparatus C2, the non-visible light ray L1 emitted from the non-visible light source LS1 is reflected on the plane mirror PM and made incident upon the pupil of the eyeball EB. At this time, a virtual image VI1 from the non-visible light source LS1 is formed at a position symmetric to the non-visible light source LS1 with respect to the plane mirror PM. The non-visible light ray L2 emitted from the non-visible light source LS2 is reflected on the plane mirror PM and made incident upon the pupil of the eyeball EB. At this time, a virtual image VI2 from the non-visible light source LS2 is formed at a position symmetric to the non-visible light source LS2 with respect to the plane mirror PM.

In Comparative Example 2, a distance between a reflection position of the non-visible light ray L1 on the plane mirror PM and the virtual image VI1 and a distance between a reflection position of the non-visible light ray L2 on the plane mirror PM and the virtual image VI2 are relatively long. Therefore, as shown in B of FIG. 2 and C of FIG. 2, positions of Purkinje images PI on the picked-up image of the image pickup unit IP are close to each other, the Purkinje images PI being corneal reflection images of the respective non-visible light rays. It is thus difficult to separate them.

In addition, in Comparative Example 2, aberration can be reduced because the plane mirror PM reflects the non-visible light rays, but downsizing is difficult because the plane mirror PM has a relatively large thickness.

(Eyeball Information Detection Apparatus According to Comparative Example 3)

Figure 3:
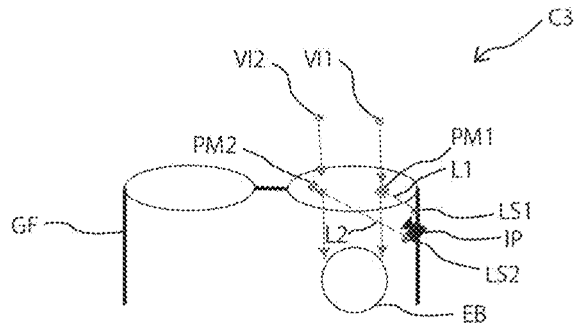
FIG. 3 A of FIG. 3 and B of FIG. 3 are views for describing an eyeball information detection apparatus according to Comparative Example 3.
Figure 3:
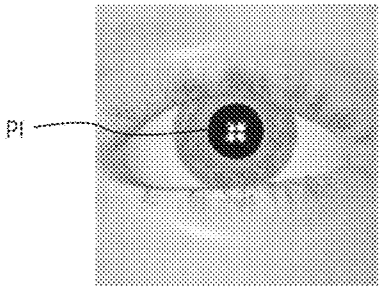

A of FIG. 3 is a view showing configurations and actions of an eyeball information detection apparatus C3 (near-eye-type) according to Comparative Example 3. B of FIG. 3 is a view showing a picked-up image picked up by the eyeball information detection apparatus C3.

In the eyeball information detection apparatus C3 according to Comparative Example 3, as shown in A of FIG. 3, a plurality of (e.g., four) non-visible light sources LS1 and LS2 (only two non-visible light sources are shown in A of FIG. 3) and an image pickup unit IP are provided to a temple of the eyeglass frame GF and a plurality of (e.g., four) compact plane mirrors PM1 and PM2 (both are semi-transmissive mirrors and only two plane mirrors are shown in A of FIG. 3) is provided to a substrate S retained by the rim of an eyeglass frame GF.

In the eyeball information detection apparatus C3, the non-visible light ray L1 emitted from the non-visible light source LS1 is reflected on the plane mirror PM1 and is made incident upon the pupil of the eyeball EB. At this time, a virtual image VI1 from the non-visible light source LS1 is formed at a position symmetric to the non-visible light source LS1 with respect to the plane mirror PM1. The non-visible light ray L2 emitted from the non-visible light source LS2 is reflected on the plane mirror PM2 and is made incident upon the pupil of the eyeball EB. At this time, a virtual image VI2 from the non-visible light source LS2 is formed at a position symmetric to the non-visible light source LS2 with respect to the plane mirror PM2.

In Comparative Example 3, a distance between the plane mirror PM1 and the virtual image VI1 and a distance between the plane mirror PM and the virtual image VI2 are relatively long. Therefore, as shown in B of FIG. 3, positions of Purkinje images PI on the picked-up image of the image pickup unit IP are close to each other, the Purkinje images PI being corneal reflection images of the respective non-visible light rays. It is thus difficult to separate them.

<3. Eyeball Information Detection Apparatuses According to Configuration Examples 1 to 3 of Present Technology>

(Eyeball Information Detection Apparatus According to Configuration Example 1 of Present Technology)

Figure 4:
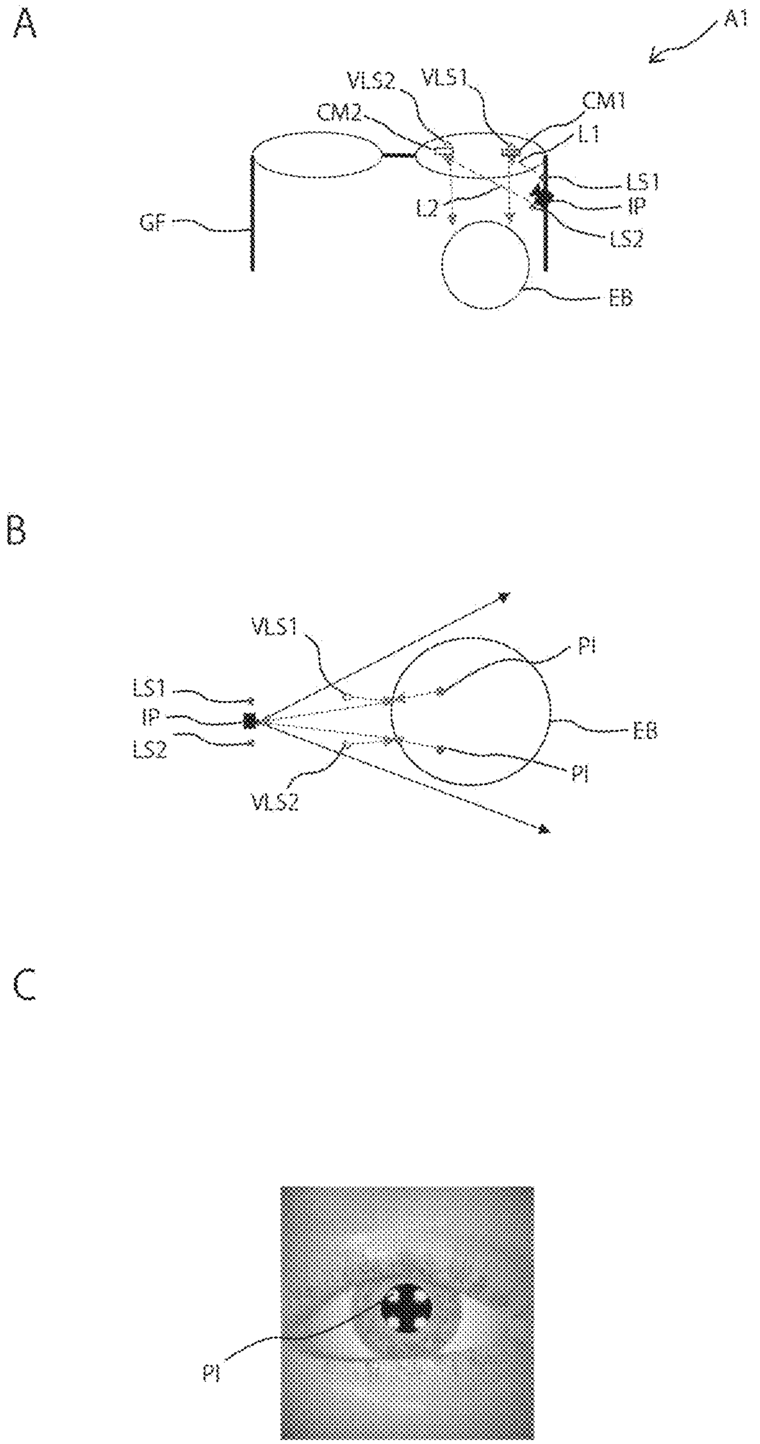
FIG. 4 A of FIG. 4 to C of FIG. 4 are views for describing Configuration Example 1 of an eyeball information detection apparatus according to the present technology.

A of FIG. 4 is a view showing configurations and actions of an eyeball information detection apparatus A1 (near-eye-type) according to Configuration Example 1 of the present technology. B of FIG. 4 is an optical equivalent view of A of FIG. 4. C of FIG. 4 is a view showing a picked-up image picked up by the eyeball information detection apparatus A1 in A of FIG. 4.

In the eyeball information detection apparatus A1 according to Configuration Example 1, as shown in A of FIG. 4, a plurality of (e.g., four) non-visible light sources LS1 and LS2 (only two non-visible light sources are shown in A of FIG. 4) and an image pickup unit IP are provided to a temple of the eyeglass frame GF and a plurality of (e.g., four) compact curved mirrors CM1 and CM2 (e.g., concave mirrors, convex mirrors, or the like and only two curved mirrors are shown in A of FIG. 4) is provided to a substrate S retained by the rim of an eyeglass frame GF.

In the eyeball information detection apparatus A1, the non-visible light ray L1 emitted from the non-visible light source LS1 is reflected on the curved mirror CM1 and is made incident upon the pupil of the eyeball EB. When the concave mirror CM1 is irradiated with the non-visible light ray L1, the concave mirror CM1 generates a virtual light source VLS1 of the non-visible light ray L1. The non-visible light ray L2 emitted from the non-visible light source LS2 is reflected on the curved mirror CM2 and is made incident upon the pupil of the eyeball EB. When the concave mirror CM2 is irradiated with the non-visible light ray L2, the concave mirror CM2 generates a virtual light source VLS2 of the non-visible light ray L2.

In Configuration Example 1, a distance between the curved mirror CM1 and the virtual light source VLS1 and a distance between the curved mirror CM2 and the virtual light source VLS2 are relatively short. Therefore, as shown in B of FIG. 4 and C of FIG. 4, positions of Purkinje images PI on the picked-up image of the image pickup unit IP are spaced apart from each other, the Purkinje images PI being corneal reflection images of the respective non-visible light rays. It is thus easy to separate them.

(Eyeball Information Detection Apparatus According to Configuration Example 2 of Present Technology)

Figure 5:
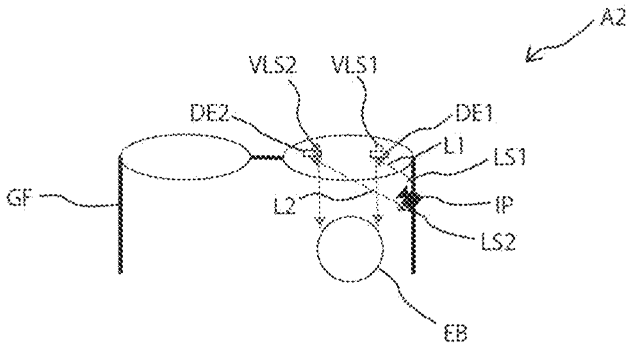
FIG. 5 A of FIG. 5 and B of FIG. 5 are views for describing Configuration Example 2 of the eyeball information detection apparatus according to the present technology.
Figure 5:
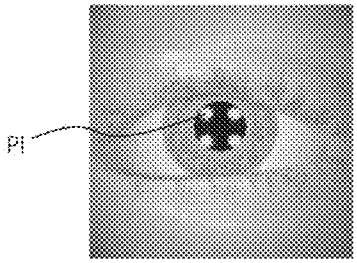

A of FIG. 5 is a view showing configurations and actions of an eyeball information detection apparatus A2 (near-eye-type) according to Configuration Example 2 of the present technology. B of FIG. 5 is a view showing a picked-up image picked up by the eyeball information detection apparatus A2 in A of FIG. 5.

In the eyeball information detection apparatus A2 according to Configuration Example 2, as shown in A of FIG. 5, a plurality of (e.g., four) non-visible light sources LS1 and LS2 (only two non-visible light sources are shown in A of FIG. 5) and an image pickup unit IP are provided to a temple of the eyeglass frame GF and a plurality of (e.g., four) compact diffusing elements DE1 and DE2 is provided to a substrate S retained by the rim of an eyeglass frame GF.

In the eyeball information detection apparatus A2, the non-visible light ray L1 emitted from the non-visible light source LS1 is diffused and reflected on the diffusing element DE1 and is made incident upon the pupil of the eyeball EB. When the diffusing element DE1 is irradiated with the non-visible light ray L1, the diffusing element DE1 generates a virtual light source VLS1 of the non-visible light ray LS1. The non-visible light ray L2 emitted from the non-visible light source LS2 is diffused and reflected on the diffusing element DE2 and is made incident upon the pupil of the eyeball EB. When the diffusing element DE2 is irradiated with the non-visible light ray L2, the diffusing element DE2 generates a virtual light source VLS2 of the non-visible light ray L2.

In Configuration Example 2, a distance between the diffusing element DE1 and the virtual light source VLS1 and a distance between the diffusing element DE2 and the virtual light source VLS2 are relatively short. Therefore, as shown in B of FIG. 5, positions of Purkinje images PI on the picked-up image of the image pickup unit IP are spaced apart from each other, the Purkinje images PI being corneal reflection images of the respective non-visible light rays. It is thus easy to separate them.

(Eyeball Information Detection Apparatus According to Configuration Example 3 of Present Technology)

Figure 6:
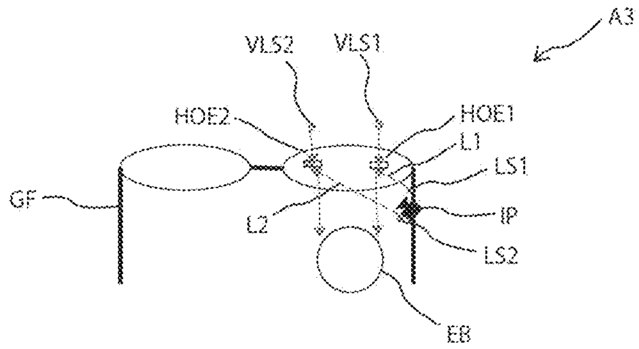
FIG. 6 A of FIG. 6 and B of FIG. 6 are views for describing Configuration Example 3 of the eyeball information detection apparatus according to the present technology.
Figure 6:
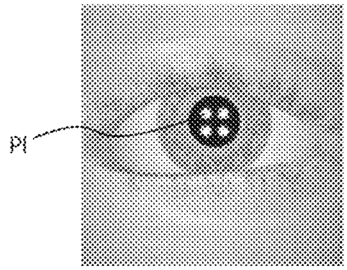

A of FIG. 6 is a view showing configurations and actions of an eyeball information detection apparatus A3 (near-eye-type) according to Configuration Example 3 of the present technology. B of FIG. 6 is a view showing a picked-up image picked up by the eyeball information detection apparatus A3 in A of FIG. 6.

In the eyeball information detection apparatus A3 according to Configuration Example 3, as shown in A of FIG. 6, a plurality of (e.g., four) non-visible light sources LS1 and LS2 (only two non-visible light sources are shown in A of FIG. 6) and an image pickup unit IP are provided to a temple of the eyeglass frame GF and a plurality of (e.g., four) compact hologram elements HOE1 and HOE2 is provided to a substrate S retained by the rim of an eyeglass frame GF.

In the eyeball information detection apparatus A3, the non-visible light ray L1 emitted from the non-visible light source LS1 is diffused and reflected on the hologram element HOE1 and is made incident upon the pupil of the eyeball EB. When the hologram element HOE1 is irradiated with the non-visible light ray L1, the hologram element HOE1 generates a virtual light source VLS1 of the non-visible light ray L1. The non-visible light ray L2 emitted from the non-visible light source LS2 is diffused and reflected on the hologram element HOE2 and is made incident upon the pupil of the eyeball EB. When the hologram element HOE2 is irradiated with the non-visible light ray L2, the hologram element HOE2 generates a virtual light source VLS2 of the non-visible light ray L2.

In Configuration Example 3, a distance between the hologram element HOE1 and the virtual light source VLS1 and a distance between the hologram element HOE2 and the virtual light source VLS2 are relatively short. Therefore, as shown in B of FIG. 6, positions of Purkinje images PI on the picked-up image of the image pickup unit IP are spaced apart from each other, the Purkinje images PI being corneal reflection images of the respective non-visible light rays. It is thus easy to separate them.

<4. Eyeball Information Detection Apparatus According to Example 1 of Embodiment of Present Technology>

Figure 7:
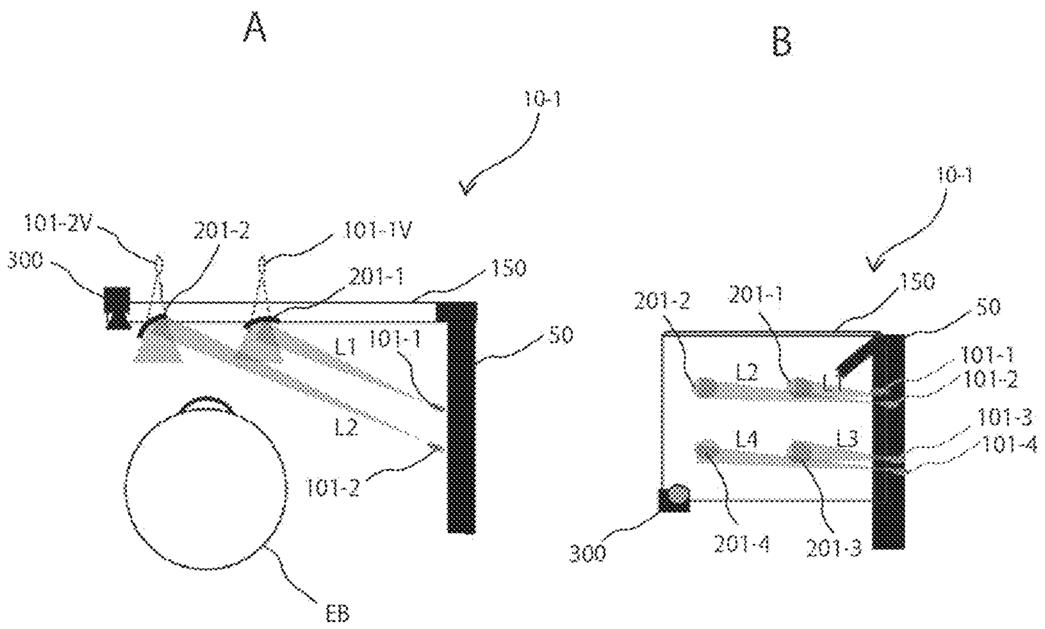
FIG. 7 A of FIG. 7 and B of FIG. 7 are views showing configurations of an eyeball information detection apparatus according to Example 1 of an embodiment of the present technology.
Figure 8:
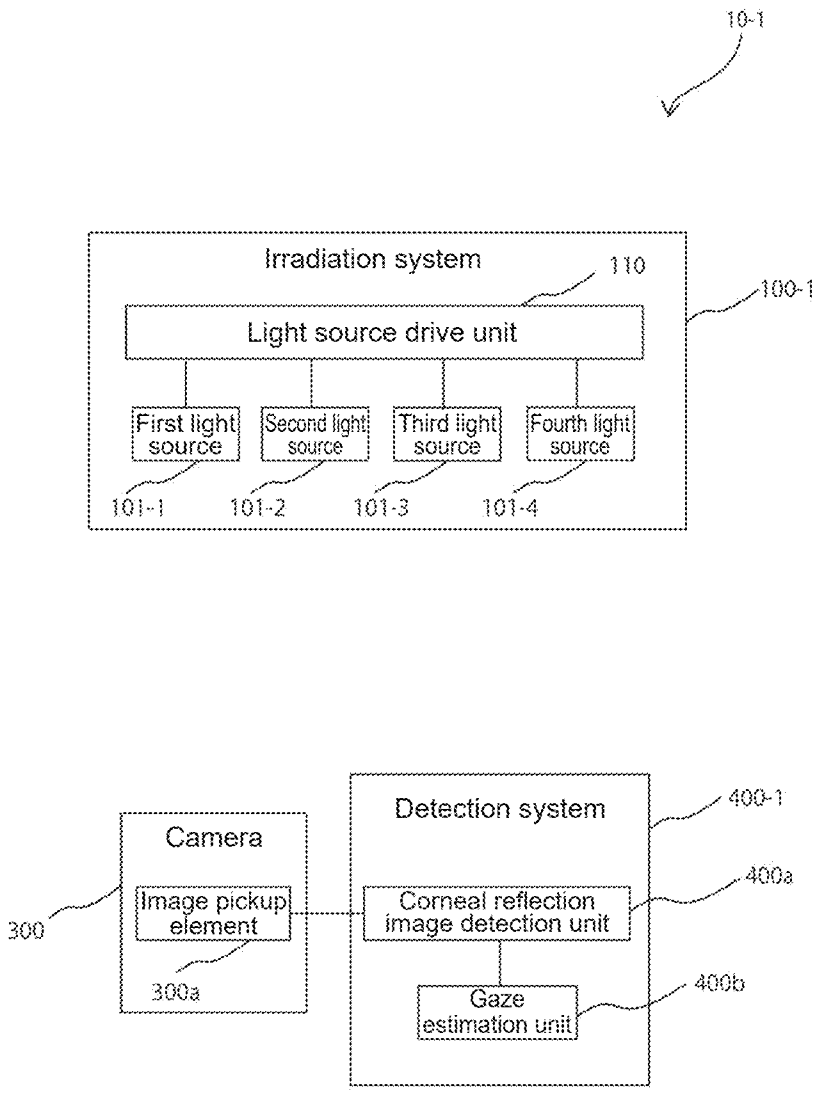
FIG. 8 A block diagram showing functions of the eyeball information detection apparatus according to Example 1 of the embodiment of the present technology.
Figure 9:
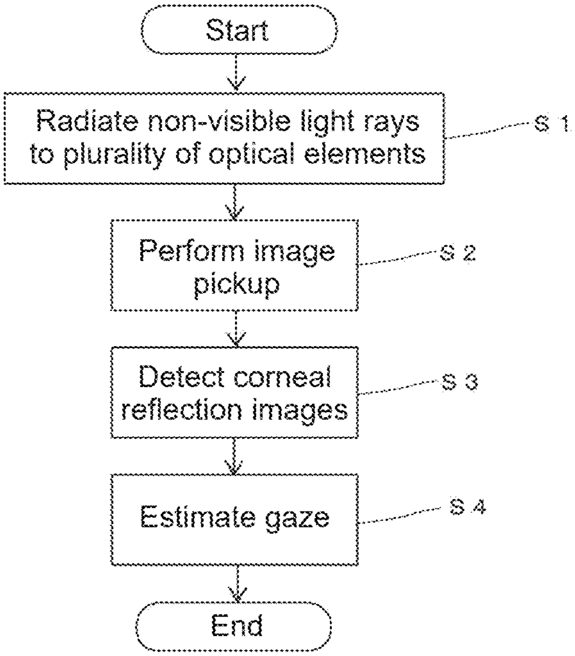
FIG. 9 A flowchart for describing operations of the eyeball information detection apparatus according to Example 1 of the embodiment of the present technology.

Hereinafter, an eyeball information detection apparatus according to Example 1 of the embodiment of the present technology will be described with reference to A of FIG. 7 to FIG. 9. A of FIG. 7 is a view of an eyeball information detection apparatus 10-1 according to Example 1 as viewed from above. B of FIG. 7 is a view of the eyeball information detection apparatus 10-1 according to Example 1 as viewed from the side of the eyeball EB. FIG. 8 is a block diagram showing functions of the eyeball information detection apparatus 10-1 according to Example 1. FIG. 9 is a flowchart for describing operations of the eyeball information detection apparatus 10-1 according to Example 1.

[Configurations of Eyeball Information Detection Apparatus]

The eyeball information detection apparatus 10-1 is an apparatus (eye sensing apparatus) that detects eyeball information that is information about the eyeball of the user. The eyeball information detection apparatus 10-1 is mounted to, for example, a head-mounted display (HMD) and used for eye tracking or the like. Here, the "eyeball information" can include, for example, at least one of an orientation of the eyeball, position and size of a pupil, or a position of an iris.

The eyeball information detection apparatus 10-1 includes, as shown in A of FIG. 7 and B of FIG. 7, a support member 50, a substrate 150, an irradiation system 100-1 (see FIG. 8), a plurality of (e.g., four) optical elements 201, a camera 300 (light reception system), and a detection system 400-1 (see FIG. 8).

(Support Member)

The support member 50 is, as an example, an eyeglass frame mounted on the head of the user. The support member 50 includes, as an example, a temple including an ear hook portion and a rim that is connected to the temple and retains the substrate 150. It should be noted that the support member 50 may be a rimless frame that directly retains the substrate 150 at the temple.

(Substrate)

The substrate 150 is, as an example, is provided to the support member 50 so as to face the eyeball EB of the user. That is, the substrate 150 faces the eyeball EB of the user in a state in which the support member 50 is mounted on the head of the user.

The substrate 150 is a resin plate or glass plate. The substrate 150 may be transparent, translucent, or opaque.

(Irradiation System)

The irradiation system 100-1 is, as an example, provided to the temple of the support member 50.

The irradiation system 100-1 includes a plurality of (e.g., four) light sources 101 (e.g., first to fourth light sources 101-1, 101-2, 101-3, and 101-4) and a light source drive unit 110 (light source driver) that drives the respective light sources 101 (see FIG. 8).

The plurality of light sources 101 emits non-visible light rays towards the substrate 150. The respective light sources 101 emit, for example, infrared light.

For example, light emitting diodes (LEDs), organic light emitting diodes (OLEDs), laser diodes (LDs), or the like can be used as the respective light sources 101.

(Optical Element)

The plurality of (e.g., four) optical elements 201 (e.g., the first to fourth optical elements 201-1 to 201-4)) is provided on the substrate 150 so that they are irradiated with non-visible light rays from the irradiation system 100-1, and generates virtual light sources of the non-visible light rays.

The first optical element 201-1 is arranged at a position of the substrate 150 on the optical path of the non-visible light ray L1 emitted from the first light source 101-1.

The second optical element 201-2 is arranged at a position of the substrate 150 on the optical path of the non-visible light ray L2 emitted from the second light source 101-2.

The third optical element 201-3 is arranged at a position of the substrate 150 on the optical path of the non-visible light ray L3 emitted from the third light source 101-3.

The fourth optical element 201-4 is arranged at a position of the substrate 150 on the optical path of the non-visible light ray L4 emitted from the fourth light source 101-4.

The respective optical elements 201 are, as an example, provided on a surface of the substrate 150 which is located on the side of the eyeball EB so as to face the eyeball EB.

For example, compact concave mirrors are used as the respective optical elements 201. It should be noted that for example a compact convex mirror may be used as at least one of the optical elements 201.

The plurality of (e.g., four) optical elements 201 is two-dimensionally arranged (e.g., arranged at four corners of a rectangle) in an in-plane direction of the substrate 150.

The non-visible light ray L1 from the first light source 101-1 is radiated to the first optical element 201-1. When the first optical element 201-1 is irradiated with the non-visible light ray L1, the first optical element 201-1 generates a virtual light source 101-1V of the non-visible light ray L1 on a side of the substrate 150 which is opposite to a side of the eyeball EB. The non-visible light ray L1 via the first optical element 201-1 is radiated to the eyeball EB while being spread at a predetermined angle-of-divergence so that it seems that it is emitted from the virtual light source 101-1V.

The non-visible light ray L2 from the second light source 101-2 is radiated to the second optical element 201-2. When the second optical element 201-2 is irradiated with the non-visible light ray L2, the second optical element 201-2 generates a virtual light source 101-2V of the non-visible light ray L2 on the side of the substrate 150 which is opposite to the side of the eyeball EB. The non-visible light ray L2 via the second optical element 201-2 is radiated to the eyeball EB while being spread at a predetermined angle-of-divergence so that it seems that it is emitted from the virtual light source 101-2V.

The non-visible light ray L3 from the third light source 101-3 is radiated to the third optical element 201-3. When the third optical element 201-3 is irradiated with the non-visible light ray L3, the third optical element 201-3 generates a virtual light source of the non-visible light ray L3 on the side of the substrate 150 which is opposite to the side of the eyeball EB. The non-visible light ray L3 via the third optical element 201-3 so that it seems that it is emitted from the virtual light source is radiated to the eyeball EB while being spread at a predetermined angle-of-divergence.

The non-visible light ray L4 from the fourth light source 101-4 is radiated to the fourth optical element 201-4. When the fourth optical element 201-4 is irradiated with the non-visible light ray L4, the fourth optical element 201-4 generates a virtual light source of the non-visible light ray L4 on the side of the substrate 150 which is opposite to the side of the eyeball EB. The non-visible light ray L4 via the fourth optical element 201-4 is radiated to the eyeball EB while being spread at a predetermined angle-of-divergence so that it seems that it is emitted from the virtual light source.

That is, the plurality of light sources 101 corresponds to the different optical elements of the plurality of optical elements 201. More specifically, the plurality of light sources 101 individually corresponds to the plurality of optical elements 201.

(Light Reception System)

The camera 300 as the light reception system receives (captures) non-visible light rays (corneal reflection light rays) reflected on the eyeball EB via the respective optical elements 201 and outputs the light reception result (image pickup result) to the detection system 400-1.

The camera 300 is, as an example, provided to a position deviated by a certain amount from a position of the substrate 150 which is opposite to the eyeball EB so that the eyeball EB is located in its angle-of-view.

The camera 300 has an image pickup element 300*a* (e.g., an image sensor) as a light reception element (see FIG. 8). The camera 300 may further include a light reception optical system having a light reception lens that forms non-visible light rays reflected on the eyeball EB as images on the image pickup element 300*a*.

The image pickup element 300*a* receives non-visible light rays reflected on the eyeball EB at a plurality of pixels, photoelectrically converts them on a pixel-by-pixel basis, and outputs captured image data constituted by electrical signals to the detection system 400-1.

(Detection System)

The detection system 400-1 detects eyeball information (e.g., an orientation of the eyeball EB) that is the information about the eyeball EB on the basis of the image pickup result (captured image data) of the camera 300.

The detection system 400-1 includes a corneal reflection image detection unit 400*a* and a gaze estimation unit 400*b* (see FIG. 8). The detection system 400-1 is realized for example by hardware including a CPU, a chip set, and the like.

The corneal reflection image detection unit 400*a* detects, from the captured image data from the image pickup element 300*a*, Purkinje images that are images (corneal reflection images) of non-visible light rays (corneal reflection light rays) reflected on the eyeball EB and outputs the detection result to the gaze estimation unit 400*b*.

The gaze estimation unit 400*b* estimates a gaze which is an orientation of the eyeball EB on the basis of the detection result from the corneal reflection image detection unit 400*a* and outputs the estimation result.

[Operations of Eyeball Information Detection Apparatus]

Hereinafter, operations of the eyeball information detection apparatus 10-1 according to Example 1 (eyeball information detection method using the eyeball information detection apparatus 10-1) will be described with reference to the flowchart in FIG. 9.

In first Step S1, the irradiation system 100-1 radiates non-visible light rays to the plurality of (e.g., four) optical elements 201. Specifically, the light source drive unit 110 drives (lights up) the first to fourth light sources 101-1 to 101-4. Accordingly, the non-visible light rays emitted from the respective light sources 101 are radiated to the corresponding optical elements 201 and the optical elements 201 generate virtual light sources. The non-visible light rays via the optical elements 201 are radiated to the eyeball EB and reflected on the eyeball EB.

In next Step S2, the camera 300 performs image pickup. Specifically, the image pickup element 300*a* captures reflection light rays (corneal reflection light rays) on the eyeball EB of the non-visible light rays via the respective optical elements 201, and outputs captured image data which is the obtained image pickup result to the corneal reflection image detection unit 400*a*.

In next Step S3, the detection system 400-1 detects corneal reflection images (Purkinje images). Specifically, the corneal reflection image detection unit 400*a* detects high-luminance images on the captured image data from the image pickup element 300*a* as the corneal reflection images. At this time, on the captured image data, a plurality of corneal reflection images corresponding to the plurality of optical elements 201 is detected in a state spaced apart from each other (see C of FIG. 4), and they can be separated from each other with high accuracy.

In next Step S4, the detection system 400-1 estimates a gaze. Specifically, the gaze estimation unit 400*b* calculates a gaze which is an orientation of the eyeball EB by predetermined arithmetic operations on the basis of positions of the corneal reflection images detected by the corneal reflection image detection unit 400*a* and outputs the obtained calculation result.

[Effects of Eyeball Information Detection Apparatus and Eyeball Information Detection Method]

The eyeball information detection apparatus 10-1 according to Example 1 of the embodiment of the present technology includes the support member 50 that is mounted on the head of the user, the substrate 150 provided to the support member 50 so as to face the eyeball EB of the user, the irradiation system 100-1 that is provided to the support member 50 and includes the at least one light source 101 that emits non-visible light rays towards the substrate 150, the plurality of optical elements 201 that is provided on the substrate 150 so that they are irradiated with the non-visible light rays, generates the virtual light sources of the non-visible light rays, and is not plane mirrors, the camera 300 (light reception system) that receives the non-visible light rays reflected on the eyeball EB via the plurality of optical elements 201 and includes the image pickup element 300*a* (light reception element), and the detection system 400-1 that detects the eyeball information that is the information about the eyeball EB on the basis of the image pickup result from the camera 300 (output from the light reception system).

In the eyeball information detection apparatus 10-1, a plurality of corneal reflection images corresponding to the plurality of optical elements 201 can be separated from each other with high accuracy in the image pickup result (on the picked-up image) of the camera 300, and therefore the eyeball information (e.g., the gaze) can be detected with high accuracy.

As a result, in accordance with the eyeball information detection apparatus 10-1, an eyeball information detection apparatus capable of improving the detection accuracy can be provided.

In the eyeball information detection apparatus 10-1, the corneal reflection images can be separated from each other with high accuracy even if the distance (eye relief) between the substrate 150 and the eyeball EB is short, and therefore an eyeball information detection apparatus that is compact and has high detection accuracy can be realized.

The plurality of optical elements 201 includes at least three (e.g., four) optical elements 201 two-dimensionally arranged in the in-plane direction of the substrate 150. Accordingly, the eyeball information can be detected with high accuracy with a relatively small amount of arithmetic operation for a relatively short arithmetic operation time.

The at least one light source 101 is the plurality of light sources 101. Accordingly, the plurality of optical elements 201 can be relatively easily irradiated with the non-visible light rays, respectively.

The plurality of light sources 101 corresponds to the different optical elements of the plurality of optical elements 201. Accordingly, the plurality of optical elements 201 can be reliably irradiated with the non-visible light rays, respectively.

The plurality of light sources 101 individually corresponds to the plurality of optical elements 201. Accordingly, the plurality of optical elements 201 can be more reliably irradiated with the non-visible light rays, respectively.

The camera 300 as the light reception system is provided on the substrate 150. Accordingly, the non-visible light rays (corneal reflection light rays) reflected on the eyeball EB can be directly captured with high accuracy.

The support member 50 includes the temple including the ear hook portion and the plurality of light sources 101 is provided to the temple. Accordingly, the respective light sources 101 and a wiring therefor can be prevented from entering the field-of-view of the user.

The respective optical elements 201 are a reflective-type. Accordingly, the non-visible light rays radiated to the corresponding optical elements 201 from the respective light sources 101 provided to the temple of the support member 50 can be bent back and guided to the eyeball EB.

The respective optical elements 201 are concave mirrors. Accordingly, the respective optical elements 201 are capable of generating the virtual light sources of the radiated non-visible light rays at positions relatively close to the optical elements 201.

It should be noted that the respective optical elements 201 may be convex mirrors or diffusers in place of the concave mirrors. The plurality of optical elements 201 may include at least two of a concave mirror, a convex mirror, and a diffuser.

The eyeball information detection method using the eyeball information detection apparatus 10-1 according to Example 1 includes a step of radiating the non-visible light rays to the plurality of (e.g., four) optical elements 201 provided on the substrate 150 so as to face the eyeball EB of the user and generating the virtual light sources of the non-visible light rays, a step of receiving (capturing) the non-visible light rays reflected on the eyeball EB via the optical elements 201, and a step of detecting the eyeball information that is the information about the eyeball EB on the basis of the light reception result (image pickup result) at the step of receiving (capturing).

In this eyeball information detection method, a plurality of corneal reflection images corresponding to the plurality of optical elements 201 can be separated from each other with high accuracy in the image pickup result (on the picked-up image), and therefore the eyeball information (e.g., the gaze) can be detected with high accuracy.

As a result, in accordance with this eyeball information detection method, the eyeball information can be detected with high accuracy.

<5. Eyeball Information Detection Apparatus According to Example 2 of Embodiment of Present Technology>

Figure 10:
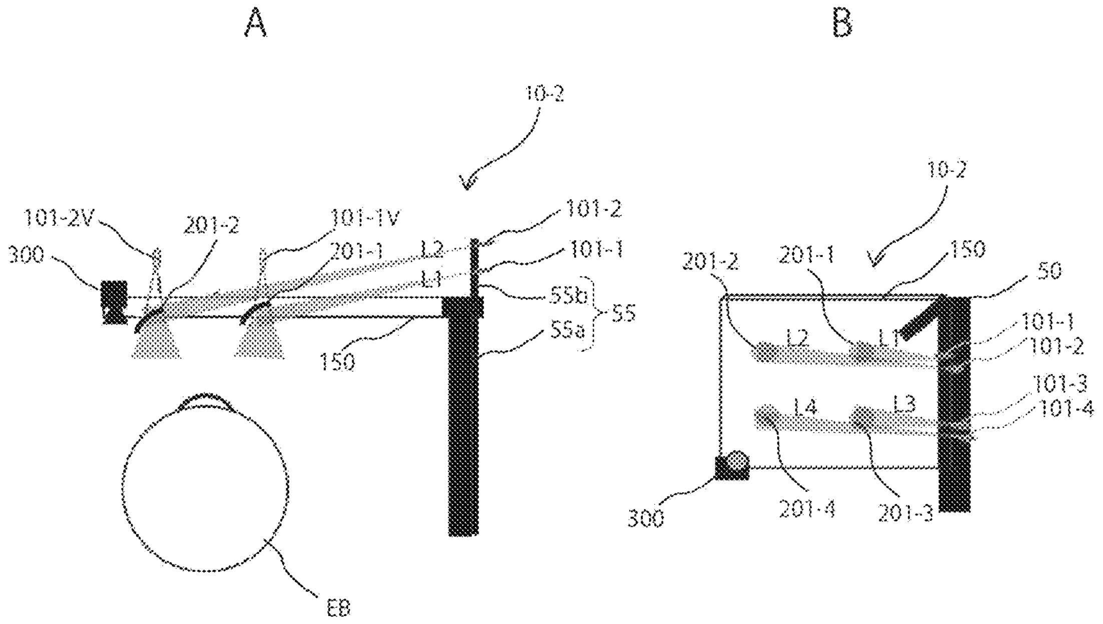
FIG. 10 A of FIG. 10 and B of FIG. 10 are views showing configurations of an eyeball information detection apparatus according to Example 2 of the embodiment of the present technology.

Hereinafter, an eyeball information detection apparatus according to Example 2 of the embodiment of the present technology will be described with reference to A of FIG. 10 and B of FIG. 10. A of FIG. 10 is a view of an eyeball information detection apparatus 10-2 according to Example 2 as viewed from above. B of FIG. 10 is a view of the eyeball information detection apparatus 10-2 according to Example 2 as viewed from the side of the eyeball EB.

As shown in A of FIG. 10 and B of FIG. 10, the eyeball information detection apparatus 10-2 according to Example 2 has configurations substantially similar to those of the eyeball information detection apparatus 10-1 according to Example 1 except for the fact that a support member 55 (e.g., an eyeglass frame) includes a temple including an ear hook portion 55*a* and an extension portion 55*b* that extends to a side of the substrate 150 which is opposite to a side of the ear hook portion 55*a* and a plurality of light sources 101 (e.g., first to fourth light sources 101-1 to 101-4) is provided to the extension portion 55*b*.

The substrate 150 is, as an example, transparent to light emission wavelengths of at least the respective light sources 101 and transmits non-visible light rays from the light sources 101.

In the eyeball information detection apparatus 10-2, the non-visible light rays emitted from the respective light sources 101 are radiated to the corresponding optical elements 201 while passing through the substrate 150. When the optical elements 201 are irradiated with the non-visible light rays, the optical elements 201 generate virtual light sources of the non-visible light rays. The non-visible light rays via the optical elements 201 are radiated to the eyeball EB while being spread at a predetermined angle-of-divergence.

In accordance with the eyeball information detection apparatus 10-2 according to Example 2, effects similar to those of the eyeball information detection apparatus 10-1 according to Example 1 are provided.

<6. Eyeball Information Detection Apparatus According to Example 3 of Embodiment of Present Technology>

Figure 11:
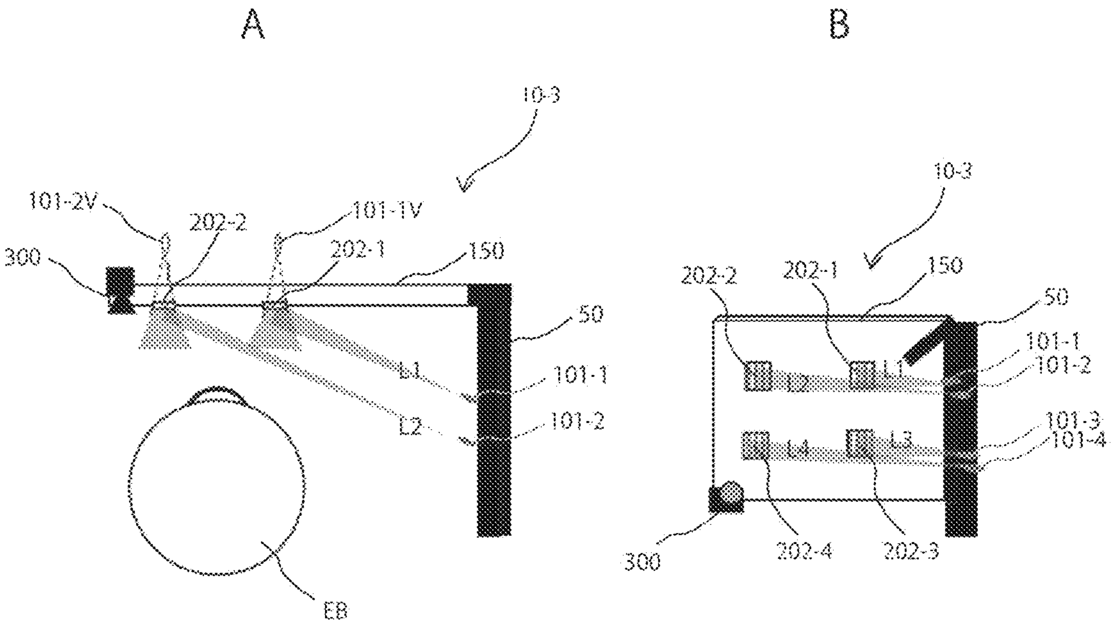
FIG. 11 A of FIG. 11 and B of FIG. 11 are views showing configurations of an eyeball information detection apparatus according to Example 3 of the embodiment of the present technology.

Hereinafter, an eyeball information detection apparatus according to Example 3 of the embodiment of the present technology will be described with reference to A of FIG. 11 and B of FIG. 11 and A of FIG. 42 to C of FIG. 42. A of FIG. 11 is a view of an eyeball information detection apparatus 10-3 according to Example 3 as viewed from above. B of FIG. 11 is a view of the eyeball information detection apparatus 10-3 according to Example 3 as viewed from the side of the eyeball EB.

The eyeball information detection apparatus 10-3 according to Example 3 has configurations substantially similar to those of the eyeball information detection apparatus 10-1 according to Example 1 except for the fact that respective optical elements 202 are diffractive elements with a non-uniform pitch (e.g., diffraction gratings with a non-uniform grating pitch).

The respective optical elements 202 as the diffractive elements are included in diffracted optical elements (DOEs) in a broad sense.

The respective optical elements 202 are, as an example, holographic optical elements (HOEs).

Figure 42:
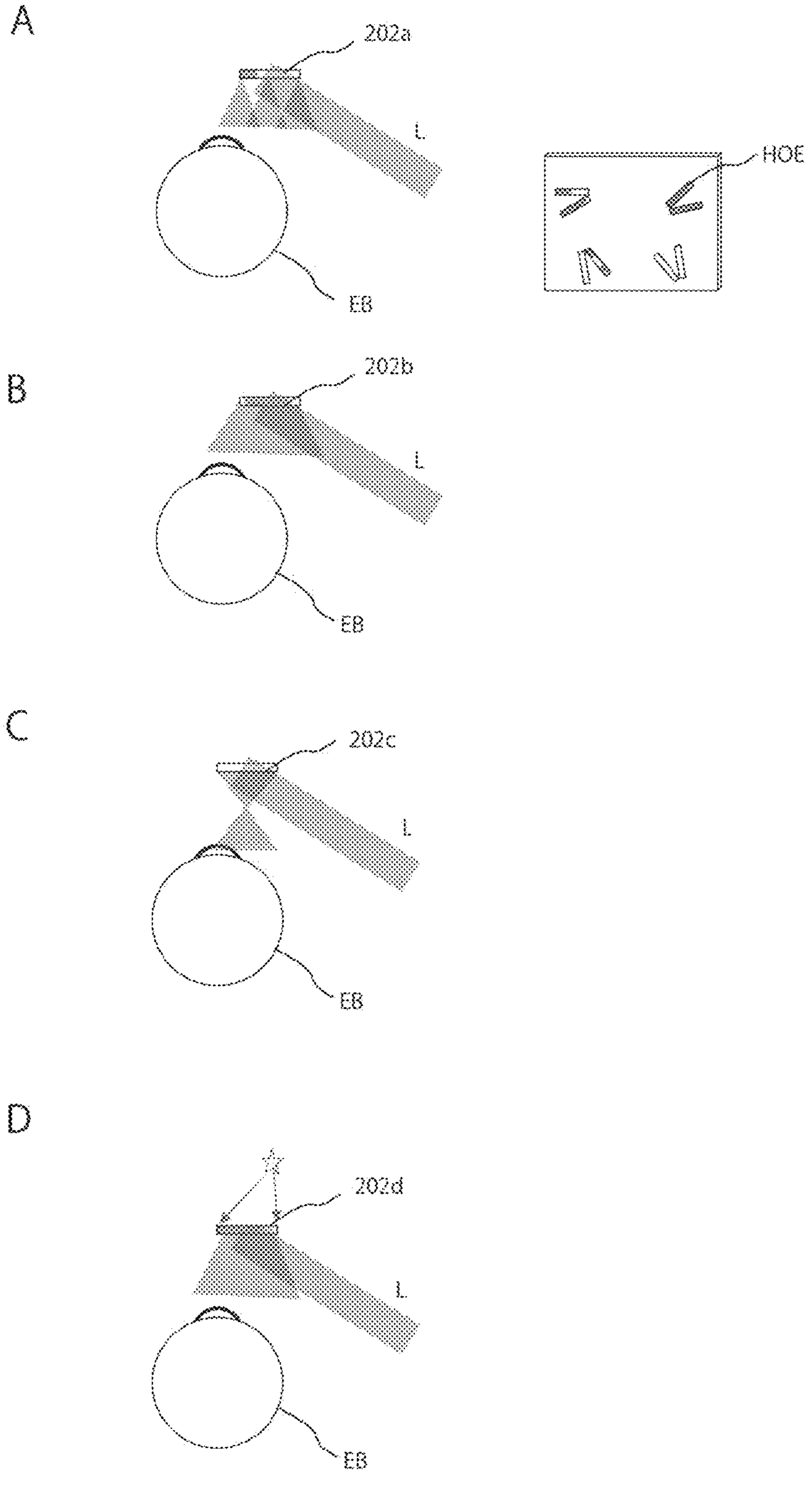
FIG. 42 A of FIG. 42 to D of FIG. 42 are views respectively showing a diffusion-type HOE, a concave mirror-type HOE, a convex mirror-type HOE, and a wavefront reconstruction-type HOE.

The optical elements 202 as the HOEs include, for example, diffuser-type HOEs 202*a* (diffusers in a broad sense (see A of FIG. 42)), concave mirror-type HOEs 202*b* (concave mirrors in a broad sense (see B of FIG. 42)), convex mirror-type HOEs 202*c* (convex mirrors in a broad sense (see C of FIG. 42)), and wavefront reconstruction-type HOEs 202*d* (see D of FIG. 42). In A of FIG. 42 to D of FIG. 42, the reference sign L denotes non-visible light rays radiated to the HOEs.

The diffusion-type HOEs are realized by illuminating one-dimensional shaped HOEs in a two-dimensional pattern as shown in the right picture of A of FIG. 42. The diffusion-type HOEs are effective in that it can perform uniform illumination while the light emission area (virtual light source area) increases.

The concave mirror-type HOEs 202*b* and the convex mirror-type HOEs 202*c* are effective in that the light emission points (virtual light sources) can be narrowed and the positions of the Purkinje images can be detected with high accuracy.

The wavefront reconstruction-type HOEs 202*d* are advantageous for separating the Purkinje images by distinguishing the light emission points (virtual light sources) by the shapes.

In accordance with the eyeball information detection apparatus 10-3 according to Example 3, the optical elements 202 can be reduced in thickness. Therefore, the substrate 150 can also be reduced in thickness (as a result, for example, the transparency can be improved) and the virtual light sources can be optically controlled. Therefore, a further improvement in the detection accuracy can be achieved.

It should be noted that although diffractive elements having a single pitch can also be used as the respective optical elements 202, it may be difficult to separate the Purkinje images from each other because of a significant astigmatism influence in this case.

<7. Eyeball Information Detection Apparatus According to Example 4 of Embodiment of Present Technology>

Figure 12:
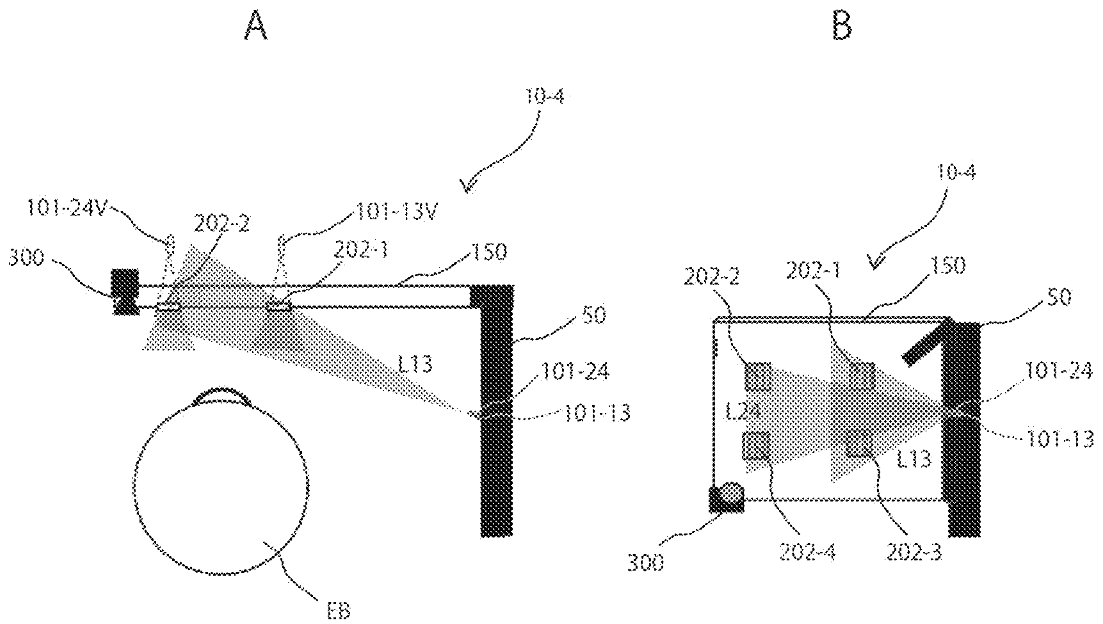
FIG. 12 A of FIG. 12 and B of FIG. 12 are views showing configurations of an eyeball information detection apparatus according to Example 4 of the embodiment of the present technology.
Figure 13:
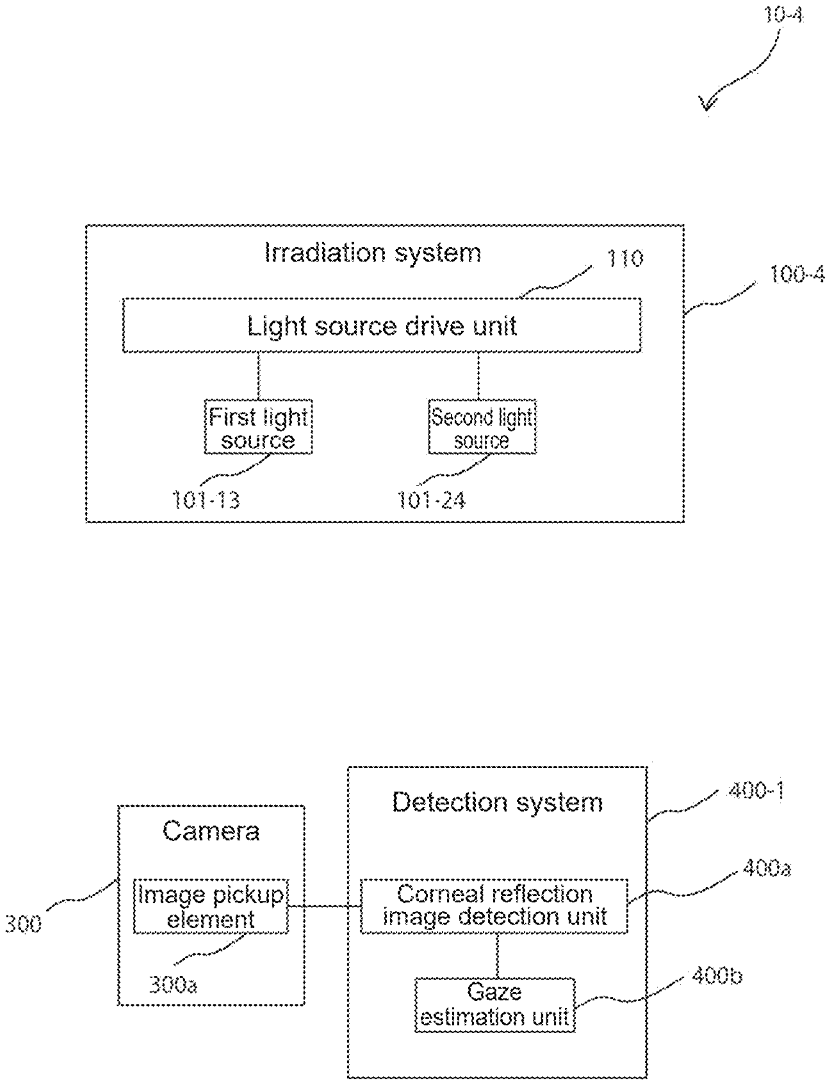
FIG. 13 A block diagram showing functions of the eyeball information detection apparatus according to Example 4 of the embodiment of the present technology.

Hereinafter, an eyeball information detection apparatus according to Example 4 of the embodiment of the present technology will be described with reference to A of FIG. 12, B of FIG. 12, and FIG. 13. A of FIG. 12 is a view of an eyeball information detection apparatus 10-4 according to Example 4 as viewed from above. B of FIG. 12 is a view of the eyeball information detection apparatus 10-4 according to Example 4 as viewed from the side of the eyeball EB. FIG. 13 is a block diagram showing functions of the eyeball information detection apparatus 10-4 according to Example 4.

As shown in A of FIG. 12, B of FIG. 12, and FIG. 13, the eyeball information detection apparatus 10-4 according to Example 4 has configurations substantially similar to those of the eyeball information detection apparatus 10-3 according to Example 3 except for the fact that a plurality of (e.g., two) light sources 101 in an irradiation system 100-4 includes light sources 101 corresponding to at least two (e.g., two) optical elements 202 of a plurality of (e.g., four) optical elements 202.

That is, in the eyeball information detection apparatus 10-4, the number of optical elements 202 is larger than the number of light sources 101.

To be specific, in the eyeball information detection apparatus 10-4, a first light source 101-13 radiates a non-visible light ray L13 to first and third optical elements 202-1 and 202-3 arranged spaced apart from each other on upper and lower sides. When each of the first and third optical elements 202-1 and 202-3 is irradiated with the non-visible light ray L13, each of the first and third optical elements 202-1 and 202-3 generates a virtual light source 101-13V of the non-visible light ray L13. The non-visible light rays L13 via the first and third optical elements 202-1 and 202-3 are radiated to the eyeball EB while being spread at a predetermined angle-of-divergence.

In the eyeball information detection apparatus 10-4, a second light source 101-24 radiates a non-visible light ray L24 to second and fourth optical elements 202-2 and 202-4 arranged spaced apart from each other on the upper and lower sides. When each of the second and fourth optical elements 202-2 and 202-4 is irradiated with the non-visible light ray L24, each of the second and fourth optical elements 202-2 and 202-4 generates a virtual light source 101-24V of the non-visible light ray L24. The non-visible light rays L24 via the second and fourth optical elements 202-2 and 202-4 are radiated to the eyeball EB while being spread at a predetermined angle-of-divergence.

In accordance with the eyeball information detection apparatus 10-4 according to Example 4, effects similar to those of the eyeball information detection apparatus 10-3 according to Example 3 are provided and the number of components (number of light sources) can be reduced.

It should be noted that the eyeball information detection apparatus 10-4 may include a single light source corresponding to the plurality of (e.g., four) optical elements. In this case, the number of components can be further reduced.

<8. Eyeball Information Detection Apparatus According to Example 5 of Embodiment of Present Technology>

Figure 14:
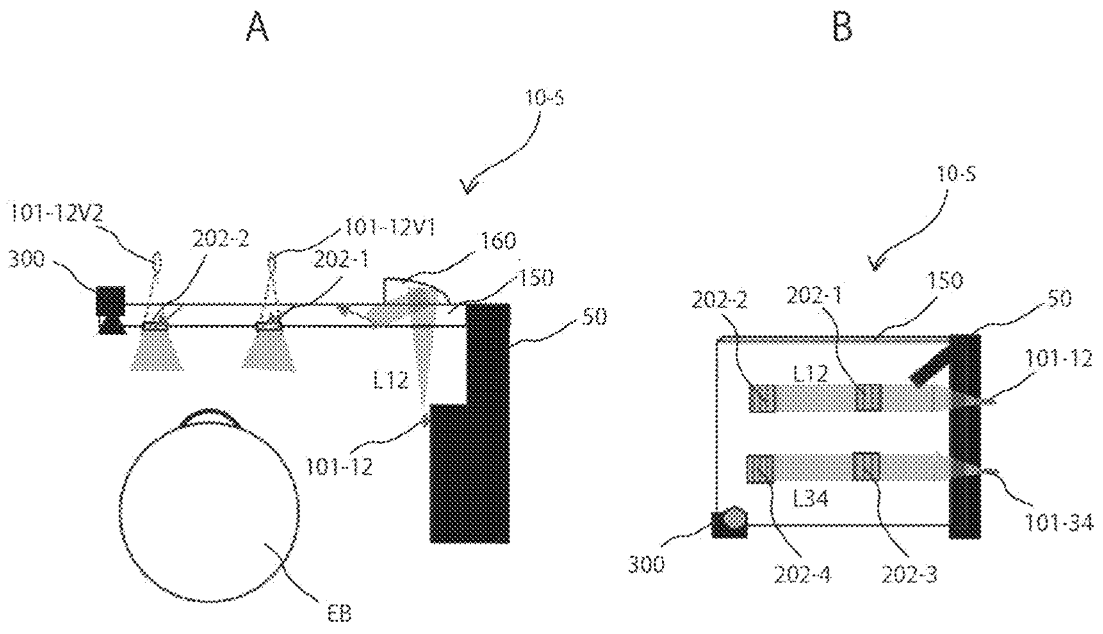
FIG. 14 A of FIG. 14 and B of FIG. 14 are views showing configurations of an eyeball information detection apparatus according to Example 5 of the embodiment of the present technology.
Figure 15:
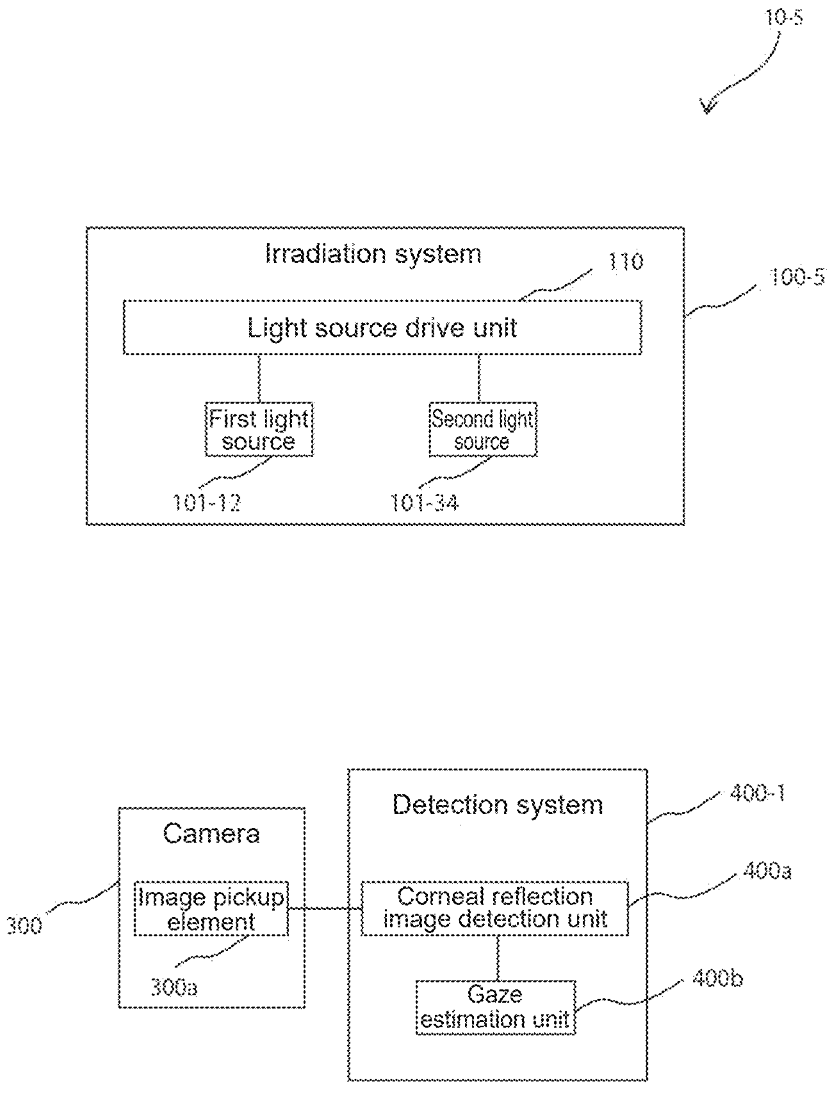
FIG. 15 A block diagram showing functions of the eyeball information detection apparatus according to Example 5 of the embodiment of the present technology.

Hereinafter, an eyeball information detection apparatus according to Example 5 of the embodiment of the present technology will be described with reference to A of FIG. 14, B of FIG. 14, and FIG. 15. A of FIG. 14 is a view of an eyeball information detection apparatus 10-5 according to Example 5 as viewed from above. B of FIG. 14 is a view of the eyeball information detection apparatus 10-5 according to Example 5 as viewed from the side of the eyeball EB. FIG. 15 is a block diagram showing functions of the eyeball information detection apparatus 10-5 according to Example 5.

As shown in A of FIG. 14 to FIG. 15, the eyeball information detection apparatus 10-5 according to Example 5 has configurations substantially similar to those of the eyeball information detection apparatus 10-4 according to Example 4 except for the fact that each of a plurality of (e.g., two) light sources 101 in an irradiation system 100-5 corresponds to at least two (e.g., two) optical elements 202 of a plurality of (e.g., four) optical elements 202 and non-visible light rays from the plurality of light sources 101 are respectively propagated inside the substrate 150 and are radiated to the at least two (e.g., two) corresponding optical elements 202.

In the eyeball information detection apparatus 10-5, a first light source 101-12 corresponds to first and second optical elements 202-1 and 202-2 and a second light source 101-34 corresponds to third and fourth optical elements 202-3 and 202-4. The first and second light sources 101-12 and 101-34 are arranged on the upper and lower sides. More specifically, the first light source 101-12 is arranged on the upper side and the second light source 101-34 is arranged on the lower side.

As an example, transmissive-type diffractive elements are used as the first and second optical elements 202-1 and 202-2. The respective optical elements 202 are, as an example, provided on the surface of the substrate 150 which is located on the side of the eyeball EB.

It should be noted that reflective-type diffractive elements may be used as the first and second optical elements 202-1 and 202-2. It should be noted that in this case, the respective optical elements 202 (respective diffractive elements) need to be provided on a surface of the substrate 150 which is on the side opposite to the side of the eyeball EB.

A prism 160 is provided on the surface of the substrate 150 which is on the side opposite to the side of the eyeball EB. The prism 160 makes non-visible light rays that have been emitted from the respective light sources 101 and have passed through the substrate 150 incident upon the substrate 150, satisfying conditions for total internal reflection inside the substrate 150 (at an angle-of-incidence that allows total internal reflection inside the substrate 150).

That is, in the eyeball information detection apparatus 10-5, the substrate 150 is used as a light guiding plate.

A non-visible light ray L12 that has been emitted from the first light source 101-12 and has been made incident upon the substrate 150 via the substrate 150 and the prism 160 in the stated order is propagated while being totally internally reflected inside the substrate 150 and is sequentially radiated to the first and second optical elements 202-1 and 202-2. When the first optical element 202-1 is irradiated with the non-visible light ray L12, the first optical element 202-1 generates a virtual light source 101-12V1. The non-visible light ray L12 radiated to the first optical element 202-1 is transmitted and diffracted towards the eyeball EB. When the second optical element 202-2 is irradiated with the non-visible light ray L12, the second optical element 202-2 generates a virtual light source 101-12V2. The non-visible light ray L12 radiated to the second optical element 202-2 is transmitted and diffracted towards the eyeball EB.

A non-visible light ray L34 that has been emitted from the second light source 101-34 and has been made incident upon the substrate 150 via the substrate 150 and the prism 160 in the stated order is propagated while being totally internally reflected inside the substrate 150 and is sequentially radiated to the third and fourth optical elements 202-3 and 202-4. When the third optical element 202-3 is irradiated with the non-visible light ray L34, the third optical element 202-3 generates a virtual light source. The non-visible light ray L34 radiated to the third optical element 202-3 is transmitted and diffracted towards the eyeball EB. When the fourth optical element 202-4 is irradiated with the non-visible light ray L34, the fourth optical element 202-4 generates a virtual light source. The non-visible light ray L34 radiated to the fourth optical element 202-4 is transmitted and diffracted towards the eyeball EB.

In accordance with the eyeball information detection apparatus 10-5 according to Example 5, effects similar to those of the eyeball information detection apparatus 10-4 according to Example 4 are provided and the non-visible light rays from the respective light sources 101 are propagated inside the substrate 150 and are made incident upon the eyeball EB via the corresponding optical elements 202. Therefore, the eye relief can be further shortened, further downsizing can be achieved, and the light use efficiency can be improved.

<9. Eyeball Information Detection Apparatus According to Example 6 of Embodiment of Present Technology>

Figure 16:
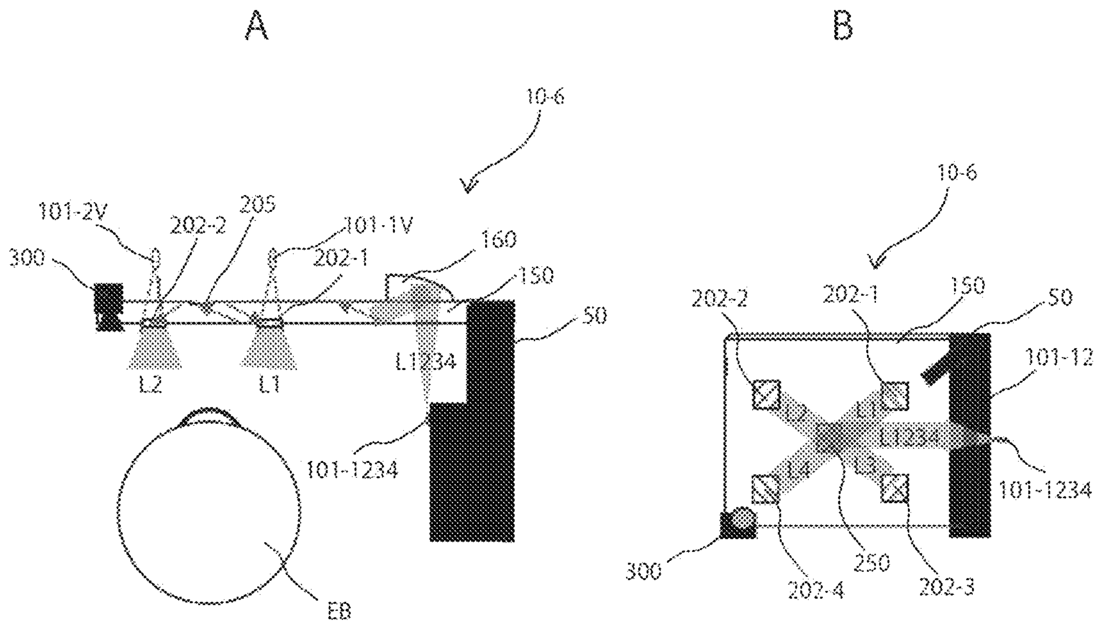
FIG. 16 A of FIG. 16 and B of FIG. 16 are views showing configurations of an eyeball information detection apparatus according to Example 6 of the embodiment of the present technology.
Figure 17:
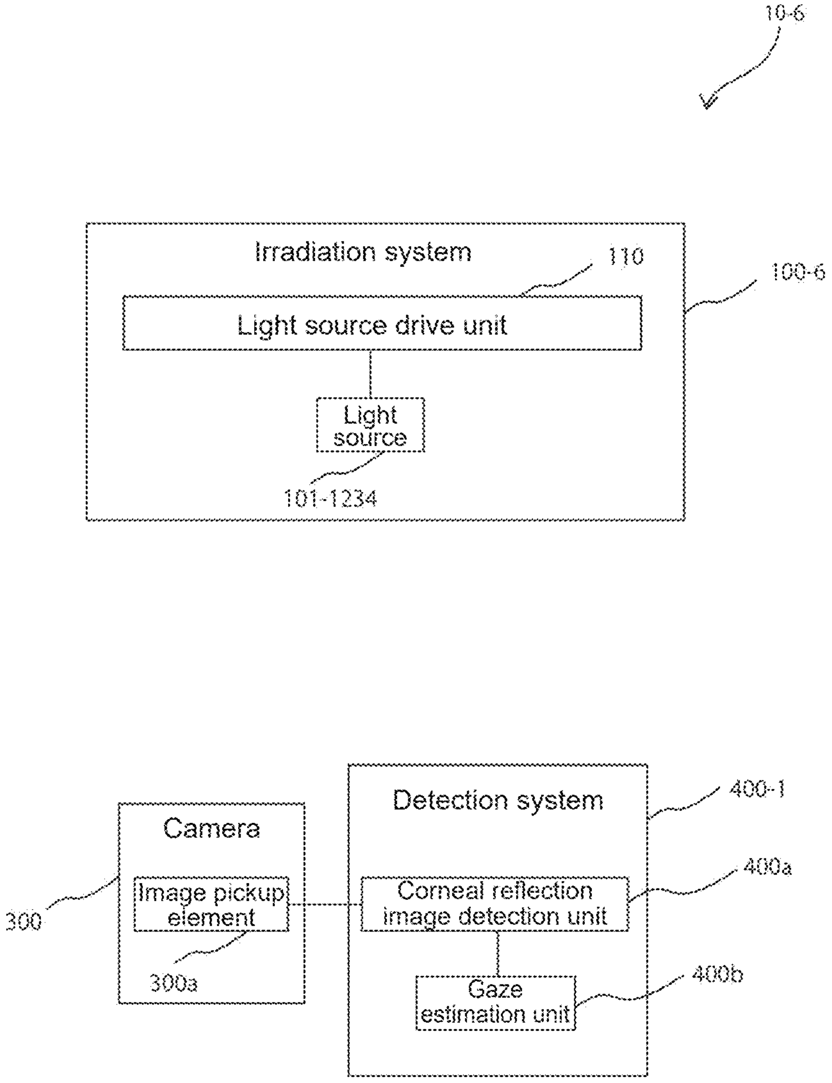
FIG. 17 A block diagram showing functions of the eyeball information detection apparatus according to Example 6 of the embodiment of the present technology.

Hereinafter, an eyeball information detection apparatus according to Example 6 of the embodiment of the present technology will be described with reference to A of FIG. 16, B of FIG. 16, and FIG. 17. A of FIG. 16 is a view of an eyeball information detection apparatus 10-6 according to Example 6 as viewed from above. B of FIG. 16 is a view of the eyeball information detection apparatus 10-6 according to Example 6 as viewed from the side of the eyeball EB. FIG. 17 is a block diagram showing functions of the eyeball information detection apparatus 10-6 according to Example 6.

The eyeball information detection apparatus 10-6 according to Example 6 has configurations substantially similar to those of the eyeball information detection apparatus 10-5 according to Example 5 except for the fact that a light source 101-1234 is a single light source corresponding to a plurality of (e.g., four) optical elements 202 and an optical member 250 that guides a non-visible light ray L1234 from the light source 101-1234 to a plurality of (e.g., four) optical elements 202 is provided on the substrate 150.

That is, in the eyeball information detection apparatus 10-6, the number of optical elements 202 is larger than the number of light sources 101.

In the eyeball information detection apparatus 10-6, the non-visible light ray L1234 from the light source 101-1234 is propagated inside the substrate 150 and is radiated to a plurality of (e.g., four) optical elements 202 via the optical member 250.

The optical member 250 is, as an example, a reflective-type diffractive element with a uniform grating pitch in two-dimensional directions.

To be specific, the non-visible light ray L1234 emitted from the light source 101-1234 passes through the substrate 150 and is made incident upon the substrate 150, satisfying conditions for total internal reflection inside the substrate 150 through the prism 160. As of the non-visible light ray L1234 that has been propagated while being totally internally reflected inside the substrate 150, each of four non-visible light rays L1 to L4 that have been reflected and diffracted and separated in four directions through the optical member 250 is radiated to the corresponding optical elements 202.

When the respective optical elements 202 are irradiated with the corresponding non-visible light rays, the respective optical elements 202 generate virtual light sources. The non-visible light rays via the respective optical elements 202 are radiated to the eyeball EB while being spread at a predetermined angle-of-divergence.

In accordance with the eyeball information detection apparatus 10-6 according to Example 6, effects similar to those of the eyeball information detection apparatus 10-5 according to Example 5 are provided and a plurality of (e.g., four) optical elements 202 can be efficiently and reliably irradiated with the non-visible light rays by the use of the single light source 101-1234, and the virtual light sources of the non-visible light rays can be efficiently and reliably generated.

<10. Eyeball Information Detection Apparatus According to Example 7 of Embodiment of Present Technology>

Figure 18:
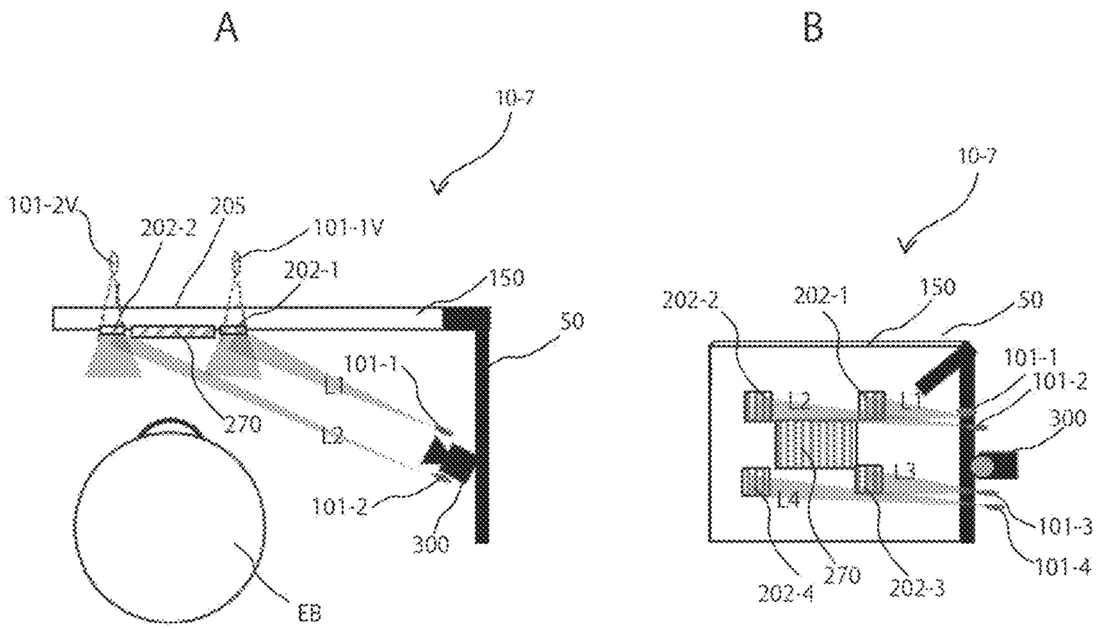
FIG. 18 A of FIG. 18 and B of FIG. 18 are views showing configurations of an eyeball information detection apparatus according to Example 7 of the embodiment of the present technology.

Hereinafter, an eyeball information detection apparatus according to Example 7 of the embodiment of the present technology will be described with reference to A of FIG. 18 and B of FIG. 18. A of FIG. 18 is a view of an eyeball information detection apparatus 10-7 according to Example 7 as viewed from above. B of FIG. 18 is a view of the eyeball information detection apparatus 10-7 according to Example 7 as viewed from the side of the eyeball EB.

The eyeball information detection apparatus 10-7 according to Example 7 has configurations substantially similar to those of the eyeball information detection apparatus 10-1 according to Example 1 except for the fact that the camera 300 as the light reception system is provided to the temple of the eyeglass frame as the support member 50 and another optical element 270 (optical element for light reception) that guides non-visible light rays reflected on the eyeball EB to the camera 300 is provided on the substrate 150.

In the eyeball information detection apparatus 10-7, a plurality of (e.g., four) optical elements 202 is provided in the periphery of the other optical element 270 on the substrate 150.

For example, a reflective-type diffractive element are used as the other optical element 270.

The reflective-type diffractive element as the other optical element 270 is, as an example, provided at a position on the surface of the substrate 150 which is located on the side of the eyeball EB, the position directly facing the eyeball EB.

It should be noted that the reflective-type diffractive element may be provided on the surface of the substrate 150 which is on the side opposite to the side of the eyeball EB, for example, in a case where the substrate 150 is transparent to light emission wavelengths of the respective light sources 101.

Reflection light rays (corneal reflection light rays) on the eyeball EB of the non-visible light rays via the corresponding optical elements 201, which have been emitted from the respective light sources 101, are reflected and diffracted towards the camera 300 through the other optical element 270.

In accordance with the eyeball information detection apparatus 10-7 according to Example 7, effects similar to those of the eyeball information detection apparatus 10-1 according to Example 1 are provided and the camera 300 as the light reception system is provided to the temple of the support member 50 and prevented from being located inside the field-of-view of the user. Therefore, an unnecessary image is prevented from being visually recognized, and for example, the see-through property can also be improved.

<11. Eyeball Information Detection Apparatus According to Example 8 of Embodiment of Present Technology>

Figure 19:
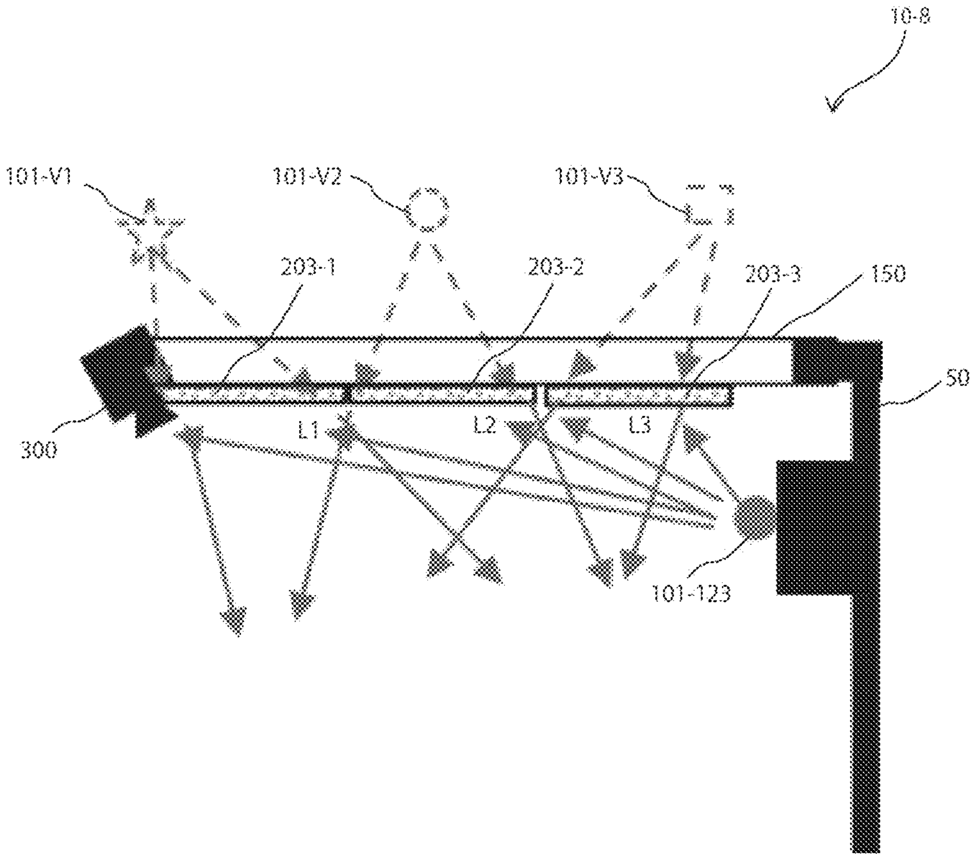
FIG. 19 A view showing configurations of the eyeball information detection apparatus according to Example 8 of the embodiment of the present technology.
Figure 20:
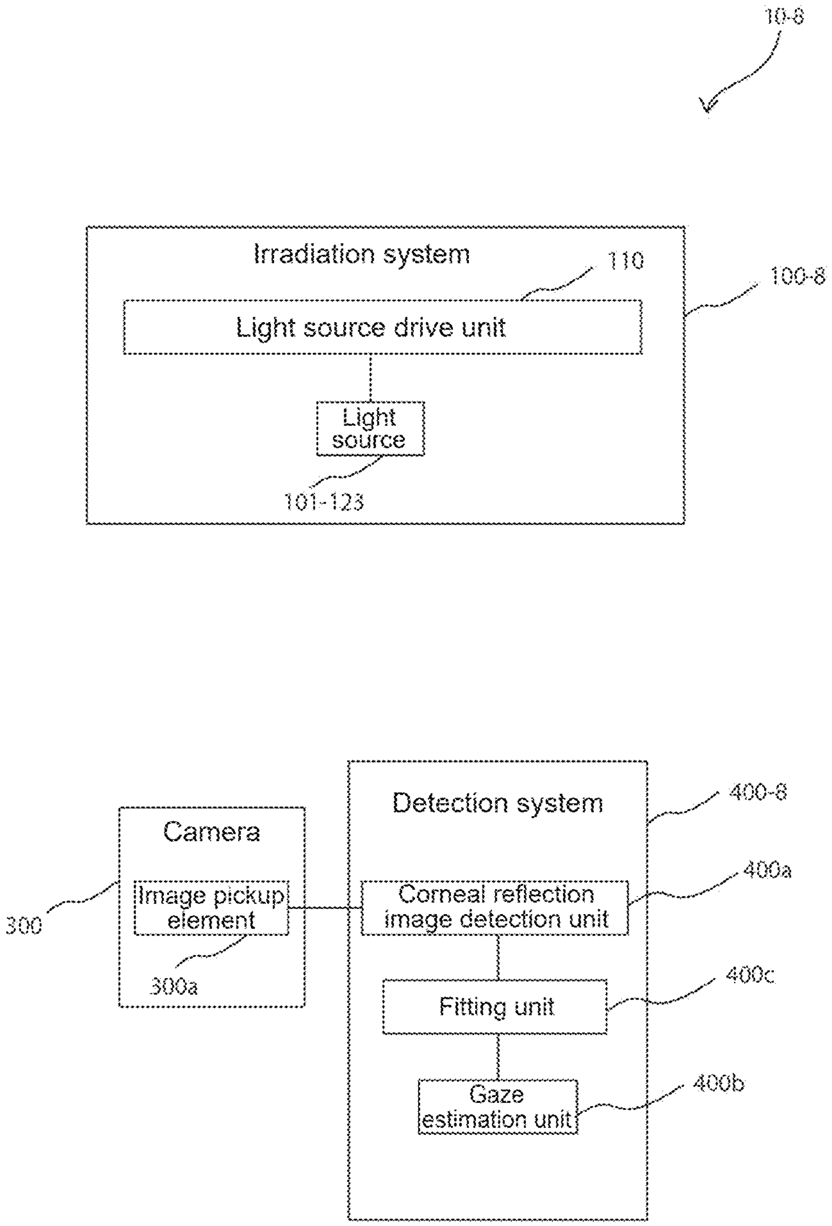
FIG. 20 A block diagram showing functions of the eyeball information detection apparatus according to Example 8 of the embodiment of the present technology.
Figure 21:
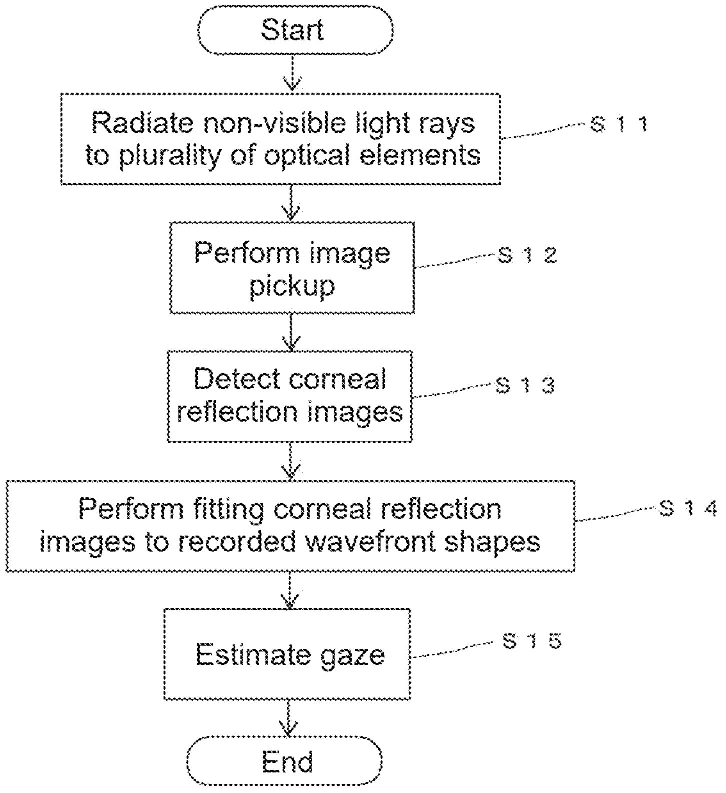
FIG. 21 A flowchart for describing operations of the eyeball information detection apparatus according to Example 8 of the embodiment of the present technology.

Hereinafter, an eyeball information detection apparatus according to Example 8 of the embodiment of the present technology will be described with reference to FIG. 19 to FIG. 21. FIG. 19 is a view of an eyeball information detection apparatus 10-8 according to Example 8 as viewed from above. FIG. 20 is a block diagram showing functions of the eyeball information detection apparatus 10-8 according to Example 8. FIG. 21 is a flowchart for describing operations of the eyeball information detection apparatus 10-8 according to Example 8.

As shown in FIG. 19 and FIG. 20, the eyeball information detection apparatus 10-8 according to Example 8 has configurations substantially similar to those of the eyeball information detection apparatus 10-1 according to Example 1 except for the fact that a plurality of (e.g., three) optical elements 203 (e.g., first to third optical elements 203-1 to 203-3) is diffractive elements with a non-uniform pitch, which are wavefront reconstruction-type diffractive elements (wavefront reconstruction-type HOEs), and the plurality of optical elements 203 corresponds to a single light source 101-123 in an irradiation system 100-8.

Wavefront shapes for the wavefront reconstruction-type HOEs as the respective optical elements 203 are recorded. When the wavefront reconstruction-type HOEs are irradiated with non-visible light rays, the wavefront reconstruction-type HOEs generate virtual light sources in the recorded wavefront shapes.

The respective optical elements 203 have, as an example, different wavefront shapes recorded.

A light source 101-123 simultaneously radiates non-visible light rays (diffusion light rays) to the first to third optical elements 203-1, 203-2, and 203-3.

The first to third optical elements 203-1 to 203-3 are, as an example, arranged in line side by side on the surface of the substrate 150 which is located on the side of the eyeball EB.

The respective optical elements 203 are, as an example, a reflective-type.

The first optical element 203-1 has a first wavefront shape (e.g., a star shape) recorded. When the first optical element 203-1 is irradiated with the non-visible light ray L1 from the light source 101-123, the first optical element 203-1 generates a virtual light source 101-V1 of the non-visible light ray L1 in the first wavefront shape (e.g., the star shape) by wavefront reconstruction.

The second optical element 203-2 has a second wavefront shape (e.g., a circular shape) recorded. When the second optical element 203-2 is irradiated with the non-visible light ray L2 from the light source 101-123, the second optical element 203-2 generates a virtual light source 101-V2 of the non-visible light ray L2 in the second wavefront shape (e.g., the circular shape) by wavefront reconstruction.

The third optical element 203-3 has a third wavefront shape (e.g., a rectangular shape) recorded. When the third optical element 203-3 is irradiated with the non-visible light ray L3 from the light source 101-123, the third optical element 203-3 generates a virtual light source 101-V3 of the non-visible light ray L3 in the third wavefront shape (e.g., the rectangular shape) by wavefront reconstruction.

A detection system 400-8 of the eyeball information detection apparatus 10-8 has a fitting unit 400*c* in addition to the corneal reflection image detection unit 400*a* and the gaze estimation unit 400*b*.

The fitting unit 400*c* performs fitting of shapes of a plurality of (e.g., four) corneal reflection images to wavefront shapes recorded on a plurality of (e.g., four) optical elements 203 (stored in a built-in memory) on the basis of a detection result of the corneal reflection image detection unit 400*a* and outputs the obtained result to the gaze estimation unit 400*b*. The gaze estimation unit 400*b* performs predetermined arithmetic operations in accordance with the fitting result and calculates an orientation (gaze) of the eyeball EB.

Hereinafter, operations of the eyeball information detection apparatus 10-8 (eyeball information detection method using the eyeball information detection apparatus 10-8) will be described with reference to the flowchart in FIG. 21.

In first Step S11, the irradiation system 100-8 radiates non-visible light rays to the plurality of (e.g., three) optical elements 203. Specifically, the light source drive unit 110 drives (lights up) the light source 101-123. Accordingly, a non-visible light ray emitted from the light source 101-123 is radiated to the corresponding optical element 203 and this optical element 203 generates a virtual light source. The non-visible light ray via the optical element 203 is radiated to the eyeball EB and reflected on the eyeball EB.

In next Step S12, the camera 300 performs image pickup. Specifically, the image pickup element 300*a* captures reflection light rays (corneal reflection light rays) on the eyeball EB of the non-visible light rays via the respective optical elements 203.

In next Step S13, the detection system 400-8 detects corneal reflection images (Purkinje images). Specifically, the corneal reflection image detection unit 400*a* detects high-luminance images on the captured image data from the image pickup element 300*a* as the corneal reflection images. At this time, on the captured image data, a plurality of corneal reflection images corresponding to the plurality of optical elements is detected in a state spaced apart from each other (see C of FIG. 4), and they can be separated from each other with high accuracy.

In next Step S14, the detection system 400-8 performs fitting of the corneal reflection images to the stored wavefront shapes. Specifically, the fitting unit 400*c* performs fitting of the shapes of the plurality of corneal reflection images to wavefront shapes recorded on the plurality of optical elements 203 on the basis of a detection result of the corneal reflection image detection unit 400*a*.

In last Step S15, the detection system 400-8 estimates a gaze. Specifically, the gaze estimation unit 400*b* performs predetermined arithmetic operations in accordance with the fitting result of the fitting unit 400*c*, and calculates a gaze which is an orientation of the eyeball EB, and outputs the obtained calculation result.

In accordance with the eyeball information detection apparatus 10-8 according to Example 8, wavefront shapes recorded on the plurality of optical elements 203 are different. Therefore, the accuracy of fitting the shapes of the plurality of corneal reflection images to the wavefront shapes recorded on the plurality of optical elements 203 can be improved and the gaze detection accuracy can be improved.

It should be noted that in Example 8, the plurality of optical elements 203 may include at least two optical elements 203 with the same wavefront shape recorded. Even with the same wavefront shape recorded, the fitting accuracy can be improved for example if this wavefront shape is a special shape.

<12. Eyeball Information Detection Apparatus According to Example 9 of Embodiment of Present Technology>

Figure 22:
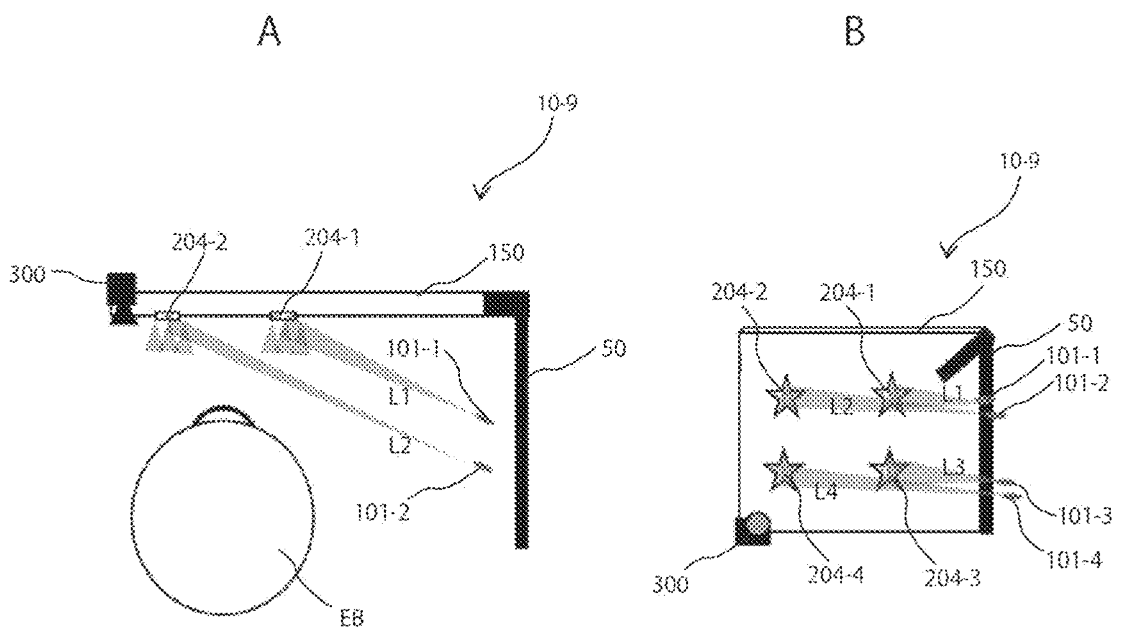
FIG. 22 A of FIG. 22 and B of FIG. 22 are views showing configurations of an eyeball information detection apparatus according to Example 9 of the embodiment of the present technology.

Hereinafter, an eyeball information detection apparatus according to Example 9 of the embodiment of the present technology will be described with reference to A of FIG. 22 and B of FIG. 22. A of FIG. 22 is a view of an eyeball information detection apparatus 10-9 according to Example 9 as viewed from above. B of FIG. 22 is a view of the eyeball information detection apparatus 10-9 according to Example 9 as viewed from the side of the eyeball EB.

As shown in A of FIG. 22 and B of FIG. 22, the eyeball information detection apparatus 10-9 according to Example 9 has configurations substantially similar to those of the eyeball information detection apparatus 10-1 according to Example 1 except for the fact that a plurality of optical elements 204 (e.g., first to fourth optical elements 204-1 to 204-4) is a plurality of diffusing elements and the detection system fits a plurality of reflection images on the eyeball EB of non-visible light rays to the plurality of optical elements 204 (diffusing elements).

In the eyeball information detection apparatus 10-9, the plurality of optical elements 204 has the same shape (e.g., a star shape). It should be noted that the shapes of the respective optical elements 204 may be, for example, circular shapes, elliptical shapes, or polygonal shapes.

In accordance with the eyeball information detection apparatus 10-9 according to Example 9, a plurality of virtual light sources having shapes corresponding to the shapes of the plurality of optical elements 204 can be generated, and the fitting accuracy can be improved. In this case, the fitting accuracy can be further improved by setting the shapes of the plurality of optical elements 204 to be special shapes (e.g., star shapes).

<13. Eyeball Information Detection Apparatus According to Example 10 of Embodiment of Present Technology>

Figure 23:
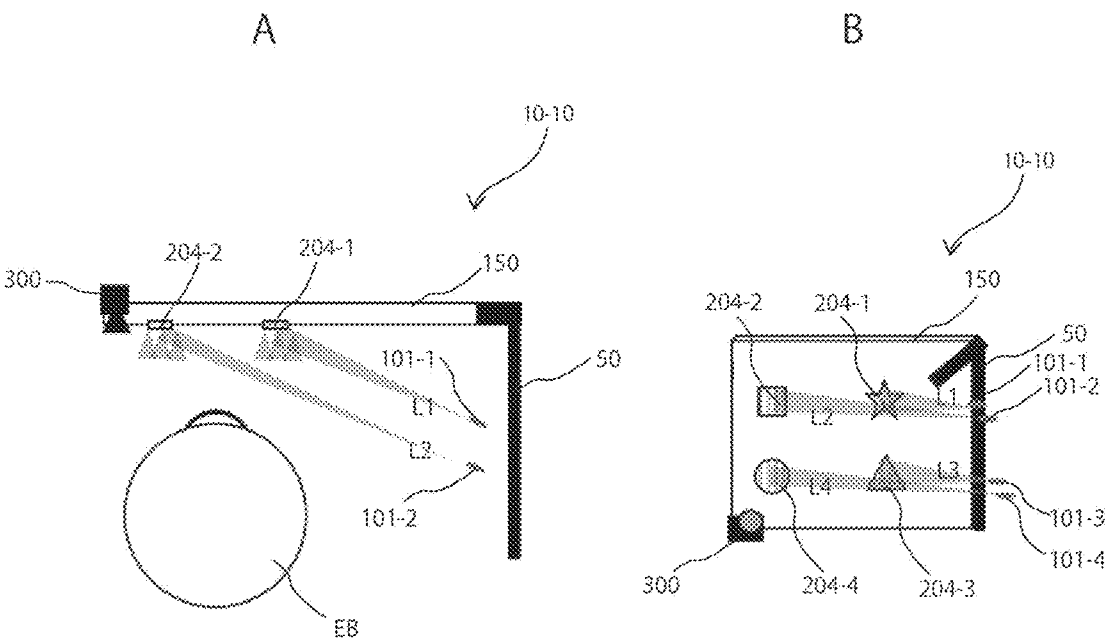
FIG. 23 A of FIG. 23 and B of FIG. 23 are views showing configurations of an eyeball information detection apparatus according to Example 10 of the embodiment of the present technology.

Hereinafter, an eyeball information detection apparatus according to Example 10 of the embodiment of the present technology will be described with reference to A of FIG. 23 and B of FIG. 23. A of FIG. 23 is a view of an eyeball information detection apparatus 10-10 according to Example 10 as viewed from above. B of FIG. 23 is a view of the eyeball information detection apparatus 10-10 according to Example 10 as viewed from the side of the eyeball EB.

As shown in A of FIG. 23 and B of FIG. 23, the eyeball information detection apparatus 10-10 according to Example 10 has configurations substantially similar to those of the eyeball information detection apparatus 10-9 according to Example 9 except for the fact that a plurality of optical elements 204 (e.g., first to fourth optical elements 204-1 to 204-4) which are diffusing elements has different shapes.

In accordance with the eyeball information detection apparatus 10-10 according to Example 10, the shapes of the respective optical elements 204 (respective diffusing elements) are different. Therefore, the fitting accuracy can be much more improved.

It should be noted that in the eyeball information detection apparatus 10-10 according to Example 10, the plurality of optical elements 204 may include optical elements 204 having the same shape.

<14. Eyeball Information Detection Apparatus According to Example 11 of Embodiment of Present Technology>

Figure 24:
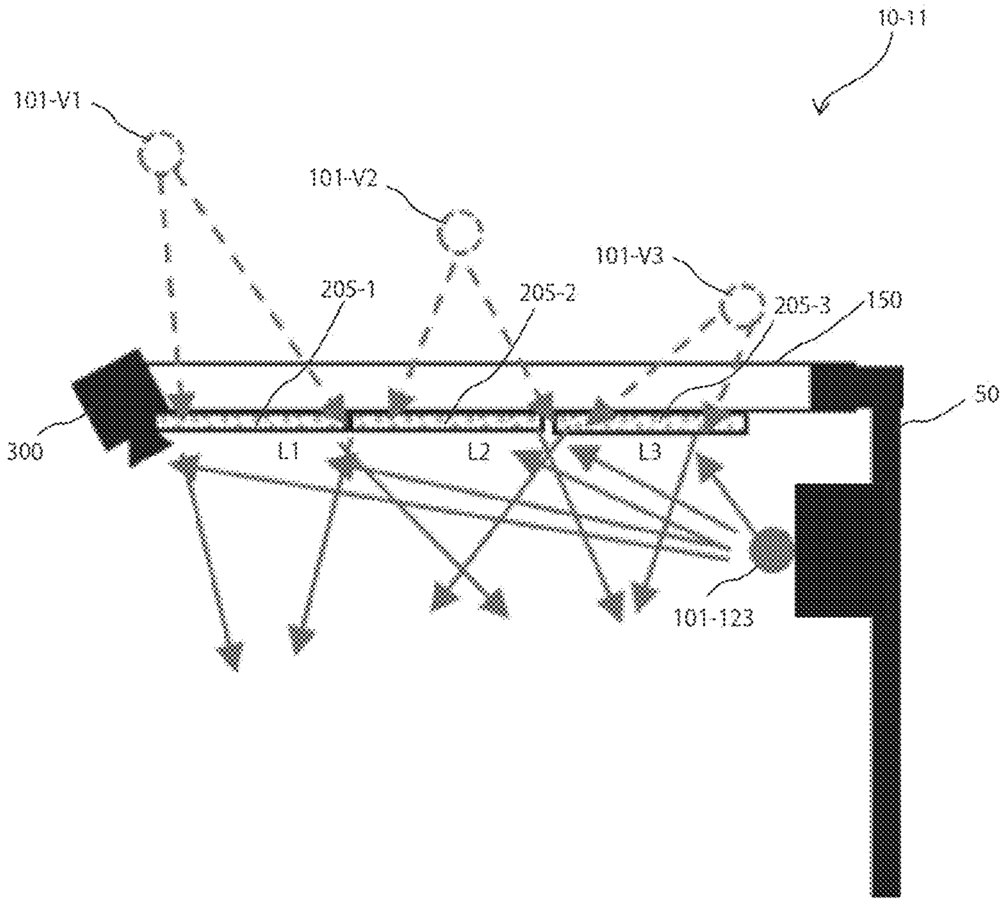
FIG. 24 A view showing configurations of the eyeball information detection apparatus according to Example 11 of the embodiment of the present technology.
Figure 25:
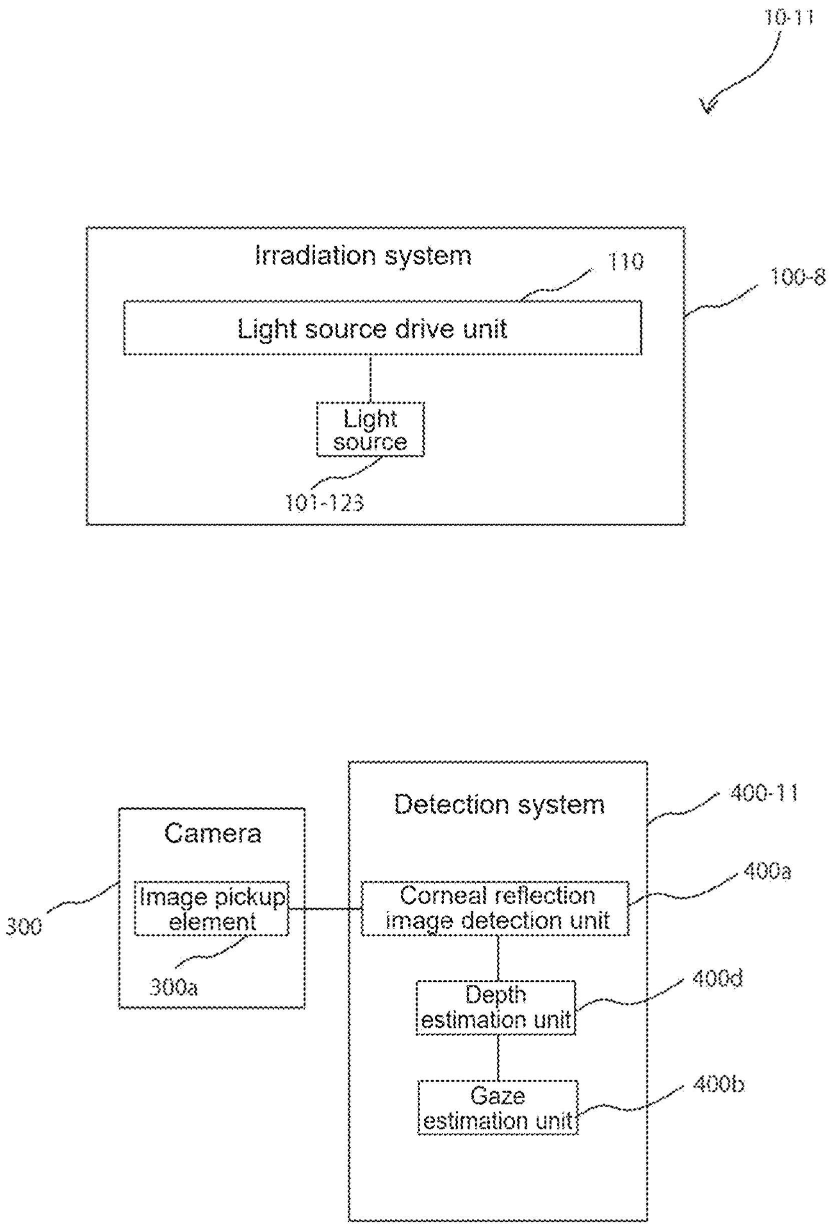
FIG. 25 A block diagram showing functions of the eyeball information detection apparatus according to Example 11 of the embodiment of the present technology.
Figure 26:
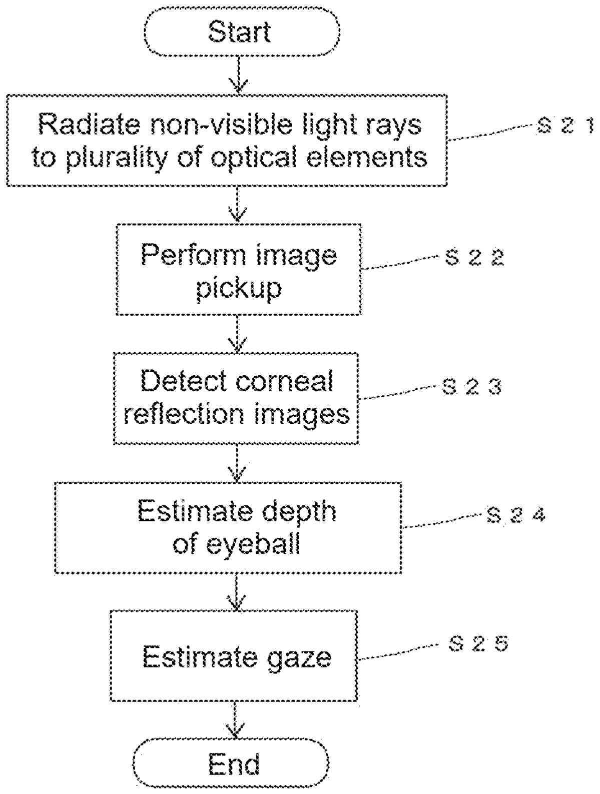
FIG. 26 A flowchart for describing operations of the eyeball information detection apparatus according to Example 11 of the embodiment of the present technology.

Hereinafter, an eyeball information detection apparatus according to Example 11 of the embodiment of the present technology will be described with reference to FIG. 24 to FIG. 26. FIG. 24 is a view of an eyeball information detection apparatus 10-11 according to Example 11 as viewed from above. FIG. 25 is a block diagram showing functions of the eyeball information detection apparatus 10-11 according to Example 11. FIG. 26 is a flowchart for describing operations of the eyeball information detection apparatus 10-11 according to Example 11.

The eyeball information detection apparatus 10-11 according to Example 11 has configurations substantially similar to those of the eyeball information detection apparatus 10-1 according to Example 1 except for the fact that a plurality of (e.g., three) optical elements 205 (e.g., first to third optical elements 205-1 to 205-3) which are diffractive elements is diffractive elements with different diffraction power and positions of a plurality of virtual light sources in a thickness direction of the substrate 150, which are respectively generated by the plurality of optical elements 205, are different. The diffractive elements have curved-mirror characteristics (convex mirror characteristics with negative power or concave mirror characteristics with positive power).

The irradiation system 100-8 of the eyeball information detection apparatus 10-11 includes a single light source 101-123 corresponding to the plurality of optical elements 205.

A detection system 400-11 of the eyeball information detection apparatus 10-11 has a depth estimation unit 400*d* that estimates a depth of the eyeball EB on the basis of an image pickup result from the camera 300 in addition to the corneal reflection image detection unit 400*a* and the gaze estimation unit 400*b*.

Hereinafter, operations of the eyeball information detection apparatus 10-11 (eyeball information detection method using the eyeball information detection apparatus 10-11) will be described with reference to the flowchart in FIG. 26.

In first Step S21, the irradiation system 100-8 radiates non-visible light rays to the plurality of (e.g., three) optical elements 205. Specifically, the light source drive unit 110 drives (lights up) the light source 101-123. Accordingly, the non-visible light rays emitted from the light source 101-123 are radiated to the respective optical elements 205, and the optical elements 205 generate virtual light sources at different positions in the thickness direction of the substrate 150. The non-visible light rays via the optical elements 205 are radiated to the eyeball EB and reflected on the eyeball EB.

In next Step S22, the camera 300 performs image pickup. Specifically, the image pickup element 300*a* captures reflection light rays (corneal reflection light rays) on the eyeball EB of the non-visible light rays via the respective optical elements 205.

In next Step S23, the detection system 400-11 detects corneal reflection images (Purkinje images). Specifically, the corneal reflection image detection unit 400*a* detects high-luminance images on the captured image data from the image pickup element 300*a* as the corneal reflection images. At this time, on the captured image data, a plurality of (e.g., three) corneal reflection images corresponding to the plurality of (e.g., three) optical elements 205 is detected in a state spaced apart from each other (see C of FIG. 4), and they can be separated from each other with high accuracy.

In next Step S24, the detection system 400-11 estimates a depth of the eyeball EB. Specifically, the depth estimation unit 400*d* estimates a depth of the eyeball EB on the basis of positions of a plurality of corneal reflection images which are detected by the corneal reflection image detection unit 400*a* and outputs the obtained estimation result to the gaze estimation unit 400*b*. As a supplement, the position of each corneal reflection image depends on a depth of the eyeball EB. Therefore, a depth of the eyeball EB can be estimated on the basis of the position of the corneal reflection image.

In last Step S25, the detection system 400-11 estimates a gaze. Specifically, the gaze estimation unit 400*b* performs predetermined arithmetic operations by using the estimation result of the depth estimation unit 400*d*, calculates a gaze which is an orientation of the eyeball EB, and outputs the obtained calculation result.

In accordance with the eyeball information detection apparatus 10-11 according to Example 11, an orientation (gaze) of the eyeball EB can be detected in view of a depth of the eyeball EB. Therefore, an orientation (gaze) of the eyeball EB can be detected with high accuracy irrespective of a depth of the eyeball EB.

<15. Eyeball Information Detection Apparatus According to Example 12 of Embodiment of Present Technology>

Figure 27:
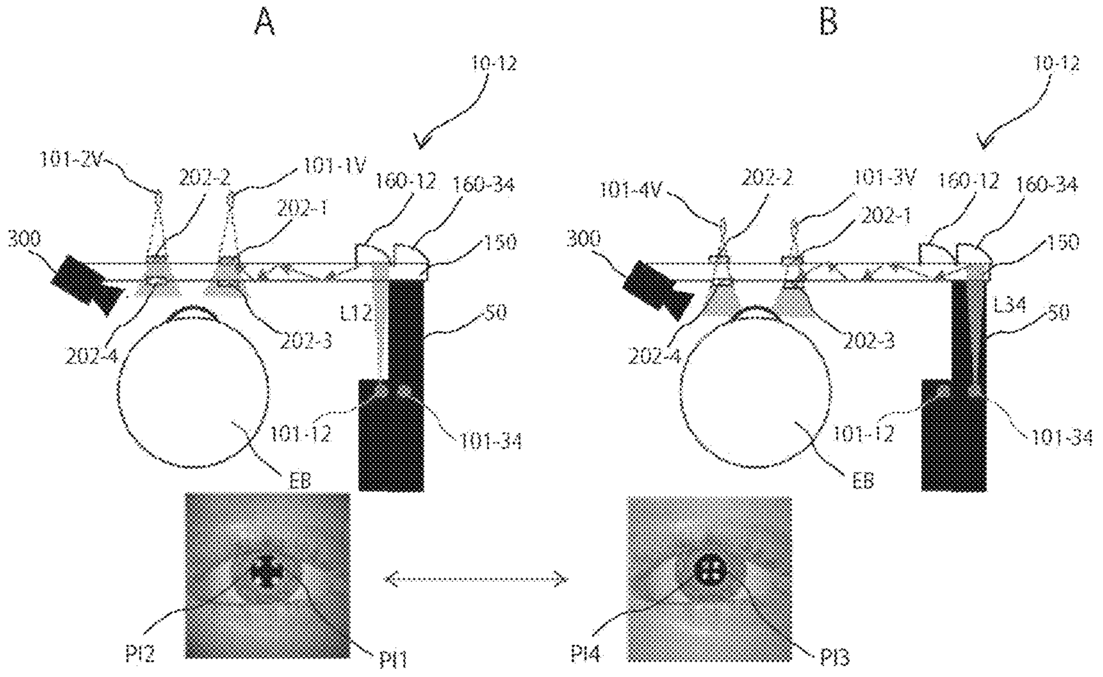
FIG. 27 A of FIG. 27 and B of FIG. 27 are views showing configurations of an eyeball information detection apparatus according to Example 12 of the embodiment of the present technology.
Figure 28:
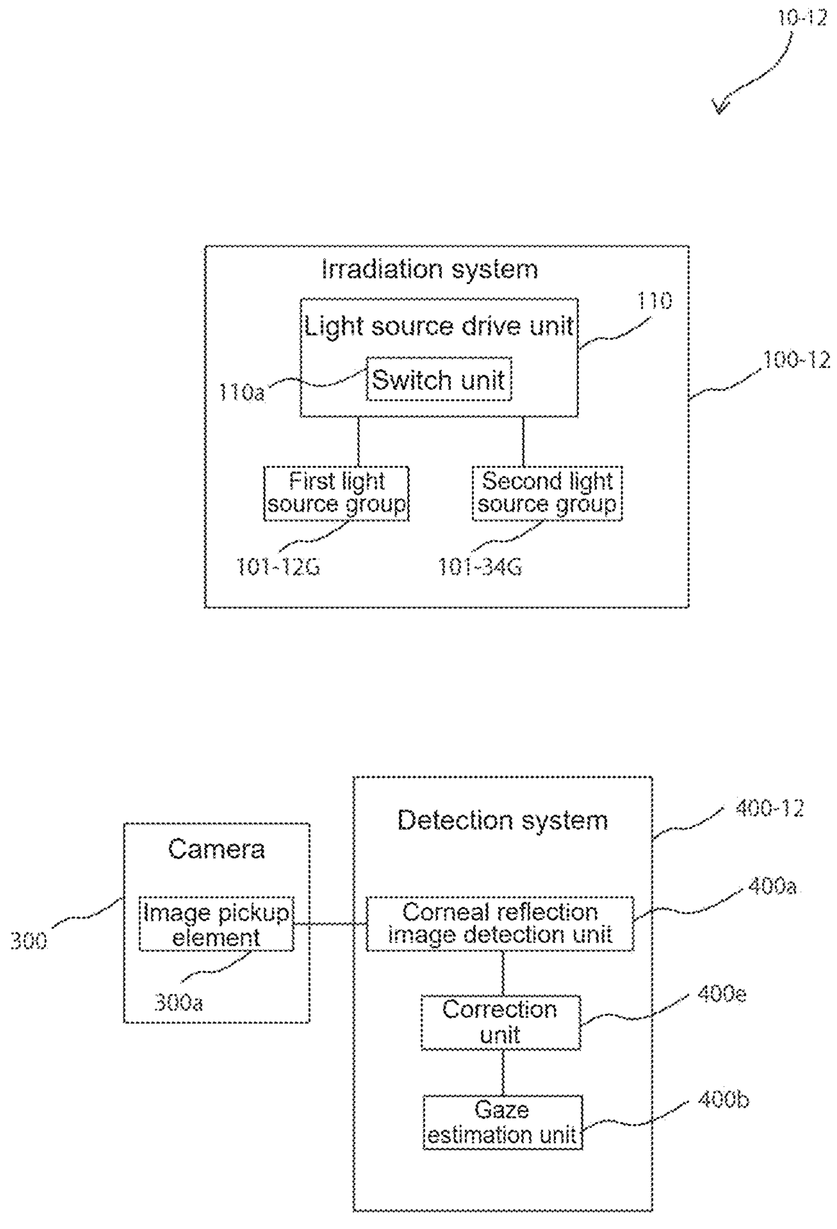
FIG. 28 A block diagram showing functions of the eyeball information detection apparatus according to Example 12 of the embodiment of the present technology.
Figure 29:
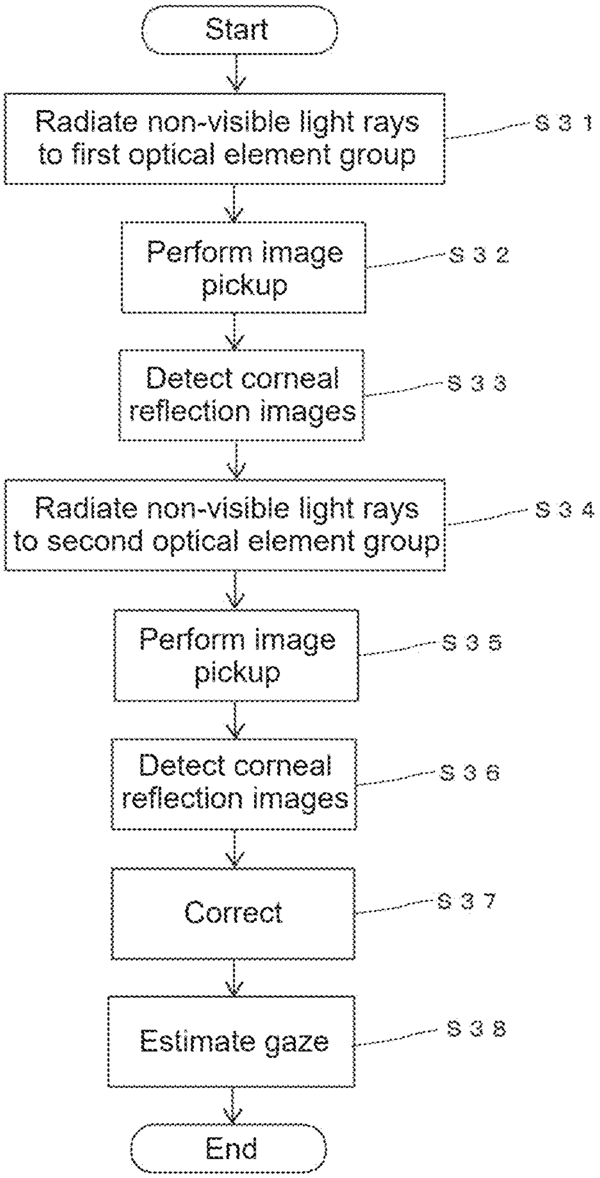
FIG. 29 A flowchart for describing operations of the eyeball information detection apparatus according to Example 12 of the embodiment of the present technology.

Hereinafter, an eyeball information detection apparatus according to Example 12 of the embodiment of the present technology will be described with reference to A of FIG. 27 to FIG. 29. A of FIG. 27 is a view of the eyeball information detection apparatus 10-12 according to Example 12 as viewed from above (Part 1). B of FIG. 27 is a view of the eyeball information detection apparatus 10-12 according to Example 12 as viewed from above (Part 2). FIG. 28 is a block diagram showing functions of the eyeball information detection apparatus 10-12 according to Example 12. FIG. 29 is a flowchart for describing operations of the eyeball information detection apparatus 10-12 according to Example 12.

As shown in A of FIG. 27 to FIG. 28, the eyeball information detection apparatus 10-12 according to Example 12 has configurations substantially similar to those of the eyeball information detection apparatus 10-5 according to Example 5 except for the fact that positions of a plurality of (e.g., eight) optical elements 202 in the thickness direction of the substrate 150 are different, the plurality of (e.g., eight) optical elements 202 includes first and second optical element groups corresponding to different light source groups, and an irradiation system 100-12 includes a light source drive unit 110 that selectively drives a first light source group 101-12G corresponding to the first optical element group and a second light source group 101-34G corresponding to the second optical element group.

The first light source group 101-12G includes two first light sources 101-12 arranged on the upper and lower sides. In A of FIG. 27 and B of FIG. 27, only the first light source 101-12 on the upper side is shown.

The second light source group 101-34G includes two second light sources 101-34 arranged on the upper and lower sides. In A of FIG. 27 and B of FIG. 27, only the second light source 101-34 on the upper side is shown.

The first optical element group includes two pairs of first and second optical elements 202-1 and 202-2 provided on the surface of the substrate 150 which is on the side opposite to the side of the eyeball EB. The two pairs of first and second optical elements 202-1 and 202-2 are arranged on the upper and lower sides. In A of FIG. 27 and B of FIG. 27, only a pair of first and second optical elements 202-1 and 202-2 on the upper side is shown.

The pair of first and second optical elements 202-1 and 202-2 on the upper side corresponds to the first light source 101-12 on the upper side and the pair of first and second optical elements 202-1 and 202-2 on the lower side corresponds to the first light source 101-12 on the lower side.

A reflective-type diffractive element is used as each of the pair of first and second optical elements 202-1 and 202-2.

The second optical element group includes two pairs of third and fourth optical elements 202-3 and 202-4 provided on the surface of the substrate 150 which is located on the side of the eyeball EB. The two pairs of third and fourth optical elements 202-3 and 202-4 are arranged on the upper and lower sides. In A of FIG. 27 and B of FIG. 27, only the pair of third and fourth optical elements 202-3 and 202-4 on the upper side is shown.

The pair of third and fourth optical elements 202-3 and 202-4 on the upper side corresponds to the second light source 101-34 on the upper side and the pair of third and fourth optical elements 202-3 and 202-4 on the lower side corresponds to the second light source 101-34 on the lower side.

A transmissive-type diffractive element is used as each of the pair of third and fourth optical elements 202-3 and 202-4.

First and second prisms 160-12 and 160-34 are provided on the surface of the substrate 150 which is on the side opposite to the side of the eyeball EB.

The first prism 160-12 makes the non-visible light rays L12 emitted from the respective first light sources 101-12 in the first light source group 101-12G incident upon the substrate 150, satisfying conditions for total internal reflection inside the substrate 150.

The second prism 160-34 makes the non-visible light rays L34 emitted from the respective second light sources 101-34 in the second light source group 101-34G incident upon the substrate 150, satisfying conditions for total internal reflection inside the substrate 150.

As shown in A of FIG. 27, the non-visible light rays L12 emitted from the respective first light sources 101-12 in the first light source group 101-12G are made incident upon the first prism 160-12 via the substrate 150. The non-visible light rays L12 via the first prism 160-12 are propagated while being totally internally reflected inside the substrate 150 and are sequentially radiated to the corresponding first and second optical elements 202-1 and 202-2. When the first optical element 202-1 is irradiated with the non-visible light ray L12, the first optical element 202-1 generates a virtual light source 101-1V of the non-visible light ray L12. When the second optical element 202-2 is irradiated with the non-visible light ray L12, the second optical element 202-2 generates a virtual light source 101-2V of the non-visible light ray L12.

As shown in B of FIG. 27, the non-visible light rays L34 emitted from the respective second light sources 101-34 in the second light source group 101-34G are made incident upon the second prism 160-34 via the substrate 150. The non-visible light rays L34 via the second prism 160-34 are propagated while being totally internally reflected inside the substrate 150 and is radiated to the corresponding third and fourth optical elements 202-3 and 202-4. When the third optical element 202-3 is irradiated with the non-visible light ray L34, the third optical element 202-3 generates a virtual light source 101-3V of the non-visible light ray L34. When the fourth optical element 202-4 is irradiated with the non-visible light ray L34, the fourth optical element 202-4 generates a virtual light source 101-4V of the non-visible light ray L34.

The light source drive unit 110 in the irradiation system 100-12 of the eyeball information detection apparatus 10-12 includes a switch unit 110*a* that switches a driving target between the first and second light source groups 101-12G and 101-34G (see FIG. 28).

A detection system 400-12 of the eyeball information detection apparatus 10-12 has a correction unit 400*e* that corrects position errors of the corneal reflection images due to the depth of the eyeball EB in addition to the corneal reflection image detection unit 400*a* and the gaze estimation unit 400*b* (see FIG. 28).

Hereinafter, operations of the eyeball information detection apparatus 10-12 (eyeball information detection method using the eyeball information detection apparatus 10-12) will be described with reference to the flowchart in FIG. 29.

In first Step S31, the irradiation system 100-12 radiates non-visible light rays to the first optical element group. Specifically, the light source drive unit 110 drives the first light sources 101-12 on the upper side and the lower side. Accordingly, the non-visible light rays L12 emitted from the respective first light sources 101-12 are sequentially radiated to the corresponding first and second optical elements 202-1 and 202-2 and the first and second optical elements 202-1 and 202-2 respectively generate virtual light sources 101-1V and 101-2V. The non-visible light rays L12 via the first and second optical elements 202-1 and 202-2 are radiated to the eyeball EB and reflected on the eyeball EB.

In next Step S32, the camera 300 performs image pickup. Specifically, the image pickup element 300*a* captures reflection light rays (corneal reflection light rays) on the eyeball EB of the non-visible light rays L12 via the pairs of first and second optical elements 202-1 and 202-2 and outputs captured image data which is the obtained image pickup result to the corneal reflection image detection unit 400*a*.

In next Step S33, the detection system 400-12 detects corneal reflection images (Purkinje images). Specifically, the corneal reflection image detection unit 400*a* detects high-luminance images on the captured image data output from the image pickup element 300*a* in Step S32 as the corneal reflection images. At this time, on the captured image data, a plurality of (e.g., four) corneal reflection images corresponding to a plurality of (e.g., four) optical elements 202 is detected in a state spaced apart from each other (see C of FIG. 4), and they can be separated from each other with high accuracy.

In next Step S34, the irradiation system 100-12 radiates non-visible light rays to the second optical element group. Specifically, the light source drive unit 110 drives the second light sources 101-34 on the upper side and the lower side. Accordingly, the non-visible light rays L34 emitted from the respective second light sources 101-34 are sequentially radiated to the corresponding third and fourth optical elements 202-3 and 202-4 and the third and fourth optical elements 202-3 and 202-4 respectively generate the virtual light sources 101-3V and 101-4V. The non-visible light rays L34 via the third and fourth optical elements 202-3 and 202-4 are radiated to the eyeball EB and reflected on the eyeball EB.

In next Step S35, the camera 300 performs image pickup. Specifically, the image pickup element 300*a* captures reflection light rays (corneal reflection light rays) on the eyeball EB of the non-visible light rays L34 via the pairs of third and fourth optical elements 202-3 and 202-4 and outputs captured image data which is the obtained image pickup result to the corneal reflection image detection unit 400*a*.

In next Step S36, the detection system 400-12 detects corneal reflection images (Purkinje images). Specifically, the corneal reflection image detection unit 400*a* detects high-luminance images on the captured image data output from the image pickup element 300*a* in Step S35 as the corneal reflection images. At this time, on the captured image data, a plurality of (e.g., four) corneal reflection images corresponding to a plurality of (e.g., four) optical elements 202 is detected in a state spaced apart from each other (see C of FIG. 4), and they can be separated from each other with high accuracy.

In next Step S37, the detection system 400-12 corrects position errors of the corneal reflection images due to the depth of the eyeball EB. Specifically, the correction unit 400*e* determines position errors of the corneal reflection images from reference positions due to the depth of the eyeball EB on the basis of the plurality of (e.g., four) corneal reflection images of the non-visible light rays L12 which has been detected in Step S33 and the plurality of (e.g., four) corneal reflection images of the non-visible light rays L34 which has been detected in Step S36, calculates positions of the corneal reflection images whose position errors have been corrected, and outputs the obtained calculation result to the gaze estimation unit 400*b*.

In last Step S38, the detection system 400-12 estimates a gaze. Specifically, the gaze estimation unit 400*b* performs predetermined arithmetic operations on the basis of the corrected positions of the corneal reflection images from the correction unit 400*e*, calculates a gaze which is an orientation of the eyeball EB, and outputs the obtained calculation result.

In accordance with the eyeball information detection apparatus 10-12 according to Example 12, an orientation (gaze) of the eyeball EB is calculated in view of the depth of the eyeball EB. Therefore, an orientation (gaze) of the eyeball EB can be detected with high accuracy irrespective of the depth of the eyeball EB.

<16. Eyeball Information Detection Apparatus According to Example 13 of Embodiment of Present Technology>

Figure 30:
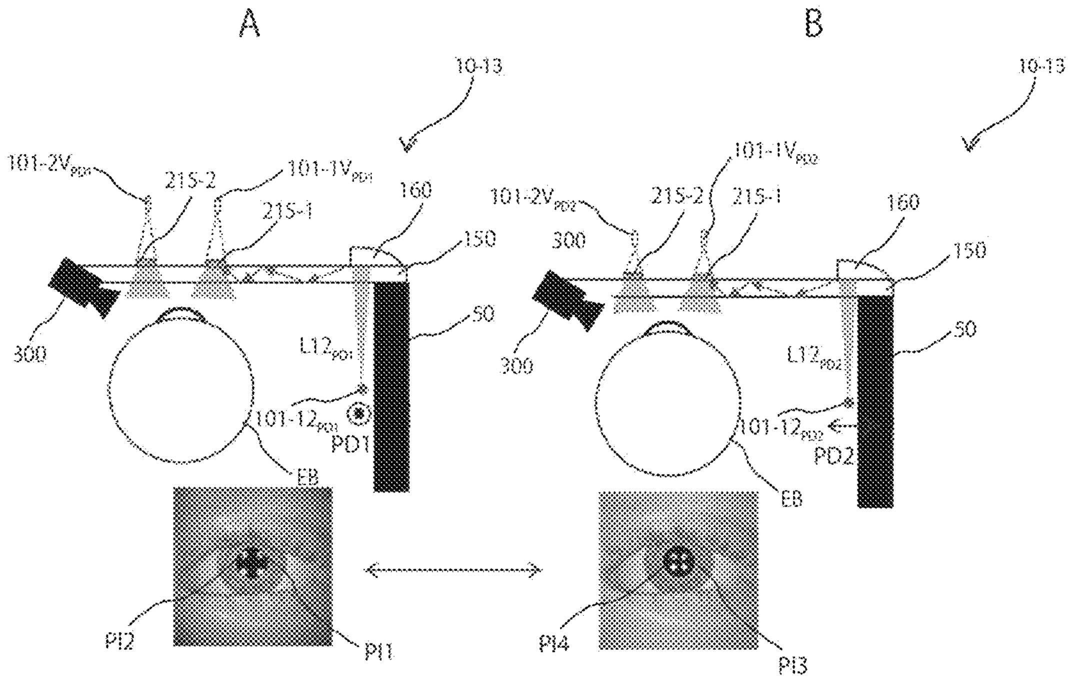
FIG. 30 A of FIG. 30 and B of FIG. 30 are views showing configurations of an eyeball information detection apparatus according to Example 13 of the embodiment of the present technology.
Figure 31:
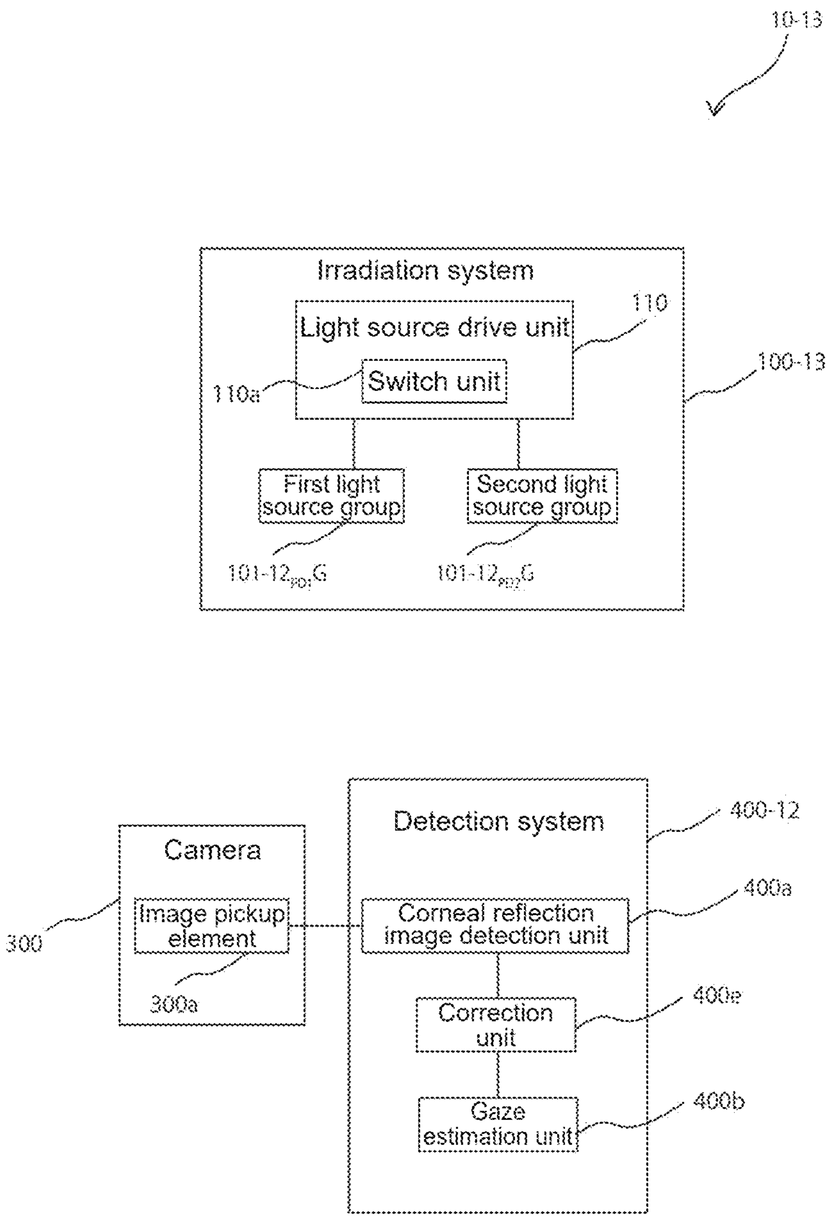
FIG. 31 A block diagram showing functions of the eyeball information detection apparatus according to Example 13 of the embodiment of the present technology.
Figure 32:
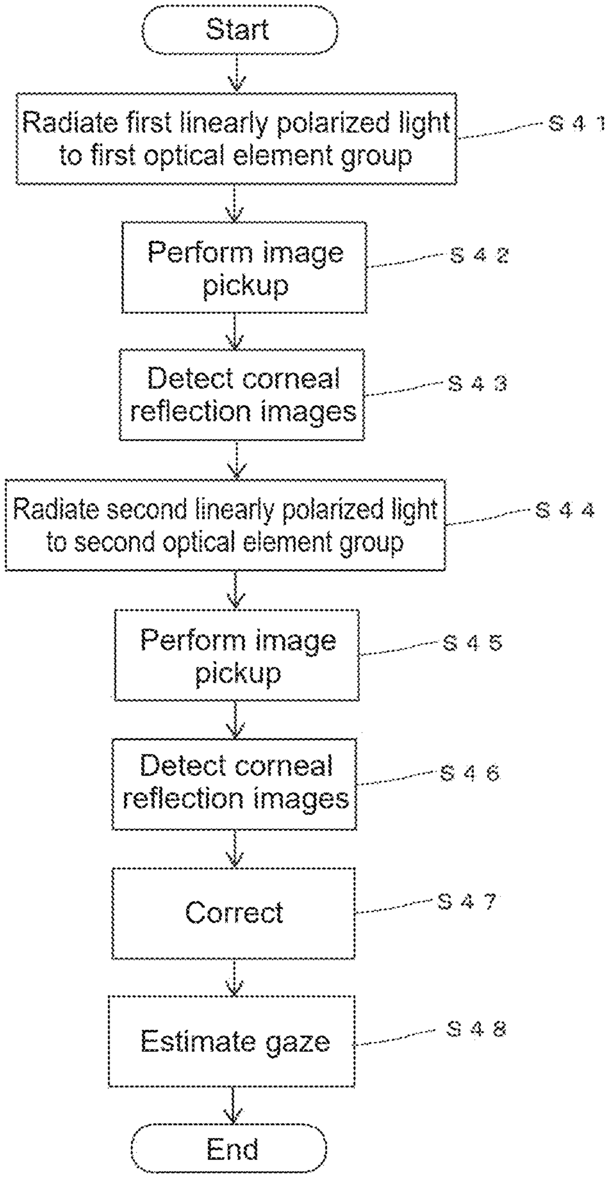
FIG. 32 A flowchart for describing operations of the eyeball information detection apparatus according to Example 13 of the embodiment of the present technology.

Hereinafter, an eyeball information detection apparatus according to Example 13 of the embodiment of the present technology will be described with reference to A of FIG. 30 to FIG. 32. A of FIG. 30 is a view of the eyeball information detection apparatus 10-13 according to Example 13 as viewed from above (Part 1). B of FIG. 30 is a view of the eyeball information detection apparatus 10-13 according to Example 13 as viewed from above (Part 2). FIG. 31 is a block diagram showing functions of the eyeball information detection apparatus 10-13 according to Example 13. FIG. 32 is a flowchart for describing operations of the eyeball information detection apparatus 10-13 according to Example 13.

As shown in A of FIG. 30 to FIG. 31, the eyeball information detection apparatus 10-13 according to Example 13 has configurations substantially similar to those of the eyeball information detection apparatus 10-5 according to Example 5 except for the fact that a plurality of (e.g., four) optical elements 215 (e.g., two first optical elements 215-1 and two second optical elements 215-2) are diffractive elements having dependence on polarization (characteristics of diffraction power depending on a polarization direction) and an irradiation system 100-13 is capable of varying a polarization direction of the non-visible light ray.

The light source drive unit 110 in the irradiation system 100-13 of the eyeball information detection apparatus 10-13 includes a switch unit 110*a* that switches a driving target between a first light source group 101-12$_{PD1}$G and a second light source group 101-12$_{PD2}$G (see FIG. 31).

The first light source group 101-12$_{PD1}$G includes a plurality of (e.g., two) first light sources 101-12$_{PD1}$ that emits first linearly polarized light rays L12$_{PD1}$ (non-visible light ray) having a predetermined polarization direction (see A of FIG. 30 and B of FIG. 30). The plurality of (e.g., two) first light sources 101-12$_{PD1}$ is arranged on the upper and lower sides.

The second light source group 101-12$_{PD2}$G includes a plurality of (e.g., two) second light sources 101-12$_{PD2}$ that emits second linearly polarized light rays L12$_{PD2}$ (non-visible light ray) whose polarization direction is orthogonal to that of the first linearly polarized light rays L12$_{PD1}$ (see A of FIG. 30 and B of FIG. 30). The plurality of (e.g., two) second light sources 101-12$_{PD2}$ is arranged on the upper and lower sides.

The two first optical elements 215-1 are arranged on the upper and lower sides. The two second optical elements 215-2 are arranged on the upper and lower sides.

The first and second optical elements 215-1 and 215-2 on the upper side correspond to first and second light sources 101-12$_{PD1}$ and 101-12$_{PD2}$ on the upper side.

The first and second optical elements 215-1 and 215-2 on the lower side correspond to the first and second light sources 101-12$_{PD1}$ and 101-12$_{PD2}$ on the lower side.

The respective optical elements 215 are, as an example, reflective-type diffractive elements provided on the surface of the substrate 150 which is on the side opposite to the side of the eyeball EB. Diffraction power for diffracting the first linearly polarized light rays L12$_{PD1}$ is smaller than diffraction power for diffracting the second linearly polarized light rays L12$_{PD2}$.

It should be noted that the respective optical elements 215 may be transmissive-type diffractive elements provided on the surface of the substrate 150 which is located on the side of the eyeball EB.

As shown in A of FIG. 30, the first linearly polarized light rays L12$_{PD1}$ emitted from the respective first light sources 101-12$_{PD1}$ in the first light source group 101-12$_{PD1}$G are made incident upon the substrate 150 via the substrate 150 and the prism 160, are propagated while being totally internally reflected inside the substrate 150, and are sequentially radiated to the corresponding first and second optical elements 215-1 and 215-2. When the first and second optical elements 215-1 and 215-2 are irradiated with the first linearly polarized light rays L12$_{PD1}$, the first and second optical elements 215-1 and 215-2 respectively generate virtual light sources 101-1V$_{PD1}$ and 101-2V$_{PD1}$ of the first linearly polarized light rays L12$_{PD1}$ at positions relatively far from the substrate 150.

As shown in B of FIG. 30, first linearly polarized light rays L12$_{PD2}$ emitted from the respective second light sources 101-12$_{PD2}$ in the second light source group 101-12$_{PD2}$G are made incident upon the substrate 150 via the substrate 150 and the prism 160, are propagated while being totally internally reflected inside the substrate 150, and are sequentially radiated to the corresponding first and second optical elements 215-1 and 215-2. When the first and second optical elements 215-1 and 215-2 are irradiated with the second linearly polarized light rays L12$_{PD2}$, the first and second optical elements 215-1 and 215-2 respectively generate virtual light sources 101-1V$_{PD2}$ and 101-2V$_{PD2}$ of the second linearly polarized light rays L12$_{PD2}$ at positions relatively close to the substrate 150.

Hereinafter, operations of the eyeball information detection apparatus 10-13 (eyeball information detection method using the eyeball information detection apparatus 10-13) will be described with reference to the flowchart in FIG. 32.

In first Step S41, the irradiation system 100-13 radiates the first linearly polarized light rays L12$_{PD1}$ to the two first optical elements 215-1 and the two second optical elements 215-2. Specifically, the light source drive unit 110 drives the two first light sources 101-12$_{PD1}$. Accordingly, the first linearly polarized light rays L12$_{PD1}$ emitted from the respective first light sources 101-12$_{PD1}$ are sequentially radiated to the corresponding first and second optical elements 215-1 and 215-2 and the first and second optical elements 215-1 and 215-2 respectively generate the virtual light sources 101-1$V_{PD1}$ and 101-2$V_{PD1}$. The first linearly polarized light rays L12$_{PD1}$ via the first and second optical elements 202-1 and 202-2 are radiated to the eyeball EB and reflected on the eyeball EB.

In next Step S42, the camera 300 performs image pickup. Specifically, the image pickup element 300*a* captures reflection light rays (corneal reflection light rays) on the eyeball EB of the first linearly polarized light rays L12$_{PD1}$ via the two first optical elements 215-1 and the two second optical elements 215-2 and outputs captured image data which is the obtained image pickup result to the corneal reflection image detection unit 400*a*.

In next Step S43, the detection system 400-12 detects corneal reflection images (Purkinje images). Specifically, the corneal reflection image detection unit 400*a* detects high-luminance images on the captured image data output from the image pickup element 300*a* in Step S42 as the corneal reflection images. At this time, on the captured image data, a plurality of (e.g., four) corneal reflection images corresponding to the plurality of (e.g., four) optical elements 215 is detected in a state spaced apart from each other (see C of FIG. 4), and they can be separated from each other with high accuracy.

In next Step S44, the irradiation system 100-13 radiates the second linearly polarized light rays L12$_{PD2}$ to the two first optical elements 215-1 and the two second optical elements 215-1. Specifically, the light source drive unit 110 drives the two second light sources 101-12$_{PD2}$. Accordingly, the second linearly polarized light rays L12$_{PD2}$ emitted from the respective second light sources 101-12$_{PD2}$ are sequentially radiated to the corresponding first and second optical elements 215-1 and 215-2 and the first and second optical elements 215-1 and 215-2 respectively generate the virtual light sources 101-1$V_{PD2}$ and 101-2$V_{PD2}$. The second linearly polarized light rays L12$_{PD2}$ via the first and second optical elements 215-1 and 215-2 are radiated to the eyeball EB and reflected on the eyeball EB.

In next Step S45, the camera 300 performs image pickup. Specifically, the image pickup element 300*a* captures reflection light rays (corneal reflection light rays) on the eyeball EB of the second linearly polarized light rays L12$_{PD2}$ via the two first optical elements 215-1 and the two second optical elements 215-2 and outputs captured image data which is the obtained image pickup result to the corneal reflection image detection unit 400*a*.

In next Step S46, the detection system 400-12 detects corneal reflection images (Purkinje images). Specifically, the corneal reflection image detection unit 400*a* detects high-luminance images on the captured image data output from the image pickup element 300*a* in Step S45 as the corneal reflection images. At this time, on the captured image data, a plurality of (e.g., four) corneal reflection images corresponding to the plurality of (e.g., four) optical elements 215 is detected in a state spaced apart from each other (see C of FIG. 4), and they can be separated from each other with high accuracy.

In next Step S47, the detection system 400-12 corrects position errors of the corneal reflection images due to the depth of the eyeball EB. Specifically, the correction unit 400*e* determines position errors of the corneal reflection images from reference positions due to the depth of the eyeball EB on the basis of the plurality of (e.g., four) corneal reflection images of the first linearly polarized light rays L12$_{PD1}$ which has been detected in Step S43 and the plurality of (e.g., four) corneal reflection images of the second linearly polarized light rays L12$_{PD2}$ which has been detected in Step S46, calculates positions of the corneal reflection images whose position errors have been corrected, and outputs the obtained calculation result to the gaze estimation unit 400*b*.

In last Step S48, the detection system 400-12 estimates a gaze. Specifically, the gaze estimation unit 400*b* performs predetermined arithmetic operations on the basis of the corrected positions of the corneal reflection images from the correction unit 400*e*, calculates a gaze which is an orientation of the eyeball EB, and outputs the obtained calculation result.

In the eyeball information detection apparatus 10-13 according to Example 13, switching is performed between the first and second light sources whose polarization directions are orthogonal to each other. However, for example, the non-visible light ray from the first light source may be converted into the first linearly polarized light ray through a first polarizing plate and the non-visible light ray from the second light source may be converted into the second linearly polarized light ray (whose polarization direction is orthogonal to that of the first linearly polarized light ray) through a second polarizing plate.

In accordance with the eyeball information detection apparatus 10-13 according to Example 13, effects similar to those of the eyeball information detection apparatus 10-12 according to Example 12 are provided.

<17. Eyeball Information Detection Apparatus According to Example 14 of Embodiment of Present Technology>

Figure 33:
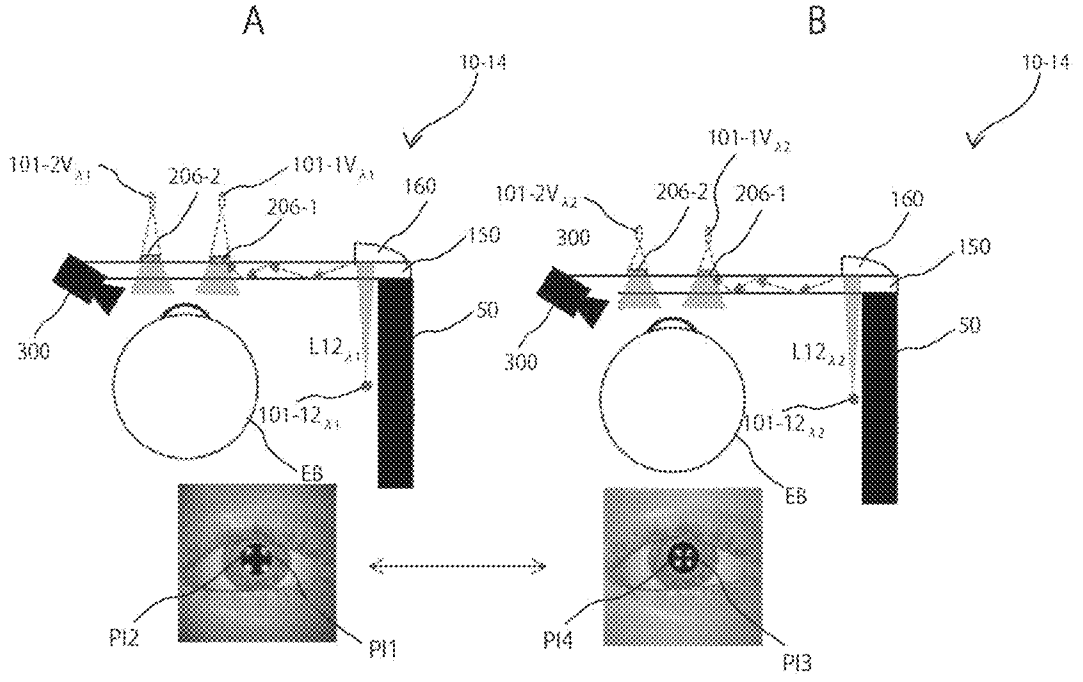
FIG. 33 A of FIG. 33 and B of FIG. 33 are views showing configurations of an eyeball information detection apparatus according to Example 14 of the embodiment of the present technology.
Figure 34:
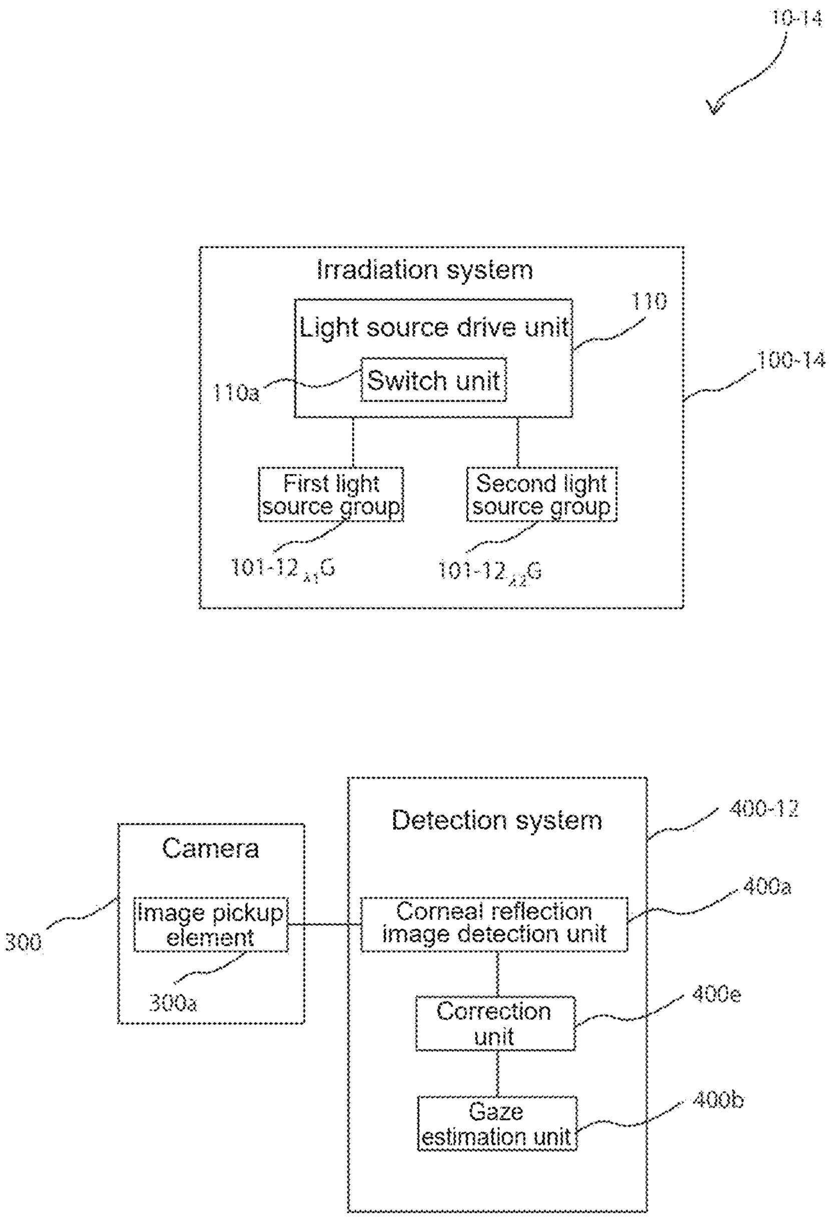
FIG. 34 A block diagram showing functions of the eyeball information detection apparatus according to Example 14 of the embodiment of the present technology.
Figure 35:
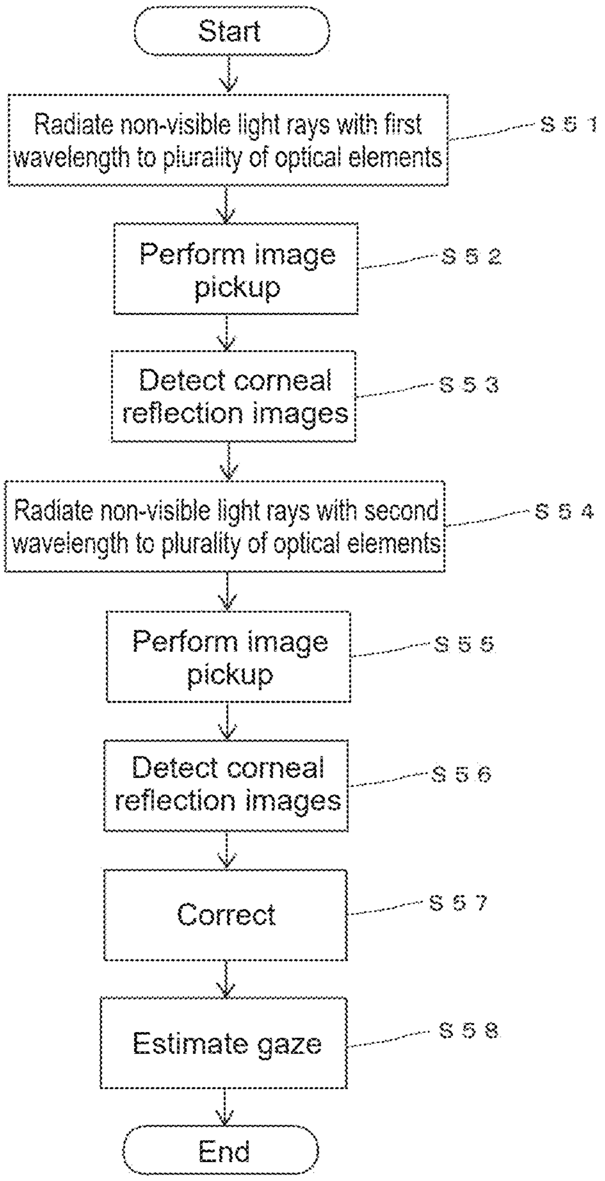
FIG. 35 A flowchart for describing operations of the eyeball information detection apparatus according to Example 14 of the embodiment of the present technology.

Hereinafter, an eyeball information detection apparatus according to Example 14 of the embodiment of the present technology will be described with reference to A of FIG. 33 to FIG. 35. A of FIG. 33 is a view of the eyeball information detection apparatus 10-14 according to Example 14 as viewed from above (Part 1). B of FIG. 33 is a view of the eyeball information detection apparatus 10-14 according to Example 14 as viewed from above (Part 2). FIG. 34 is a block diagram showing functions of the eyeball information detection apparatus 10-14 according to Example 14. FIG. 35 is a flowchart for describing operations of the eyeball information detection apparatus 10-14 according to Example 14.

As shown in A of FIG. 33 to FIG. 34, the eyeball information detection apparatus 10-14 according to Example 14 has configurations substantially similar to those of the eyeball information detection apparatus 10-5 according to Example 5 except for the fact that a plurality of optical elements 206 (e.g., two first optical elements 206-1 and two second optical elements 206-2) are diffractive elements having wavelength selectivity (diffractive elements with diffraction power that depends on a light emission wavelength), a first light source group 101-2$V_{\lambda 1}$G includes a first light source 101-12$_{\lambda 1}$ corresponding to each pair of first and second optical elements 206-1 and 206-2, a second light source group 101-2$V_{\lambda 2}$G includes a second light source 101-12$_{\lambda 2}$ corresponding to each pair of first and second optical elements 206-1 and 206-2, and first and second light sources 101-12$_{\lambda 1}$ and 101-12$_{\lambda 2}$ have different light emission wavelengths.

An irradiation system 100-14 of the eyeball information detection apparatus 10-14 includes the light source drive unit 110 that selectively drives first and second light source groups 101-12$_{\lambda 1}$G and 101-12$_{\lambda 2}$G. The light source drive unit 110 includes the switch unit 110*a* that switches the driving target between the first light source group 101-12$_{\lambda 1}$G and the second light source group 101-12$_{\lambda 2}$G (see FIG. 34).

The first light source group 101-12$_{\lambda 1}$G includes a plurality of (e.g., two) first light sources 101-12$_{\lambda 1}$ for a light emission wavelength λ1 (that emits a non-visible light ray with a first wavelength λ1) (see A of FIG. 33 and B of FIG. 33). The plurality of (e.g., two) first light sources 101-12$_{\lambda 1}$ is arranged on the upper and lower sides.

The second light source group 101-12$_{\lambda 2}$G includes a plurality of (e.g., two) second light source 101-12$_{\lambda 2}$ for a light emission wavelength λ2 (that emits a non-visible light ray with a second wavelength λ2) (see A of FIG. 33 and B of FIG. 33). The plurality of (e.g., two) second light source 101-12$_{\lambda 2}$ is arranged on the upper and lower sides.

The two first optical elements 206-1 are arranged on the upper and lower sides. The two second optical elements 206-2 are arranged on the upper and lower sides.

The first and second optical elements 206-1 and 206-2 on the upper side correspond to the first and second light sources 101-12$_{\lambda 1}$ and 101-12$_{\lambda 2}$ on the upper side.

The first and second optical elements 206-1 and 206-2 on the lower side correspond to the first and second light sources 101-12$_{\lambda 1}$ and 101-12$_{\lambda 2}$ on the lower side.

The respective optical elements 206 are, as an example, reflective-type diffractive elements provided on the surface of the substrate 150 which is on the side opposite to the side of the eyeball EB and diffraction power for diffracting light with the wavelength λ1 is smaller than diffraction power for diffracting light with the wavelength λ2.

It should be noted that the respective optical elements 206 may be transmissive-type diffractive elements provided on the surface of the substrate 150 which is located on the side of the eyeball EB.

As shown in A of FIG. 33, non-visible light rays L12$_{\lambda 1}$ emitted from the respective first light sources 101-12$_{\lambda 1}$ in the first light source group 101-12$_{\lambda 1}$G are made incident upon the substrate 150 via the substrate 150 and the prism 160 are propagated while being totally internally reflected inside the substrate 150 and are sequentially radiated to the corresponding first and second optical elements 206-1 and 206-2. When the first and second optical elements 206-1 and 206-2 are irradiated with the non-visible light rays L12$_{\lambda 1}$, the first and second optical elements 206-1 and 206-2 respectively generate virtual light sources 101-1V$_{\lambda 1}$ and 101-2V$_{\lambda 1}$ of the non-visible light rays L12$_{\lambda 1}$ at positions relatively far from the substrate 150.

As shown in B of FIG. 33, non-visible light rays L12$_{\lambda 2}$ emitted from the respective second light sources 101-12$_{\lambda 2}$ in the second light source group 101-12$_{\lambda 2}$G are made incident upon the substrate 150 via the substrate 150 and the prism 160, are propagated while being totally internally reflected inside the substrate 150, and are sequentially radiated to the corresponding first and second optical elements 206-1 and 206-2. When the first and second optical elements 206-1 and 206-2 are irradiated with the non-visible light rays L12$_{\lambda 2}$, the first and second optical elements 206-1 and 206-2 respectively generate virtual light sources 101-1V$_{\lambda 2}$ and 101-2V$_{\lambda 2}$ of the non-visible light rays L12$_{\lambda 2}$ at positions relatively close to the substrate 150.

Hereinafter, operations of the eyeball information detection apparatus 10-14 (eyeball information detection method using the eyeball information detection apparatus 10-14) will be described with reference to the flowchart in FIG. 34.

In first Step S51, the irradiation system 100-14 radiates the non-visible light rays L12$_{\lambda 1}$ with the first wavelength 21 to the two first optical elements 206-1 and the two second optical elements 206-1. Specifically, the light source drive unit 110 drives the two first light sources 101-12$_{\lambda 1}$. Accordingly, the non-visible light rays L12$_{\lambda 1}$ emitted from the respective first light sources 101-12$_{\lambda 1}$ are sequentially radiated to the corresponding first and second optical elements 206-1 and 206-2 and the first and second optical elements 206-1 and 206-2 respectively generate the virtual light sources 101-1V$_{\lambda 1}$ and 101-2V$_{\lambda 1}$. The non-visible light rays L12$_{\lambda 1}$ via the first and second optical elements 206-1 and 202-6 are radiated to the eyeball EB and reflected on the eyeball EB.

In next Step S52, the camera 300 performs image pickup. Specifically, the image pickup element 300*a* captures reflection light rays (corneal reflection light rays) on the eyeball EB of the non-visible light rays L12$_{\lambda 1}$ via the two first optical elements 206-1 and the two second optical elements 206-2 and outputs captured image data which is the obtained image pickup result to the corneal reflection image detection unit 400*a*.

In next Step S53, the detection system 400-12 detects corneal reflection images (Purkinje images). Specifically, the corneal reflection image detection unit 400*a* detects high-luminance images on the captured image data output from the image pickup element 300*a* in Step S52 as the corneal reflection images. At this time, on the captured image data, a plurality of (e.g., four) corneal reflection images corresponding to a plurality of (e.g., four) optical elements 206 is detected in a state spaced apart from each other (see C of FIG. 4), and they can be separated from each other with high accuracy.

In next Step S54, the irradiation system 100-14 radiates the non-visible light rays L12$_{\lambda 2}$ with the second wavelength 22 to the two first optical elements 206-1 and the two second optical elements 206-2. Specifically, the light source drive unit 110 drives the two second light sources 101-12$_{\lambda 2}$. Accordingly, the non-visible light rays L12$_{\lambda 2}$ emitted from the respective second light sources 101-12$_{\lambda 2}$ are sequentially radiated to the corresponding first and second optical elements 206-1 and 206-2 and the first and second optical elements 206-1 and 206-2 respectively generate the virtual light sources 101-1V$_{\lambda 2}$ and 101-2V$_{\lambda 2}$. The non-visible light rays L12$_{\lambda 2}$ via the first and second optical elements 206-1 and 206-2 are radiated to the eyeball EB and reflected on the eyeball EB.

In next Step S55, the camera 300 performs image pickup. Specifically, the image pickup element 300*a* captures reflection light rays (corneal reflection light rays) on the eyeball EB of the non-visible light rays L12$_{\lambda 2}$ via the two first optical elements 206-1 and the two second optical elements 206-2 and outputs captured image data which is the obtained image pickup result to the corneal reflection image detection unit 400*a*.

In next Step S56, the detection system 400-12 detects corneal reflection images (Purkinje images). Specifically, the corneal reflection image detection unit 400*a* detects high-luminance images on the captured image data output from the image pickup element 300*a* in Step S55 as the corneal reflection images. At this time, on the captured image data, a plurality of (e.g., four) corneal reflection images corresponding to a plurality of (e.g., four) optical elements 206 is detected in a state spaced apart from each other (see C of FIG. 4), and they can be separated from each other with high accuracy.

In next Step S57, the detection system 400-12 corrects position errors of the corneal reflection images due to the depth of the eyeball EB. Specifically, the correction unit 400*e* determines position errors of the corneal reflection images from reference positions due to the depth of the eyeball EB on the basis of the plurality of (e.g., four) corneal reflection images of the non-visible light rays L12$_{\lambda 1}$ which has been detected in Step S53 and the plurality of (e.g., four) corneal reflection images of the non-visible light rays $L12_{\lambda 2}$ which has been detected in Step S56, calculates positions of the corneal reflection images whose position errors have been corrected, and outputs the obtained calculation result to the gaze estimation unit 400*b*.

In last Step S58, the detection system 400-12 estimates a gaze. Specifically, the gaze estimation unit 400*b* performs predetermined arithmetic operations on the basis of the corrected positions of the corneal reflection images from the correction unit 400*e*, calculates a gaze which is an orientation of the eyeball EB, and outputs the obtained calculation result.

In accordance with the eyeball information detection apparatus 10-14 according to Example 14, effects similar to those of the eyeball information detection apparatus 10-12 according to Example 12 are provided.

<18. Eyeball Information Detection Apparatus According to Example 15 of Embodiment of Present Technology>

Figure 36:
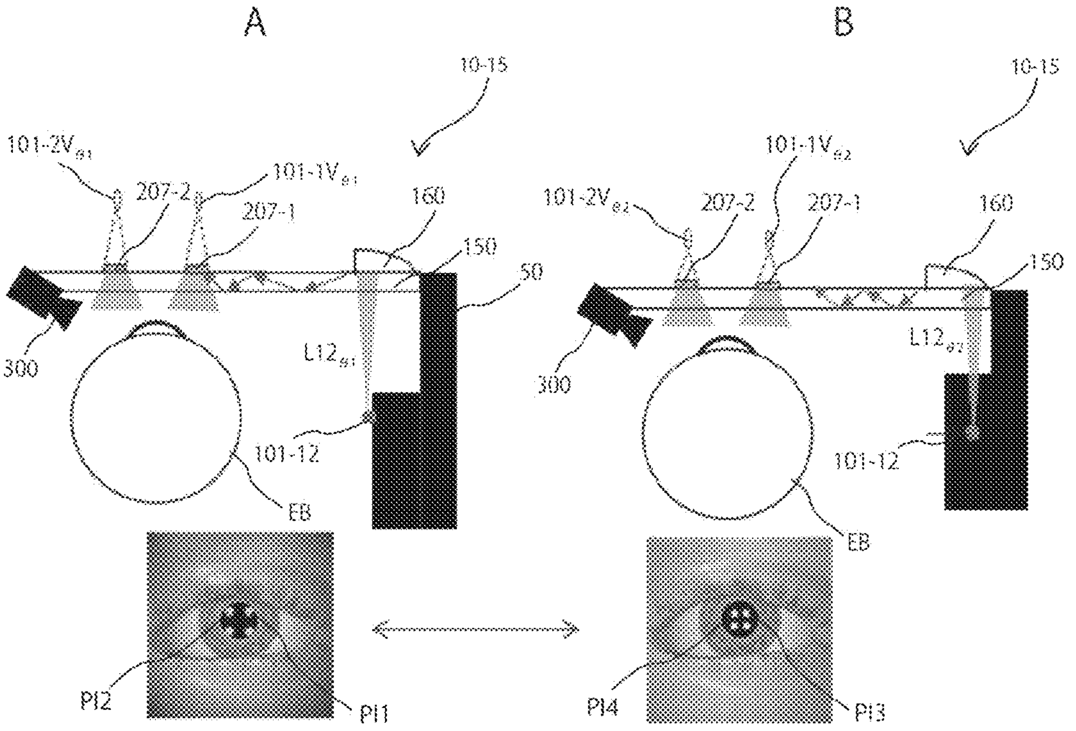
FIG. 36 A of FIG. 36 and B of FIG. 36 are views showing configurations of an eyeball information detection apparatus according to Example 15 of the embodiment of the present technology.
Figure 37:
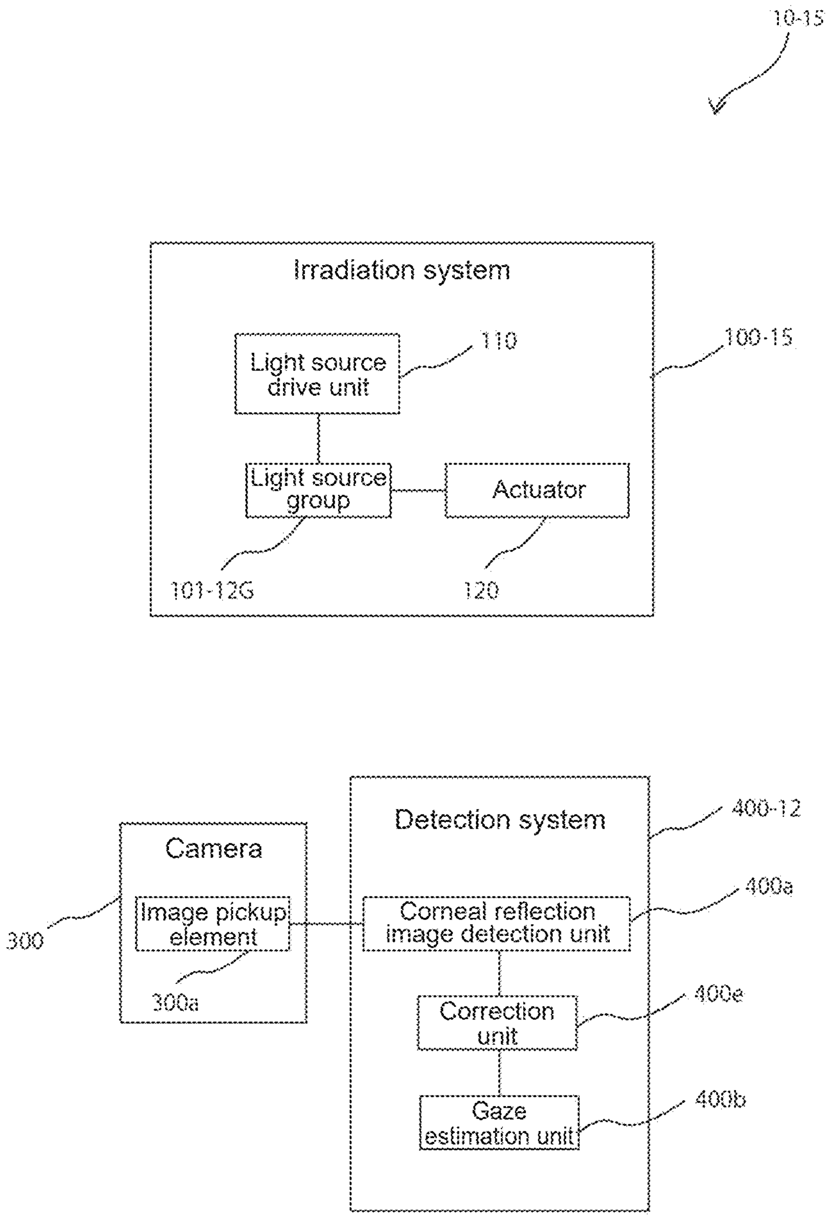
FIG. 37 A block diagram showing functions of the eyeball information detection apparatus according to Example 15 of the embodiment of the present technology.
Figure 38:
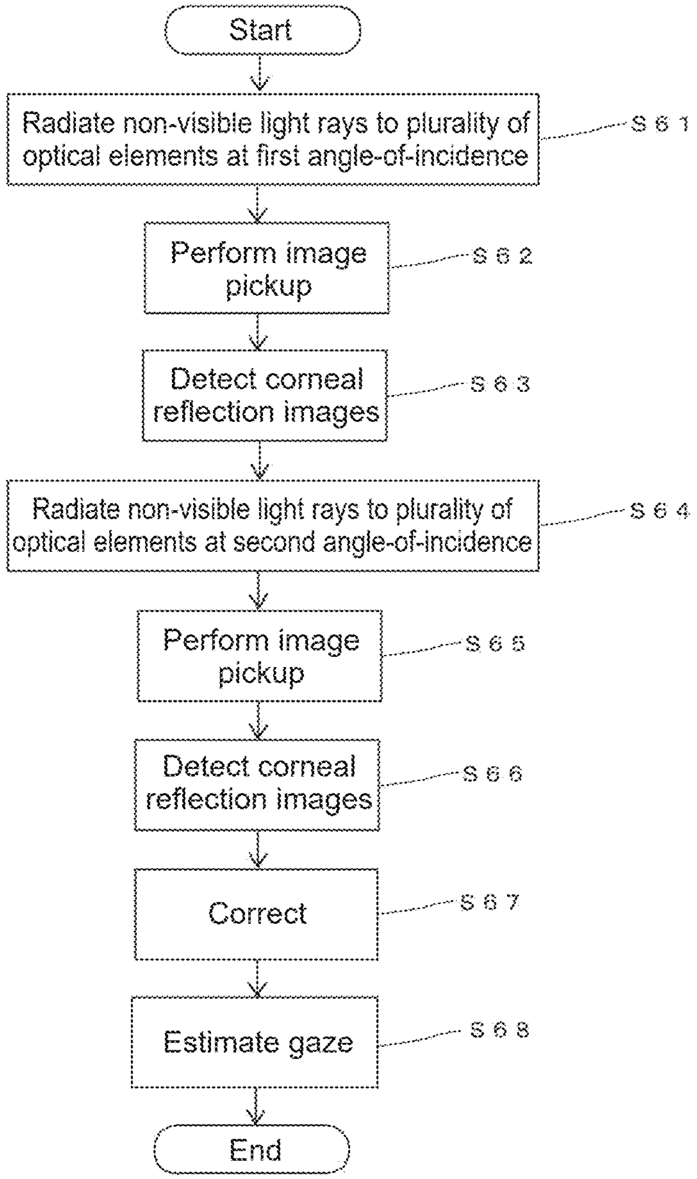
FIG. 38 A flowchart for describing operations of the eyeball information detection apparatus according to Example 15 of the embodiment of the present technology.

Hereinafter, an eyeball information detection apparatus according to Example 15 of the embodiment of the present technology will be described with reference to A of FIG. 36 to FIG. 38. A of FIG. 36 is a view of the eyeball information detection apparatus 10-15 according to Example 15 as viewed from above (Part 1). B of FIG. 36 is a view of the eyeball information detection apparatus 10-15 according to Example 15 as viewed from above (Part 2). FIG. 37 is a block diagram showing functions of the eyeball information detection apparatus 10-15 according to Example 15. FIG. 38 is a flowchart for describing operations of the eyeball information detection apparatus 10-15 according to Example 15.

As shown in A of FIG. 36 to FIG. 37, the eyeball information detection apparatus 10-15 according to Example 15 has configurations substantially similar to those of the eyeball information detection apparatus 10-5 according to Example 5 except for the fact that a plurality of optical elements 207 (e.g., two first optical elements 207-1 and the two second optical elements 207-2) are diffractive elements having dependence on an angle-of-incidence (diffractive elements whose diffraction power depends on an angle-of-incidence) and an irradiation system 100-15 is capable of varying the angle-of-incidence of the non-visible light ray upon each diffractive element.

The irradiation system 100-15 of the eyeball information detection apparatus 10-15 includes the light source drive unit 110 that drives the light source group 101-12G and an actuator 120 that moves the light source group 101-12G (see FIG. 37).

The light source group 101-12G includes a plurality of (e.g., two) light sources 101-12 (see A of FIG. 36 and B of FIG. 36). The plurality of (e.g., two) light sources 101-12 is arranged on the upper and lower sides.

The actuator 120 integrally moves the plurality of (e.g., two) light sources 101-12 of the light source group 101-12G leftwards or rightwards.

The two first optical elements 207-1 are arranged on the upper and lower sides. The two second optical elements 207-2 are arranged on the upper and lower sides.

The first and second optical elements 207-1 and 207-2 on the upper side correspond to the light source 101-12 on the upper side.

The first and second optical elements 207-1 and 206-2 on the lower side corresponds to the light source 101-12 on the lower side.

The respective optical elements 207 are, as an example, reflective-type diffractive elements provided on the surface of the substrate 150 which is on the side opposite to the side of the eyeball EB and diffraction power for diffracting light made incident upon at a first angle-of-incidence θ1 is smaller than diffraction power for diffracting light made incident upon at a second angle-of-incidence θ2.

It should be noted that the respective optical elements 207 may be transmissive-type diffractive elements provided on the surface of the substrate 150 which is located on the side of the eyeball EB.

As shown in A of FIG. 36, the non-visible light rays $L12_{\theta 1}$ emitted from the respective light sources 101-12 of the light source group 101-12G located on the left-hand side are made incident upon the substrate 150 via the substrate 150 and the prism 160 at the first angle-of-incidence θ1 (angle-of-incidence equal to or larger than the critical angle), are propagated while being totally internally reflected inside the substrate 150, and are made incident upon the corresponding first and second optical elements 207-1 and 207-2 at the first angle-of-incidence θ1. When the first and second optical elements 207-1 and 207-2 are irradiated with the non-visible light rays $L12_{\theta 1}$, the first and second optical elements 207-1 and 207-2 respectively generate the virtual light sources 101-1$V_{\theta 1}$ and 101-2$V_{\theta 1}$ of the non-visible light rays $L12_{\theta 1}$ at positions relatively far from the substrate 150.

As shown in B of FIG. 36, the non-visible light rays $L12_{\theta 2}$ emitted from the respective light sources 101-12 of the light source group 101-12G located on the right-hand side are made incident upon the substrate 150 via the substrate 150 and the prism 160 at the second angle-of-incidence θ2 (angle-of-incidence equal to or larger than the critical angle), are propagated while being totally internally reflected inside the substrate 150, and str made incident upon the corresponding first and second optical elements 207-1 and 207-2 at the second angle-of-incidence θ2. When the first and second optical elements 207-1 and 207-2 are irradiated with the non-visible light rays $L12_{\theta 2}$, the first and second optical elements 207-1 and 207-2 respectively generate the virtual light sources 101-1$V_{\theta 2}$ and 101-2$V_{\theta 2}$ of the non-visible light rays $L12_{\theta 2}$ at positions relatively close to the substrate 150.

Hereinafter, operations of the eyeball information detection apparatus 10-15 (eyeball information detection method using the eyeball information detection apparatus 10-15) will be described with reference to the flowchart in FIG. 38.

In first Step S61, the irradiation system 100-15 radiates the non-visible light rays $L12_{\theta 1}$ to the two first optical elements 207-1 and the two second optical elements 207-2 at the first angle-of-incidence θ1. Specifically, the light source drive unit 110 drives the two light sources 101-12 located on the left-hand side through the actuator 120. Accordingly, the non-visible light rays L12 emitted from the respective light sources 101-12 are radiated to the corresponding first and second optical elements 207-1 and 207-2 at the first angle-of-incidence θ1 and the first and second optical elements 207-1 and 207-2 respectively generate the virtual light sources 101-1$V_{\theta 1}$ and 101-2$V_{\theta 1}$ (see A of FIG. 36). The non-visible light rays $L12_{\theta 1}$ via the first and second optical elements 207-1 and 207-2 are radiated to the eyeball EB and reflected on the eyeball EB.

In next Step S62, the camera 300 performs image pickup. Specifically, the image pickup element 300*a* captures reflection light rays (corneal reflection light rays) on the eyeball EB of the non-visible light rays $L12_{\theta 1}$ via the two first optical elements 207-1 and the two second optical elements 207-2 and outputs captured image data which is the obtained image pickup result to the corneal reflection image detection unit 400*a*.

In next Step S63, the detection system 400-12 detects corneal reflection images (Purkinje images). Specifically, the corneal reflection image detection unit 400*a* detects high-luminance images on the captured image data output from the image pickup element 300*a* in Step S62 as the corneal reflection images. At this time, on the captured image data, a plurality of (e.g., four) corneal reflection images corresponding to a plurality of (e.g., four) optical elements 207 is detected in a state spaced apart from each other (see C of FIG. 4), and they can be separated from each other with high accuracy.

In next Step S64, the irradiation system 100-15 radiates the non-visible light rays $L12_{\theta 2}$ to the two first optical elements 207-1 and the two second optical elements 207-2 at the second angle-of-incidence θ2. Specifically, the light source drive unit 110 drives the two second light sources 101-12 located on the right-hand side through the actuator 120. Accordingly, the non-visible light rays $L12_{\theta 2}$ emitted from the respective light sources 101-12 are sequentially radiated to the corresponding first and second optical elements 207-1 and 207-2 and the first and second optical elements 207-1 and 207-2 respectively generate the virtual light sources $101\text{-}1V_{\theta 2}$ and $101\text{-}2V_{\theta 2}$ (see B of FIG. 36). The non-visible light rays $L12_{\theta 2}$ via the first and second optical elements 207-1 and 207-2 are radiated to the eyeball EB and reflected on the eyeball EB.

In next Step S65, the camera 300 performs image pickup. Specifically, the image pickup element 300*a* captures reflection light rays (corneal reflection light rays) on the eyeball EB of the non-visible light rays $L12_{\theta 2}$ via the two first optical elements 207-1 and the two second optical elements 207-2 and outputs captured image data which is the obtained image pickup result to the corneal reflection image detection unit 400*a*.

In next Step S66, the detection system 400-12 detects corneal reflection images (Purkinje images). Specifically, the corneal reflection image detection unit 400*a* detects high-luminance images on the captured image data output from the image pickup element 300*a* in Step S65 as the corneal reflection images. At this time, on the captured image data, the plurality of (e.g., four) corneal reflection images corresponding to the plurality of (e.g., four) optical elements 207 is detected in a state spaced apart from each other (see C of FIG. 4), and they can be separated from each other with high accuracy.

In next Step S67, the detection system 400-12 corrects position errors of the corneal reflection images due to the depth of the eyeball EB. Specifically, the correction unit 400*e* determines position errors of the corneal reflection images from reference positions due to the depth of the eyeball EB on the basis of the plurality of (e.g., four) corneal reflection images of the non-visible light rays $L12_{\theta 1}$ which has been detected in Step S63 and the plurality of (e.g., four) corneal reflection images of the non-visible light rays $L12_{\theta 2}$ which has been detected in Step S66, calculates positions of the corneal reflection images whose position errors have been corrected, and outputs the obtained calculation result to the gaze estimation unit 400*b*.

In last Step S68, the detection system 400-12 estimates a gaze. Specifically, the gaze estimation unit 400*b* performs predetermined arithmetic operations on the basis of the corrected positions of the corneal reflection images from the correction unit 400*e*, calculates a gaze which is an orientation of the eyeball EB, and outputs the obtained calculation result.

In accordance with the eyeball information detection apparatus 10-15 according to Example 15, effects similar to those of the eyeball information detection apparatus 10-12 according to Example 12 are provided.

<19. Display Apparatus Including Eyeball Information Detection Apparatus According to Example 7 of Embodiment of Present Technology>

Figure 39:
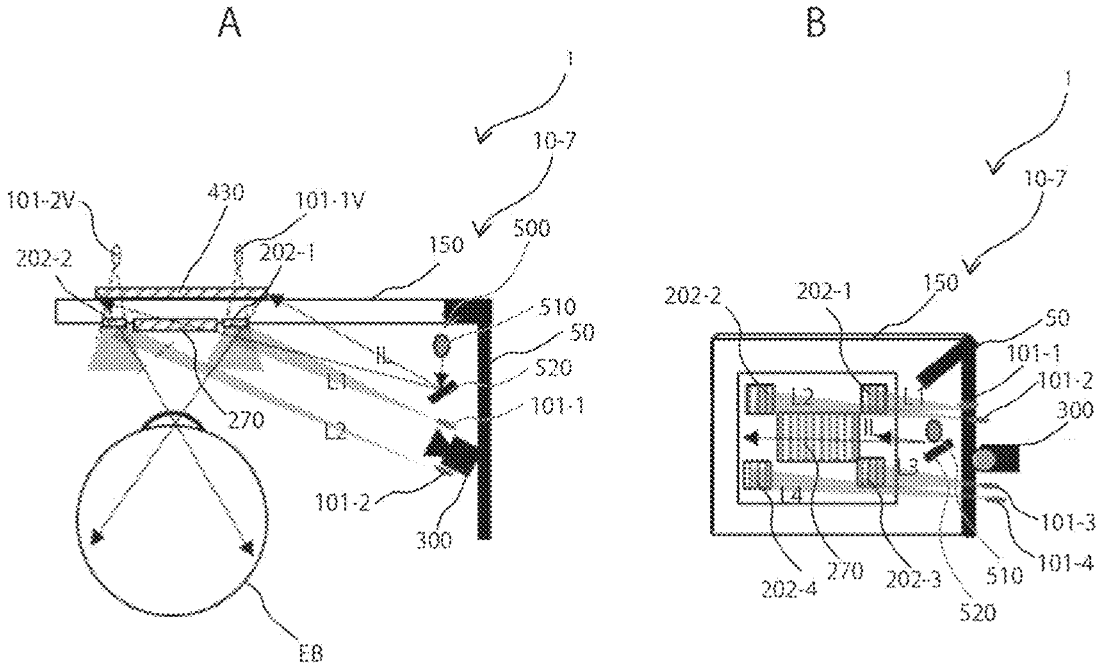
FIG. 39 A of FIG. 39 and B of FIG. 39 are views showing configurations of a display apparatus including the eyeball information detection apparatus according to Example 7 of embodiment of the present technology.
Figure 40:
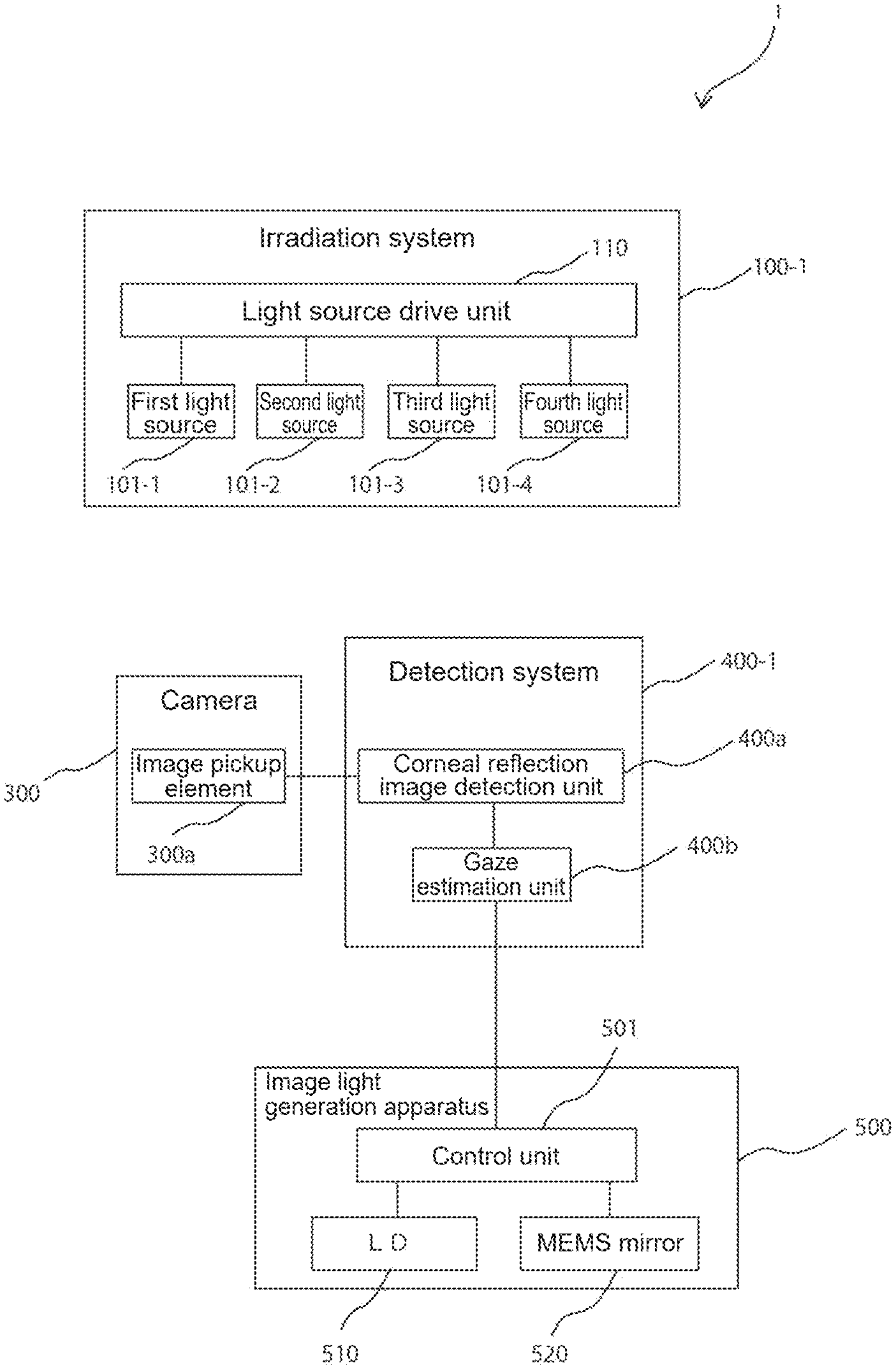
FIG. 40 A block diagram showing functions of the display apparatus including the eyeball information detection apparatus according to Example 7 of embodiment of the present technology.
Figure 41:
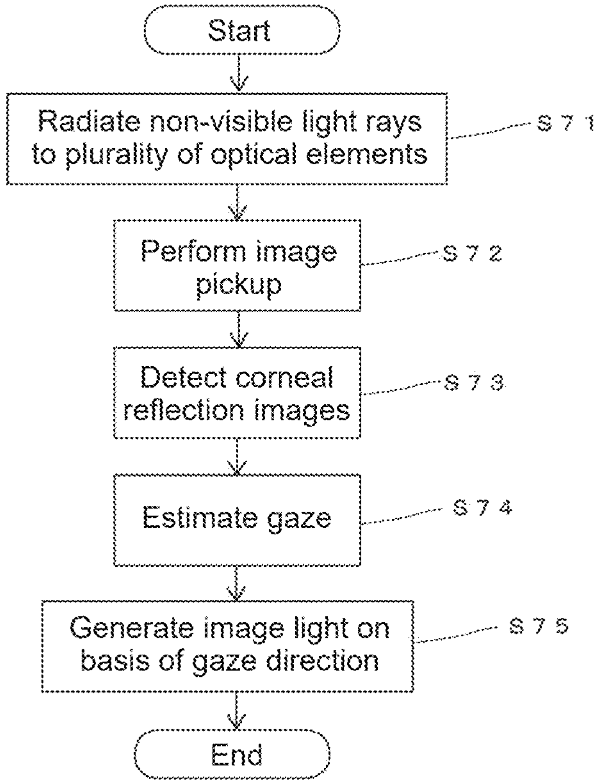
FIG. 41 A flowchart for describing operations of the display apparatus including the eyeball information detection apparatus according to Example 7 of embodiment of the present technology.

Hereinafter, a display apparatus 1 including the eyeball information detection apparatus 10-7 according to Example 7 of the embodiment of the present technology will be described with reference to A of FIG. 39 to FIG. 41. A of FIG. 39 is a view as viewed from above of the display apparatus 1. B of FIG. 39 is a view of the display apparatus 1 as viewed from the side of the eyeball EB. FIG. 40 is a block diagram showing functions of the display apparatus 1. FIG. 41 is a flowchart for describing operations of the display apparatus 1.

The display apparatus 1 can also be applied to AR display and can also be applied to VR display.

As shown in A of FIG. 39 to FIG. 40, the display apparatus 1 includes, in addition to the eyeball information detection apparatus 10-7, an image light generation apparatus 500 and an image display optical element 430 (optical system) that is provided on the substrate 150 and guides image light IL from the image light generation apparatus 500 to the eyeball EB. The image light generation apparatus 500 generates the image light IL on the basis of a detection result of the eyeball information detection apparatus 10-7.

The image light generation apparatus 500 is, as an example, provided to the temple of the eyeglass frame as the support member 50.

The image light generation apparatus 500 includes an LD 510 (edge-emitting laser) that emits visible light (laser light), a MEMS mirror 520 as a deflector that deflects the visible light from the LD 510, and a control unit 501 that controls the LD 510 and the MEMS mirror 520.

It should be noted that for example a VCSEL (surface emitting laser) may be used in place of the LD.

The control unit 501 controls the LD 510 and the MEMS mirror 520 on the basis of the image data, thereby generating the image light IL. The control unit 501 is realized for example by hardware including a CPU and a chip set.

The image display optical element 430 is, for example, a reflective-type diffractive element.

In the image light generation apparatus 500, image light IL generated by the visible light from the LD 510 being deflected by the MEMS mirror 520 is radiated to the image display optical element 430. The image light IL radiated to the image display optical element 430 is reflected and diffracted towards the eyeball EB through the image display optical element 430 and is radiated to the eyeball EB. Accordingly, the user can visually recognize an image.

Hereinafter, operations of the display apparatus 1 (display method using the display apparatus 1) will be described with reference to the flowchart in FIG. 41.

In first Step S71, the irradiation system 100-1 radiates non-visible light rays to the plurality of (e.g., four) optical elements 201. Specifically, the light source drive unit 110 drives (lights up) the first to fourth light sources 101-1 to 101-4 individually corresponding to the first to fourth optical elements 201-1 to 201-4. Accordingly, the non-visible light rays emitted from the respective light sources 101 are radiated to the corresponding optical elements 202 and the optical elements 202 generate virtual light sources. The non-visible light rays via the optical elements 202 are radiated to the eyeball EB and reflected on the eyeball EB.

In next Step S72, the camera 300 performs image pickup. Specifically, the image pickup element 300*a* captures reflection light rays (corneal reflection light rays) on the eyeball EB of the non-visible light rays via the respective optical elements 201, and outputs captured image data which is the obtained image pickup result to the corneal reflection image detection unit 400*a*.

In next Step S73, the detection system 400-1 detects corneal reflection images (Purkinje images). Specifically, the corneal reflection image detection unit 400*a* detects high-luminance images on the captured image data from the image pickup element 300*a* as the corneal reflection images. At this time, on the captured image data, a plurality of corneal reflection images corresponding to the plurality of optical elements 202 is detected in a state spaced apart from each other (see C of FIG. 4), and they can be separated from each other with high accuracy.

In next Step S74, the detection system 400-1 estimates a gaze. Specifically, the gaze estimation unit 400*b* calculates a gaze which is an orientation of the eyeball EB by predetermined arithmetic operations on the basis of positions of the corneal reflection images detected by the corneal reflection image detection unit 400*a* and outputs the obtained calculation result.

In last Step S75, the image light generation apparatus 500 generates image light on the basis of the gaze direction. Specifically, the control unit 501 controls the LD 510 and the MEMS mirror 520 so that the image is displayed in a field-of-view area having the gaze direction from the detection system 400-1 as its center.

In accordance with the display apparatus 1, the image light is generated on the basis of the gaze detected by the eyeball information detection apparatus 10-7 with high accuracy. Therefore, an image excellent in visibility can be displayed irrespective of the user's gaze direction.

The display method using the display apparatus 1 includes a step of radiating non-visible light rays to the plurality of optical elements 202 provided on the substrate 150 so as to face the eyeball EB of the user and generating virtual light sources of the non-visible light rays, a step of receiving non-visible light rays respectively reflected on the eyeball EB via the plurality of optical elements 202, a step of detecting eyeball information (e.g., an orientation of the eyeball EB) that is the information about the eyeball EB on the basis of a light reception result at the step of receiving, and a step of generating image light IL on the basis of a detection result at the step of detecting and guiding the image light IL to the eyeball EB.

In accordance with the display method, an image excellent in visibility can be contently displayed to the user.

<20. Modified Examples of Present Technology>

The configurations of the eyeball information detection apparatus according to each Example of the present technology and the display apparatus including the eyeball information detection apparatus, which have been described hereinabove, can be modified as appropriate.

For example, although the eyeball information detection apparatus according to each Example described above includes the four or three optical elements that generate the virtual light sources, the eyeball information detection apparatus may include only one or two optical elements or may include five or more optical elements.

For example, although in the display apparatus 1 including the eyeball information detection apparatus 10-7 according to Example 7, the image light generation apparatus 500 is a scanning-type, the image light generation apparatus 500 may be a non-scanning-type including a display.

For example, in the eyeball information detection apparatus according to each Example described above and the display apparatus, a multi-segmented photodiode (PD) having a plurality of light reception areas may be used or a photodiode (PD) having a single light reception area may be used as the light reception element in place of the image sensor.

The operation flow of the above-mentioned eyeball information detection apparatus (flow of the eyeball information detection method) and the operation flow of the above-mentioned display apparatus (flow of the display method) may be repeated multiple times for each frame.

In the eyeball information detection apparatus according to each Example described above and the display apparatus, the type, number, shape, arrangement, and the like of the light sources and the optical elements can be modified as appropriate.

At least some of the configurations of the eyeball information detection apparatus according to each Example described above may be combined with each other in a reasonable range.

Moreover, the present technology can also take the following configurations.

(1) An eyeball information detection apparatus, including:
- a support member that is mounted on a head of a user;
- a substrate provided to the support member so as to face an eyeball of the user;
- an irradiation system that is provided to the support member and includes at least one light source that emits non-visible light towards the substrate;
- at least one optical element that is provided to the substrate so that the at least one optical element is irradiated with the non-visible light, generates a virtual light source of the non-visible light, and is not a plane mirror;
- a light reception system that receives the non-visible light reflected on the eyeball via the optical element and includes a light reception element; and
- a detection system that detects eyeball information that is information about the eyeball on the basis of an output from the light reception system.

(2) The eyeball information detection apparatus according to (1), in which
- the at least one optical element is a plurality of optical elements.

(3) The eyeball information detection apparatus according to (2), in which
- the plurality of optical elements includes at least three optical elements two-dimensionally arranged in an in-plane direction of the substrate.

(4) The eyeball information detection apparatus according to (2) or (3), in which
- the at least one light source is a plurality of light sources.

(5) The eyeball information detection apparatus according to (4), in which
- the plurality of light sources includes at least two light sources corresponding to different optical elements of the plurality of optical elements.

(6) The eyeball information detection apparatus according to (4) or (5), in which
- the plurality of light sources individually corresponds to the plurality of optical elements.

(7) The eyeball information detection apparatus according to any one of (2) to (6), in which
- the at least one light source includes light sources corresponding to at least two optical elements of the plurality of optical elements.

(8) The eyeball information detection apparatus according to (2) or (3), in which the at least one light source is a single light source corresponding to the plurality of optical elements.

(9) The eyeball information detection apparatus according to (1) to (8), in which the at least one optical element is larger in number than the at least one light source.

(10) The eyeball information detection apparatus according to any one of (4) to (9), in which each of the plurality of light sources corresponds to at least two optical elements of the plurality of optical elements, and the non-visible light from each of the plurality of light sources is propagated inside the substrate and is radiated to the at least two corresponding optical elements.

(11) The eyeball information detection apparatus according to (2) to (10), in which an optical member that guides the non-visible light from the light source to the plurality of optical elements is provided to the substrate.

(12) The eyeball information detection apparatus according to (11), in which the non-visible light from the light source is propagated inside the substrate and is radiated to the plurality of optical elements via the optical member.

(13) The eyeball information detection apparatus according to (1) to (12), in which the light reception system is provided to the substrate.

(14) The eyeball information detection apparatus according to any one of (1) to (13), in which the support member includes a temple including an ear hook portion, the light reception system is provided to the temple, and another optical element that guides the non-visible light reflected on the eyeball to a light reception system is provided to the substrate.

(15) The eyeball information detection apparatus according to (14), in which the plurality of optical elements is provided in a periphery of the other optical element on the substrate.

(16) The eyeball information detection apparatus according to any one of (1) to (15), in which the support member includes a temple including an ear hook portion, and the light source is provided to the temple.

(17) The eyeball information detection apparatus according to any one of (1) to (15), in which the support member includes a temple including an ear hook portion and an extension portion extending to a side of the substrate which is opposite to a side of the ear hook portion, and the light source is provided to the extension portion.

(18) The eyeball information detection apparatus according to any one of (1) to (17), in which the optical element is a reflective-type.

(19) The eyeball information detection apparatus according to any one of (1) to (18), in which the optical element is a diffractive element.

(20) The eyeball information detection apparatus according to (19), in which the diffractive element has a non-uniform pitch.

(21) The eyeball information detection apparatus according to (19) or (20), in which the diffractive element is a wavefront reconstruction-type.

(22) The eyeball information detection apparatus according to (21), in which the at least one optical element is a plurality of diffractive elements, wavefront shapes recorded on at least two of the plurality of diffractive elements are different, and the detection system has a fitting unit that fits a plurality of reflection images of the non-visible light on the eyeball to wavefront shapes recorded on the plurality of diffractive elements.

(23) The eyeball information detection apparatus according to (19) or (20), in which the diffractive element is a diffusing element.

(24) The eyeball information detection apparatus according to (23), in which the at least one optical element is a plurality of diffusing elements, and the detection system has a fitting unit that fits a plurality of reflection images of the non-visible light on the eyeball to the plurality of diffusing elements.

(25) The eyeball information detection apparatus according to (24), in which at least two of the plurality of diffusing elements have different shapes.

(26) The eyeball information detection apparatus according to (19) or (20), in which the diffractive element has a curved-mirror characteristic.

(27) The eyeball information detection apparatus according to any one of (19) to (26), in which the at least one diffractive elements is a plurality of diffractive elements having different diffraction power, at least two of the plurality of virtual light sources respectively generated by the plurality of diffractive elements are different in position in a thickness direction of the substrate, and the detection system has a depth estimation unit that estimates a depth of the eyeball from the output from the light reception system.

(28) The eyeball information detection apparatus according to any one of (2) to (27), in which the irradiation system is capable of irradiating at least two optical elements of the plurality of optical elements with the non-visible light at different timings.

(29) The eyeball information detection apparatus according to any one of (2) to (28), in which the plurality of optical elements includes first and second optical elements corresponding to the different light sources, and the irradiation system includes a light source drive unit that selectively drives the light source corresponding to the first optical element and the light source corresponding to the second optical element.

(30) The eyeball information detection apparatus according to any one of (4) to (29), in which the optical element is a diffractive element having wavelength selectivity, the plurality of light sources includes at least two light sources having different light emission wavelengths and corresponding to the diffractive element, and the irradiation system includes a light source drive unit that selectively drives the at least two light sources.

(31) The eyeball information detection apparatus according to any one of (1) to (30), in which the optical element is a diffractive element having dependence on polarization, and the irradiation system is capable of varying a polarization direction of the non-visible light.

(32) The eyeball information detection apparatus according to (1) to (30), in which the optical element is a diffractive element having dependence on an angle-of-incidence, and the irradiation system is capable of varying an angle-of-incidence of the non-visible light upon the diffractive element.

(33) The eyeball information detection apparatus according to any one of (1) to (32), in which the optical element is a curved mirror.

(34) The eyeball information detection apparatus according to any one of (1) to (33), in which the eyeball information includes at least one of an orientation of the eyeball, position and size of a pupil, or a position of an iris.

(35) A display apparatus, including:

the eyeball information detection apparatus according to any one of (1) to (34);

an image light generation apparatus; and an optical system that is provided to the substrate and guides image light from the image light generation apparatus to an eyeball, in which the image light generation apparatus generates the image light on the basis of a detection result of the eyeball information detection apparatus.

(36) An eyeball information detection method, including:

a step of radiating non-visible light to at least one optical element provided to a substrate which faces an eyeball of a user and generating a virtual light source of the non-visible light;

a step of receiving the non-visible light reflected on the eyeball via the optical element; and a step of detecting eyeball information that is information about the eyeball on the basis of a light reception result at the step of receiving.

(37) A display method, including:

a step of radiating non-visible light to at least one optical element provided to a substrate which faces an eyeball of a user and generating a virtual light source of the non-visible light;

a step of receiving the non-visible light reflected on the eyeball via the optical element;

a step of detecting eyeball information that is information about the eyeball on the basis of a light reception result at the step of receiving; and a step of generating image light on the basis of a detection result at the step of detecting and guiding the image light to the eyeball.

REFERENCE SIGNS LIST

1: display apparatus, 10-1 to 10-15: eyeball information detection apparatus, 50: support member, 100-1, 100-4, 100-5, 100-6, 100-8, 100-12, 100-13, 100-14, 100-15: irradiation system, 101-1V, 101-2V, 101-1$V_{PD1}$, 101-2$V_{PD2}$, 101-1$V_{\lambda 1}$, 101-2$V_{\lambda 2}$, 101-1$V_{\theta 1}$, 101-2$V_{\theta 2}$: virtual light source, 150: substrate, 101-1 to 101-4, 101-13, 101-24, 101-12, 101-34, 101-1234, 101-123: light source, 201-1 to 201-4, 202-1 to 202-4, 202*a* to 202*d*, 203-1 to 203-3, 204-1 to 204-4, 205-1 to 205-3, 215-1, 215-2, 206-1, 206-2, 207-1, 207-2: optical element, 250: optical member, 270: other optical element, 300: camera (light reception system), 400-1, 400-8, 400-11, 400-12: detection system, 430: image display optical element (optical system), 500: image light generation apparatus, EB: eyeball, L1 to L4, L13, L24, L12, L34, L1234, L12$_{PD1}$, L12$_{PD2}$, L12$_{\lambda 1}$, L12$_{\lambda 2}$, L12$_{\theta 1}$, L12$_{\theta 2}$: non-visible light ray, IL: image light.

What is claimed is:

1. An eyeball information detection apparatus, comprising:

a support member that is mountable on a head of a user;

a substrate provided to the support member so as to face an eyeball of the user when the support member is mounted on the head of the user;

an irradiation system that is provided to the support member and includes at least one light source that emits non-visible light towards the substrate;

at least one optical element that is provided to the substrate so that the at least one optical element is irradiated with the non-visible light, to generate a virtual light source of the non-visible light, wherein the at least one optical element is not a plane mirror;

a light reception system that receives the non-visible light reflected on the eyeball via the optical element and includes a light reception element; and a detection system that detects eyeball information about the eyeball on a basis of an output from the light reception system, wherein:

the support member includes a temple including an ear hook portion;

the light reception system is provided to the temple; and another optical element that guides the non-visible light reflected on the eyeball to the light reception system is provided to the substrate.

2. The eyeball information detection apparatus according to claim 1, wherein the at least one optical element is a plurality of optical elements.

3. The eyeball information detection apparatus according to claim 2, wherein the plurality of optical elements includes at least three optical elements two-dimensionally arranged in an in-plane direction of the substrate.

4. The eyeball information detection apparatus according to claim 2, wherein the at least one light source is a plurality of light sources.

5. The eyeball information detection apparatus according to claim 4, wherein the plurality of light sources includes at least two light sources corresponding to different optical elements of the plurality of optical elements.

6. The eyeball information detection apparatus according to claim 4, wherein the plurality of light sources individually correspond to the plurality of optical elements.

7. The eyeball information detection apparatus according to claim 4, wherein:

each of the plurality of light sources corresponds to at least two optical elements of the plurality of optical elements; and the non-visible light from each of the plurality of light sources is propagated inside the substrate and is radiated to the at least two corresponding optical elements.

8. The eyeball information detection apparatus according to claim 4, wherein:

the plurality of optical elements includes first and second optical elements corresponding to different light sources; and the irradiation system selectively drives the light source corresponding to the first optical element and the light source corresponding to the second optical element.

9. The eyeball information detection apparatus according to claim 4, wherein;

the at least one optical element comprises a diffractive element having wavelength selectivity;

the plurality of light sources includes at least two light sources having different light emission wavelengths and corresponding to the diffractive element; and the irradiation system selectively drives the at least two light sources.

10. The eyeball information detection apparatus according to claim 2, wherein the at least one light source includes light sources corresponding to at least two optical elements of the plurality of optical elements.

11. The eyeball information detection apparatus according to claim 2, wherein the at least one light source is a single light source corresponding to the plurality of optical elements.

12. The eyeball information detection apparatus according to claim 11, wherein an optical member that guides the non-visible light from the light source to the plurality of optical elements is provided to the substrate.

13. The eyeball information detection apparatus according to claim 12, wherein the non-visible light from the light source is propagated inside the substrate and is radiated to the plurality of optical elements via the optical member.

14. The eyeball information detection apparatus according to claim 2, wherein the light reception system is provided to the substrate.

15. The eyeball information detection apparatus according to claim 2, wherein the plurality of optical elements is are provided in a periphery of the other optical element on the substrate.

16. The eyeball information detection apparatus according to claim 2, wherein the irradiation system is capable of irradiating at least two optical elements of the plurality of optical elements with the non-visible light at different timings.

17. The eyeball information detection apparatus according to claim 1, wherein the at least one optical element is larger in number than the at least one light source.

18. The eyeball information detection apparatus according to claim 1, wherein the at least one optical element comprises a reflective-type optical element.

19. The eyeball information detection apparatus according to claim 1, wherein the at least one optical element comprises a diffractive element.

20. The eyeball information detection apparatus according to claim 19, wherein the diffractive element has a non-uniform pitch.

21. The eyeball information detection apparatus according to claim 20, wherein the diffractive element is a wavefront reconstruction-type.

22. The eyeball information detection apparatus according to claim 21, wherein:

the at least one optical element is comprises a plurality of diffractive elements;

wavefront shapes recorded on at least two of the plurality of diffractive elements are different; and the detection system fits a plurality of reflection images of the non-visible light on the eyeball to wavefront shapes recorded on the plurality of diffractive elements.

23. The eyeball information detection apparatus according to claim 20, wherein the diffractive element comprises a diffusing element.

24. The eyeball information detection apparatus according to claim 23, wherein;

the at least one optical element comprises a plurality of diffusing elements; and the detection system fits a plurality of reflection images of the non-visible light on the eyeball to the plurality of diffusing elements.

25. The eyeball information detection apparatus according to claim 24, wherein at least two of the plurality of diffusing elements have different shapes.

26. The eyeball information detection apparatus according to claim 20, wherein the diffractive element has a curved-mirror characteristic.

27. The eyeball information detection apparatus according to claim 26, wherein:

the at least one optical element comprises a plurality of diffractive elements having different diffraction power generating a plurality of virtual light sources;

at least two of the plurality of virtual light sources respectively generated by the plurality of diffractive elements are different in position in a thickness direction of the substrate; and the detection system estimates a depth of the eyeball from the output from the light reception system.

28. The eyeball information detection apparatus according to claim 1, wherein;

the at least one optical element comprises a diffractive element having dependence on polarization; and the irradiation system is capable of varying a polarization direction of the non-visible light.

29. The eyeball information detection apparatus according to claim 1, wherein:

the at least one optical element comprises a diffractive element having dependence on an angle-of-incidence; and the irradiation system is capable of varying an angle-of-incidence of the non-visible light upon the diffractive element.

30. The eyeball information detection apparatus according to claim 1, wherein the at least one optical element comprises a curved mirror.

31. The eyeball information detection apparatus according to claim 1, wherein the eyeball information includes at least one of an orientation of the eyeball, position and size of a pupil, or a position of an iris.

32. A display apparatus, comprising:

the eyeball information detection apparatus according to claim 1;

an image light generation apparatus; and an optical system that is provided to the substrate and guides image light from the image light generation apparatus to the eyeball, wherein the image light generation apparatus generates the image light on a basis of a detection result of the eyeball information detection apparatus.

33. An eyeball information detection apparatus, comprising:

a support member that is mountable on a head of a user;

a substrate provided to the support member so as to face an eyeball of the user when the support member is mounted on the head of the user;

an irradiation system that is provided to the support member and includes at least one light source that emits non-visible light towards the substrate;

at least one optical element that is provided to the substrate so that the at least one optical element is irradiated with the non-visible light to generate a virtual light source of the non-visible light, wherein the at least one optical element is not a plane mirror;

a light reception system that receives the non-visible light reflected on the eyeball via the optical element and includes a light reception element; and a detection system that detects eyeball information that is information about the eyeball on a basis of an output from the light reception system wherein;

the support member includes a temple including an ear hook portion; and; and the light source is provided to the temple.

34. An eyeball information detection apparatus, comprising:

a support member that is mountable on a head of a user;

a substrate provided to the support member so as to face an eyeball of the user when the support member is mounted on the head of the user;

an irradiation system that is provided to the support member and includes at least one light source that emits non-visible light towards the substrate;

at least one optical element that is provided to the substrate so that the at least one optical element is irradiated with the non-visible light to generate a virtual light source of the non-visible light, wherein the at least one optical element is not a plane mirror;

a light reception system that receives the non-visible light reflected on the eyeball via the optical element and includes a light reception element; and a detection system that detects eyeball information that is information about the eyeball on a basis of an output from the light reception system, wherein;

the support member includes a temple including an ear hook portion and an extension portion extending from a side of the substrate which is opposite to a side of the ear hook portion; and the light source is provided to the extension portion.

* * * * *